(12) United States Patent
Arnott et al.

(10) Patent No.: US 8,589,276 B2
(45) Date of Patent: *Nov. 19, 2013

(54) USING ACCOUNTING DATA BASED INDEXING TO CREATE A PORTFOLIO OF FINANCIAL OBJECTS

(75) Inventors: Robert D. Arnott, Newport Beach, CA (US); Paul Christopher Wood, Waltham (GB)

(73) Assignee: Research Afiliates, LLC, Newport Beach, CA (US)

(*) Notice: Subject to any disclaimer, the term of this patent is extended or adjusted under 35 U.S.C. 154(b) by 0 days.
This patent is subject to a terminal disclaimer.

(21) Appl. No.: 13/216,238

(22) Filed: Aug. 23, 2011

(65) Prior Publication Data
US 2012/0215717 A1 Aug. 23, 2012

Related U.S. Application Data

(63) Continuation-in-part of application No. 11/931,913, filed on Oct. 31, 2007, now Pat. No. 8,005,740, which is a continuation-in-part of application No. 11/509,002, filed on Aug. 24, 2006, now Pat. No. 7,747,502, which is a continuation-in-part of application No. 11/196,509, filed on Aug. 4, 2005, now Pat. No. 7,620,577, which is a continuation-in-part of application No. 10/961,404, filed on Oct. 12, 2004, now Pat. No. 7,792,719, said application No. 11/196,509 is a continuation-in-part of application No. 10/159,610, filed on Jun. 3, 2002, now abandoned, application No. 13/216,238, which is a continuation-in-part of application No. 12/619,668, filed on Nov. 16, 2009, now Pat. No. 8,374,937, and a continuation-in-part of application No. 12/554,961, filed on Sep. 7, 2009, now Pat. No. 8,374,951, and a continuation-in-part of application No. 12/752,159, filed on Apr. 1, 2010, now Pat. No. 8,374,939, and a continuation-in-part of application No. 12/819,199, filed on Jun. 19, 2010, now Pat. No. 8,380,604.

(60) Provisional application No. 60/541,733, filed on Feb. 4, 2004, provisional application No. 60/751,212, filed on Dec. 19, 2005, provisional application No. 60/896,867, filed on Mar. 23, 2007.

(51) Int. Cl.
*G06Q 40/00* (2012.01)

(52) U.S. Cl.
USPC .............................. 705/36 R; 705/35; 705/37

(58) Field of Classification Search
None
See application file for complete search history.

(56) References Cited

U.S. PATENT DOCUMENTS

| 4,334,270 A | 6/1982 | Towers |
| 4,751,640 A | 6/1988 | Lucas et al. |

(Continued)

FOREIGN PATENT DOCUMENTS

| AU | 2005213293 | 5/2010 |
| EP | 1351179 A1 | 10/2003 |

(Continued)

OTHER PUBLICATIONS

John D. Bazley, Financial Accounting Concepts and Uses, PWS-Kent Publishing Company, 1988, p. 4.*

(Continued)

*Primary Examiner* — Gregory Johnson
(74) *Attorney, Agent, or Firm* — Ralph P. Albrecht; ATFirm PLLC

(57) ABSTRACT

A system, method and computer program product creates an index based on accounting based data, as well as a portfolio of financial objects based on the index where the portfolio is weighted according to accounting based data. A passive investment system may be based on indices created from various metrics. The indexes may be built with metrics other than market capitalization weighting, price weighting or equal weighting. Non-financial metrics may also be used to build indexes to create passive investment systems. Additionally, a combination of financial non-market capitalization metrics may be used along with non-financial metrics to create passive investment systems. Once the index is built, it may be used as a basis to purchase securities for a portfolio. Specifically excluded are widely-used capitalization-weighted indexes and price-weighted indexes, in which the price of a security contributes in a substantial way to the calculation of the weight of that security in the index or the portfolio, and equal weighting weighted indexes. Valuation indifferent indexes avoid overexposure to overvalued securities and underexposure to undervalued securities, as compared with conventional capitalization-weighted and price-weighted.

27 Claims, 11 Drawing Sheets

(56) References Cited

U.S. PATENT DOCUMENTS

| | | |
|---|---|---|
| 4,752,877 A | 6/1988 | Roberts et al. |
| 4,871,177 A | 10/1989 | Mock |
| 4,910,676 A | 3/1990 | Alldredge |
| 4,933,842 A | 6/1990 | Durbin et al. |
| 4,953,085 A | 8/1990 | Atkins |
| 4,974,983 A | 12/1990 | Givati et al. |
| 4,984,174 A | 1/1991 | Yasunobu et al. |
| 4,985,833 A | 1/1991 | Oncken |
| 4,989,141 A | 1/1991 | Lyons et al. |
| 5,006,998 A | 4/1991 | Yasunobu et al. |
| 5,038,284 A | 8/1991 | Kramer |
| 5,101,353 A | 3/1992 | Lupien et al. |
| 5,126,936 A | 6/1992 | Champion et al. |
| 5,132,899 A | 7/1992 | Fox |
| 5,193,056 A | 3/1993 | Boes |
| 5,297,032 A | 3/1994 | Trojan et al. |
| 5,414,838 A | 5/1995 | Kolton et al. |
| 5,444,819 A | 8/1995 | Negishi |
| 5,590,325 A | 12/1996 | Kolton et al. |
| 5,592,379 A | 1/1997 | Finfrock et al. |
| 5,644,727 A | 7/1997 | Atkins |
| 5,745,706 A | 4/1998 | Wolfberg et al. |
| 5,761,442 A * | 6/1998 | Barr et al. .................. 705/36 R |
| 5,778,357 A | 7/1998 | Kolton et al. |
| 5,806,048 A | 9/1998 | Kiron |
| 5,812,987 A | 9/1998 | Luskin et al. |
| 5,812,988 A | 9/1998 | Sandretto |
| 5,819,238 A * | 10/1998 | Fernholz .................... 705/36 R |
| 5,819,263 A | 10/1998 | Bromley et al. |
| 5,857,176 A | 1/1999 | Ginsberg |
| 5,873,071 A | 2/1999 | Ferstenberg et al. |
| 5,875,437 A | 2/1999 | Atkins |
| 5,878,405 A | 3/1999 | Grant et al. |
| 5,911,135 A | 6/1999 | Atkins |
| 5,918,217 A | 6/1999 | Maggioncalda et al. |
| 5,926,792 A | 7/1999 | Koppes et al. |
| 5,930,774 A | 7/1999 | Chennault |
| 5,946,666 A | 8/1999 | Nevo et al. |
| 5,946,667 A | 8/1999 | Tull, Jr. et al. |
| 5,978,778 A | 11/1999 | O'Shaughnessy |
| 5,987,433 A | 11/1999 | Crapo |
| 6,003,018 A | 12/1999 | Michaud et al. |
| 6,012,043 A | 1/2000 | Albright et al. |
| 6,012,044 A | 1/2000 | Maggioncalda et al. |
| 6,018,722 A | 1/2000 | Ray et al. |
| 6,021,397 A | 2/2000 | Jones et al. |
| 6,049,772 A | 4/2000 | Payne et al. |
| 6,052,673 A | 4/2000 | Leon et al. |
| 6,061,663 A | 5/2000 | Bloom et al. |
| 6,064,985 A | 5/2000 | Anderson |
| 6,073,116 A | 6/2000 | Boyle |
| 6,078,904 A | 6/2000 | Rebane |
| 6,088,685 A | 7/2000 | Kiron et al. |
| 6,092,056 A | 7/2000 | Tull, Jr. et al. |
| 6,115,697 A | 9/2000 | Gottstein et al. |
| 6,134,535 A | 10/2000 | Belzberg et al. |
| 6,154,732 A | 11/2000 | Tarbox |
| 6,161,098 A | 12/2000 | Wallman |
| 6,175,824 B1 | 1/2001 | Breitzman et al. |
| 6,233,566 B1 | 5/2001 | Levine et al. |
| 6,240,399 B1 | 5/2001 | Frank et al. |
| 6,272,474 B1 | 8/2001 | Garcia |
| 6,292,787 B1 | 9/2001 | Scott et al. |
| 6,317,700 B1 | 11/2001 | Bagne |
| 6,317,726 B1 | 11/2001 | O'Shaughnessy |
| 6,336,103 B1 | 1/2002 | Baker |
| 6,338,047 B1 | 1/2002 | Wallman |
| 6,338,067 B1 | 1/2002 | Baker et al. |
| 6,377,963 B1 | 4/2002 | Walker et al. |
| 6,393,409 B2 | 5/2002 | Young et al. |
| 6,405,204 B1 | 6/2002 | Baker et al. |
| 6,456,982 B1 | 9/2002 | Pilipovic |
| 6,484,151 B1 | 11/2002 | O'Shaughnessy |
| 6,484,152 B1 | 11/2002 | Robinson |
| 6,598,028 B1 | 7/2003 | Sullivan et al. |
| 6,601,044 B1 | 7/2003 | Wallman |
| 6,622,129 B1 | 9/2003 | Whitworth |
| 6,687,681 B1 | 2/2004 | Schulz et al. |
| 6,754,639 B2 | 6/2004 | Ginsberg |
| 6,839,685 B1 | 1/2005 | Leistensnider et al. |
| 6,859,785 B2 | 2/2005 | Case |
| 6,876,981 B1 | 4/2005 | Berckmans |
| 6,879,964 B2 | 4/2005 | Sauter et al. |
| 6,901,383 B1 | 5/2005 | Ricketts et al. |
| 6,938,009 B1 | 8/2005 | Herbst et al. |
| 6,941,280 B1 | 9/2005 | Gastineau et al. |
| 6,947,901 B1 | 9/2005 | McCabe et al. |
| 6,985,880 B1 | 1/2006 | Hodgdon et al. |
| 7,016,873 B1 | 3/2006 | Peterson et al. |
| 7,024,388 B2 | 4/2006 | Stefek et al. |
| 7,031,937 B2 | 4/2006 | Brown et al. |
| 7,035,820 B2 | 4/2006 | Goodwin et al. |
| 7,047,217 B1 | 5/2006 | Gottstein |
| 7,076,461 B2 | 7/2006 | Balabon |
| 7,085,738 B2 | 8/2006 | Tarrant |
| 7,089,191 B2 | 8/2006 | Baron et al. |
| 7,089,202 B1 | 8/2006 | McNamar et al. |
| 7,089,205 B1 | 8/2006 | Abernethy |
| 7,092,857 B1 | 8/2006 | Steiner et al. |
| 7,099,838 B1 | 8/2006 | Gastineau et al. |
| 7,107,229 B1 | 9/2006 | Sullivan |
| 7,117,175 B2 | 10/2006 | Arnott |
| 7,127,423 B2 | 10/2006 | Dunning et al. |
| 7,155,468 B2 | 12/2006 | Weiss |
| 7,165,044 B1 | 1/2007 | Chaffee |
| 7,194,468 B1 | 3/2007 | Bacila et al. |
| 7,222,093 B2 | 5/2007 | Block et al. |
| 7,222,095 B2 | 5/2007 | Squyres |
| 7,249,080 B1 | 7/2007 | Hoffman et al. |
| 7,249,086 B2 | 7/2007 | Bloom et al. |
| 7,272,578 B1 | 9/2007 | Leistensnider et al. |
| 7,295,987 B2 | 11/2007 | Graff |
| 7,299,205 B2 * | 11/2007 | Weinberger ................. 705/36 R |
| 7,305,362 B2 | 12/2007 | Weber et al. |
| 7,353,115 B2 | 4/2008 | Bertogg |
| 7,353,198 B2 | 4/2008 | Rios |
| 7,395,236 B2 | 7/2008 | Degraaf et al. |
| 7,418,419 B2 | 8/2008 | Squyres |
| 7,421,405 B2 | 9/2008 | Little |
| 7,444,300 B1 | 10/2008 | Broms et al. |
| 7,496,531 B1 | 2/2009 | Gastineau et al. |
| 7,509,278 B2 | 3/2009 | Jones |
| 7,587,352 B2 | 9/2009 | Arnott |
| 7,620,577 B2 | 11/2009 | Arnott et al. |
| 7,664,694 B2 | 2/2010 | Brandhorst |
| 7,668,773 B1 | 2/2010 | Pruitt |
| 7,685,069 B1 | 3/2010 | Subramanian |
| 7,698,192 B2 | 4/2010 | Kiron |
| 7,958,038 B2 | 6/2011 | Choueifaty |
| 8,306,892 B1 | 11/2012 | Gross et al. |
| 2001/0025266 A1 | 9/2001 | Gastineau et al. |
| 2001/0037212 A1 | 11/2001 | Motosuna et al. |
| 2001/0039526 A1 | 11/2001 | Pittenger |
| 2001/0046846 A1 | 11/2001 | Tsumura |
| 2002/0007329 A1 | 1/2002 | Alcaly et al. |
| 2002/0013755 A1 | 1/2002 | Kiron |
| 2002/0023035 A1 | 2/2002 | Kiron |
| 2002/0032629 A1 | 3/2002 | Siegel et al. |
| 2002/0038271 A1 | 3/2002 | Friend et al. |
| 2002/0046038 A1 | 4/2002 | Prokoski |
| 2002/0052820 A1 | 5/2002 | Gatto |
| 2002/0059126 A1 | 5/2002 | Ricciardi |
| 2002/0059127 A1 | 5/2002 | Brown et al. |
| 2002/0062272 A1 | 5/2002 | Kim et al. |
| 2002/0116211 A1 | 8/2002 | Hatakeyama |
| 2002/0116310 A1 | 8/2002 | Cohen et al. |
| 2002/0116311 A1 | 8/2002 | Chalke et al. |
| 2002/0120570 A1 | 8/2002 | Loy |
| 2002/0123952 A1 | 9/2002 | Lipper |
| 2002/0128947 A1 | 9/2002 | Sauter et al. |
| 2002/0128951 A1 | 9/2002 | Kiron |
| 2002/0133447 A1 * | 9/2002 | Mastman ...................... 705/36 |
| 2002/0143676 A1 | 10/2002 | Kiron |
| 2002/0143682 A1 | 10/2002 | Bergmann et al. |

(56) References Cited

U.S. PATENT DOCUMENTS

| | | |
|---|---|---|
| 2002/0156713 A1 | 10/2002 | Gaini |
| 2002/0161684 A1 | 10/2002 | Whitworth |
| 2002/0173998 A1 | 11/2002 | Case |
| 2002/0178039 A1 | 11/2002 | Kennedy |
| 2002/0184126 A1* | 12/2002 | McIntyre et al. ............... 705/35 |
| 2003/0014343 A1 | 1/2003 | Jones |
| 2003/0018556 A1* | 1/2003 | Squyres ........................ 705/36 |
| 2003/0018563 A1 | 1/2003 | Kilgour et al. |
| 2003/0018570 A1 | 1/2003 | McCabe |
| 2003/0065600 A1 | 4/2003 | Terashima et al. |
| 2003/0065602 A1 | 4/2003 | Yip |
| 2003/0069822 A1 | 4/2003 | Ito et al. |
| 2003/0074293 A1 | 4/2003 | Kiron |
| 2003/0074295 A1 | 4/2003 | Little |
| 2003/0074306 A1 | 4/2003 | Rios et al. |
| 2003/0093352 A1 | 5/2003 | Muralidhar et al. |
| 2003/0105697 A1 | 6/2003 | Griffin et al. |
| 2003/0120577 A1 | 6/2003 | Sakui et al. |
| 2003/0120578 A1* | 6/2003 | Newman ........................ 705/36 |
| 2003/0126054 A1 | 7/2003 | Purcell |
| 2003/0144947 A1 | 7/2003 | Payne |
| 2003/0172018 A1 | 9/2003 | Chen et al. |
| 2003/0172026 A1 | 9/2003 | Tarrant |
| 2003/0182219 A1 | 9/2003 | Bodurtha et al. |
| 2003/0212621 A1 | 11/2003 | Poulter et al. |
| 2003/0225657 A1 | 12/2003 | Whaley et al. |
| 2003/0225658 A1 | 12/2003 | Whaley |
| 2003/0229555 A1 | 12/2003 | Marlowe-Noren |
| 2004/0024671 A1* | 2/2004 | Freund ........................... 705/35 |
| 2004/0039620 A1 | 2/2004 | Ando et al. |
| 2004/0044505 A1 | 3/2004 | Horwitz |
| 2004/0068456 A1 | 4/2004 | Korisch |
| 2004/0111352 A1* | 6/2004 | Kim .............................. 705/36 |
| 2004/0117284 A1 | 6/2004 | Speth |
| 2004/0133497 A1* | 7/2004 | Spear ............................ 705/36 |
| 2004/0167847 A1 | 8/2004 | Nathan |
| 2004/0181477 A1* | 9/2004 | Sauter et al. .................... 705/36 |
| 2004/0193528 A1 | 9/2004 | Sadre |
| 2004/0210504 A1 | 10/2004 | Rutman |
| 2004/0225536 A1 | 11/2004 | Schoen et al. |
| 2004/0236661 A1 | 11/2004 | Benning |
| 2004/0254871 A1 | 12/2004 | Weiss |
| 2004/0267657 A1 | 12/2004 | Hecht |
| 2005/0010481 A1 | 1/2005 | Lutnick et al. |
| 2005/0015326 A1 | 1/2005 | Terry |
| 2005/0038725 A1 | 2/2005 | Boyle et al. |
| 2005/0049948 A1 | 3/2005 | Fuscone |
| 2005/0049952 A1* | 3/2005 | Carter ........................... 705/36 |
| 2005/0060254 A1 | 3/2005 | Jones |
| 2005/0080704 A1 | 4/2005 | Erlach et al. |
| 2005/0108043 A1 | 5/2005 | Davidson |
| 2005/0108148 A1 | 5/2005 | Carlson |
| 2005/0114169 A1 | 5/2005 | Ansari |
| 2005/0114251 A1 | 5/2005 | Sperandeo |
| 2005/0144107 A1 | 6/2005 | Plonski |
| 2005/0149422 A1 | 7/2005 | Van Lier |
| 2005/0171884 A1 | 8/2005 | Arnott |
| 2005/0171894 A1 | 8/2005 | Traynor |
| 2005/0192889 A1 | 9/2005 | Sauter et al. |
| 2005/0216384 A1 | 9/2005 | Partlow et al. |
| 2005/0216387 A1 | 9/2005 | Barany et al. |
| 2005/0216407 A1 | 9/2005 | Feldman et al. |
| 2005/0222941 A1 | 10/2005 | Tull |
| 2005/0228731 A1 | 10/2005 | Coates |
| 2005/0228734 A1 | 10/2005 | Pagani |
| 2005/0246255 A1 | 11/2005 | Rousseau et al. |
| 2005/0246260 A1 | 11/2005 | Hodgdon et al. |
| 2006/0015433 A1 | 1/2006 | Arnott et al. |
| 2006/0020531 A1 | 1/2006 | Veeneman et al. |
| 2006/0041489 A1 | 2/2006 | Arnott |
| 2006/0059074 A1 | 3/2006 | Freund |
| 2006/0064364 A1 | 3/2006 | Whitehead |
| 2006/0074787 A1 | 4/2006 | Perg et al. |
| 2006/0080192 A1 | 4/2006 | McCabe |
| 2006/0100946 A1 | 5/2006 | Kazarian |
| 2006/0100949 A1 | 5/2006 | Whaley et al. |
| 2006/0100950 A1 | 5/2006 | Hecht |
| 2006/0100955 A1 | 5/2006 | Baldassini et al. |
| 2006/0149645 A1 | 7/2006 | Wood |
| 2006/0149649 A1 | 7/2006 | Hernandez |
| 2006/0161489 A1 | 7/2006 | Allen et al. |
| 2006/0184438 A1 | 8/2006 | McDow |
| 2006/0184444 A1 | 8/2006 | McConaughy et al. |
| 2006/0200395 A1 | 9/2006 | Masuyama et al. |
| 2006/0206398 A1 | 9/2006 | Coughlin |
| 2006/0206405 A1 | 9/2006 | Gambill |
| 2006/0212384 A1 | 9/2006 | Spurgin et al. |
| 2006/0218075 A1 | 9/2006 | Feldman et al. |
| 2006/0224487 A1 | 10/2006 | Galdi |
| 2006/0224494 A1 | 10/2006 | Pinkava |
| 2006/0247996 A1 | 11/2006 | Feldman |
| 2006/0253363 A1 | 11/2006 | Tarrant |
| 2006/0271452 A1 | 11/2006 | Sparaggis |
| 2007/0005471 A1 | 1/2007 | Ho et al. |
| 2007/0005476 A1 | 1/2007 | Ho et al. |
| 2007/0016497 A1 | 1/2007 | Shalen et al. |
| 2007/0022033 A1 | 1/2007 | Ho et al. |
| 2007/0027790 A1 | 2/2007 | Gastineau et al. |
| 2007/0043644 A1 | 2/2007 | Weiss |
| 2007/0043650 A1 | 2/2007 | Hughes et al. |
| 2007/0055598 A1 | 3/2007 | Arnott et al. |
| 2007/0055599 A1 | 3/2007 | Arnott |
| 2007/0061235 A1 | 3/2007 | Timmons et al. |
| 2007/0078743 A1 | 4/2007 | Shilpiekandula et al. |
| 2007/0078744 A1 | 4/2007 | Koss et al. |
| 2007/0112662 A1 | 5/2007 | Kumar |
| 2007/0118453 A1 | 5/2007 | Bauerschmidt et al. |
| 2007/0118454 A1 | 5/2007 | Bauerschmidt et al. |
| 2007/0118455 A1 | 5/2007 | Albert et al. |
| 2007/0118459 A1 | 5/2007 | Bauerschmidt et al. |
| 2007/0118460 A1 | 5/2007 | Bauerschmidt et al. |
| 2007/0136172 A1 | 6/2007 | West |
| 2007/0174102 A1 | 7/2007 | Coulter |
| 2007/0179874 A1 | 8/2007 | Spirgel et al. |
| 2007/0192228 A1 | 8/2007 | Phelps et al. |
| 2007/0198389 A1 | 8/2007 | Orloske et al. |
| 2007/0219894 A1 | 9/2007 | Guichard |
| 2007/0239571 A1 | 10/2007 | Michaletz |
| 2007/0239583 A1 | 10/2007 | Williams |
| 2007/0244787 A1 | 10/2007 | Lowry |
| 2007/0288339 A1 | 12/2007 | Squyres |
| 2008/0071699 A1 | 3/2008 | Catalano-Johnson |
| 2008/0071700 A1 | 3/2008 | Catalano-Johnson |
| 2008/0071702 A1 | 3/2008 | Howard et al. |
| 2008/0091622 A1 | 4/2008 | Yass et al. |
| 2008/0140547 A1 | 6/2008 | Murphy et al. |
| 2008/0208769 A1 | 8/2008 | Beer et al. |
| 2008/0215502 A1 | 9/2008 | Sabbia |
| 2008/0235121 A1 | 9/2008 | Gonen |
| 2008/0243717 A1 | 10/2008 | Rios |
| 2008/0243721 A1 | 10/2008 | Joao |
| 2008/0249957 A1 | 10/2008 | Masuyama |
| 2008/0270317 A1 | 10/2008 | Waldron et al. |
| 2008/0288387 A1 | 11/2008 | Meyerhoff, II |
| 2008/0288416 A1 | 11/2008 | Arnott |
| 2008/0294539 A1 | 11/2008 | Bassuk |
| 2009/0006267 A1 | 1/2009 | Fergusson et al. |
| 2009/0018966 A1 | 1/2009 | Clark |
| 2009/0063363 A1 | 3/2009 | Present et al. |
| 2009/0138407 A1 | 5/2009 | Trease |
| 2009/0164388 A1 | 6/2009 | Jones |
| 2009/0182683 A1 | 7/2009 | Taylor |
| 2009/0198631 A1 | 8/2009 | McGarel |
| 2010/0063942 A1 | 3/2010 | Arnott |
| 2010/0070429 A1 | 3/2010 | Spurgin et al. |
| 2010/0153296 A1 | 6/2010 | Volpert et al. |
| 2010/0191628 A1 | 7/2010 | Arnott |
| 2010/0262563 A1 | 10/2010 | Arnott |
| 2010/0287113 A1 | 11/2010 | Lo et al. |
| 2010/0287116 A1 | 11/2010 | Arnott |

(56) References Cited

U.S. PATENT DOCUMENTS

FOREIGN PATENT DOCUMENTS

| | | |
|---|---|---|
| GB | 2393532 | 3/2004 |
| GB | 2419011 A | 4/2006 |
| JP | A 2003-275177 | 10/1998 |
| JP | AH10-275177 | 10/1998 |
| JP | 2001249962 A | 9/2001 |
| JP | 20010249962 A | 9/2001 |
| JP | 2002-502514 | 1/2002 |
| JP | 2002-512405 | 4/2002 |
| JP | 2003044664 A | 2/2003 |
| JP | 2001-282957 | 3/2003 |
| JP | 2003-150779 | 5/2003 |
| JP | 2003-187052 | 7/2003 |
| JP | A 2003-187052 | 7/2003 |
| JP | A2004-029882 | 1/2004 |
| JP | 2004259156 A | 9/2004 |
| TW | 200525404 A | 8/2005 |
| WO | WO-96/06402 A2 | 2/1996 |
| WO | WO97/22075 | 6/1997 |
| WO | WO 9722075 | 6/1997 |
| WO | WO-98/44444 | 10/1998 |
| WO | WO-99/23592 A1 | 5/1999 |
| WO | WO99/54838 | 10/1999 |
| WO | WO 9954838 | 10/1999 |
| WO | WO/00/16226 | 3/2000 |
| WO | WO-00/16226 A1 | 3/2000 |
| WO | WO-01/33402 A2 | 5/2001 |
| WO | WO-01/37168 A2 | 5/2001 |
| WO | WO-01/39005 A2 | 5/2001 |
| WO | WO-01/46846 | 6/2001 |
| WO | WO-01/48629 A1 | 7/2001 |
| WO | WO 01-86557 | 11/2001 |
| WO | WO-02/093322 | 11/2002 |
| WO | WO-02/095639 | 11/2002 |
| WO | WO 03-009094 | 1/2003 |
| WO | WO-03/009094 | 1/2003 |
| WO | WO03/032206 | 4/2003 |
| WO | WO-03/034180 A2 | 4/2003 |
| WO | WO-2006/089565 A2 | 8/2006 |
| WO | WO/2006/101764 | 9/2006 |
| WO | WO-2006/103474 A2 | 10/2006 |
| WO | WO 2007-027200 | 3/2007 |
| WO | WO-2007/027200 A2 | 3/2007 |
| WO | WO2008/118372 | 10/2008 |

OTHER PUBLICATIONS

Business Wire, Investment-Technlgies; (IVES) Jan. 6, 1989, p. 1.*
Diversity-Weighted Indexing, Robert Femholz, Journal of Portfolio Management, Winter 1998, pp. 74-82.*
Investing at the edge (investing in non-capitalization weighted index funds), Jarrod W Wilcox, Journal of Portfolio Management, New York, Spring 1998,vol. 24, Iss. 3; 16 pgs.*
Fundamental Indexation, Robert Arnott, 2004; 36-pages.*
JP Notice of Rejection for JP 2006-552146 2005213293, Dated Feb. 22, 2011, with English Translation.
KIPO Notice of Preliminary Rejection with English Translation, in KR 10-2006-7017949.
Technical Primer for Australian appeal, submitted in AU2005213293.
JP Notice of Rejection for JP 2006-552146 2005213293, Dated Feb. 22, 2011.
Office Action issued in related Republic of China (Taiwan) Patent Application No. 095140793.
Translation of Office Action issued in related Republic of China (Taiwan) Patent Application No. 095140793.
Office Action in JP Counterpart Application No. 2006-552146, May 25,2010.
XP002456414Document XP002456414. "Statement in accordance with the Notice from the European Patent Office dated Oct. 1, 2007 concerning business methods (OJ Nov. 2007; pp. 592-593).", Oct. 2007.
Australian Examiner's Report for AU Application 2005213293, Dated May 19, 2010.
Author Unknown, The Role of "Pricing Model Uncertainty"—Resolving Four Paradoxes in Today's Market Behavior,—Strategic Economic Decisions, www.SEDinc.com, SED Profile, May 2008.
Diversity-Weighted Indexing, Robert Fernholz, Journal of Portfolio Management, Winter 1998, pp. 74-82.
International Search Report and Written Opinion of the International Searching Authority mailed Dec. 19, 2006, from related application PCT/US05/02345.
Office Action in JP Counterpart Application No. 2006-552146, May 25, 2010.
Office Action issued Jan. 26, 2010 in related Israel Appl. No. 172792 (with English translation).
Office Action issued Oct. 28, 2009 in related Australian Appl. No. 2005213293.
Office Action issued Sep. 10, 2009 in related Mexican Appl. No. PA/a/2006/000103 (with English translation).
Robert Arnott et al., "Fundamental Indexation;" Research Affiliates Oct. 7, 2004, pp. 1-35.
Arnott, Robert D., Jason C. Hsu & John M. West, "The Fundamental Index—A Better Way to Invest", pp. i-xxiii, and 1-29. Whole book given to Exr. at interview in 2009.
Advisory Action dated Feb. 25, 2009 issued in related U.S. Appl. No. 11/196,509.
Wood, Paul C. , et al., "Fundamental Profit-Based Equity Indexation," Journal of Indexes, Second Quarter, 2003.
International Preliminary Report on Patentability from PCT/US2008/003762 mailed Oct. 8, 2009.
Office Action in MX/a/2008/007892 dated Dec. 21, 2010.
Extended European Search Report for EP Application 06827143.6 / PCT/US2006042430 dated Jul. 2, 2010 and EPO Official Journal XP007905525.
Communication from the European Patent Office dated Oct. 2007, issued in related European Patent Application No. 03726210.2.
Supplementary Search Report in related EP 05 712 005.7 and EPO Official Journal XP007905525.
Australian Examiner's Report for AU Application 2005213293, Dated Aug. 5, 2010.
Supplementary Search Report in EP 07811461.8 and EPO Official Journal XP007905525.
Carolyn Geer, "Index Funds Get a Makeover," Wall Street Journal, Feb. 7, 2011.
Office Action in U.S. Appl. No. 10/159,610 dated May 17, 2010.
Office Action issued Jun. 2007 in Eurasian Patent Appl. No. 200600013 (with English translation).
Office Action issued Aug. 14, 2009 in CN application No. 200580000459.0.
ITG Research, ITG Australia, Ltd., Heddle, Ian, "A Quick Guide to Tax Efficient Investment," ITG Research, Nov. 1, 2005, Australia.
Werner Goricki, Dirk Soehnholz, Marcus Storr, Vincent Weber, "Portable Alpha: Is a Hedge Fund Index-based Alpha Overlay the Most Appropriate Solution?," Hedge Fund Monthly, Jun. 2006, http://www.eurekahedge.com/news/06_june_feri_alpha_overlay.asp, last accessed Jul. 22, 2010.
"Goldman Sachs Funds—Goldman Sachs Global Core Equity Portfolio," launched Jun. 2005, Standard & Poor's, Aug. 2007, http://www2.standardandpoors.com/spf/pdf/funds/eneq2OS210110.pdf , last accessed Mar. 2011, Research Analyst Report, copyright 2007.
Asness, Clifford S., "The Interaction of Value and Momentum Strategies," Financial Analysts Journal, Mar./Apr. 1997, pp. 29-36.
Andrew Alford, Bob Jones, Terence Lim, Bob Litterman, "Fundamentals Drive Alpha"—Presentation to the NYU Economics Honors Society Discussion Series, Apr. 12, 2006.
"PIMCO Global Advantage Bond Index Profile," http://www.pimcoindex.com/download/products/BespokeIndices/PIMCO_Global_Advantage_Bond_Index.pdf,(last accessed Mar. 2011), Jan. 2009.
"PIMCO Global Advantage Government Bond Index Profile," http://www.pimcoindex.com/download/products/BespokeIndices/PIMCO_GLADI_Government_FINAL.PDF, (last accessed Mar. 2011, Jul. 2010.

(56) References Cited

OTHER PUBLICATIONS

"PIMCO European Advantage Government Bond Index Profile," http://www.pimcoindex.com/download/products/BespokeIndices/PIMCO_EurADI_Government_Final.pdf, (last accessed Mar. 2011), Jul. 2010.
"PIMCO Global Advantage Bond Index Guide—Fine Specifications," http://www.pimcoindex.com/download/products/BespokeIndices/PIMCO_Global_Advantage_Bond_Index_Guide.pdf, (last accessed Mar. 2011), May/Jun. 2009.
"PIMCO Global Advantage Government Bond Index Guide—Fine Specifications," http://www.pimcoindex.com/download/products/BespokeIndices/PIMCO_Global_Advantage_Government_Bond_Index_Guide-Fine_Specifications.pdf, (last accessed Mar. 2011), Jul. 2010.
"Barclays Capital Launches GDP Weighted Benchmark Bond Indices," News Release Barclays Capital, http://www.barcap.com/About+Barclays+Capital/Press+Office/News+releases/News,1493,Barclays+Capital+Launches+GDP+Weighted+Benchmark+Bond+Indices , (last accessed Mar. 10, 2011), Nov. 9, 2009.
"Barclays Capital Launches Dynamic Global Emerging Markets Indices," Barclays Capital News Release, http://www.barcap.com/About+Barclays+Capital/Press+Office/News+releases/News,1723,Barclays+Capital+Launches+Dynamic+Global+Emerging+Markets+Indices , (last accessed Mar. 10, 2011), Feb. 24, 2011.
Burke, Kevin, "The ETF Weighting Game," Registered Rep./www.registeredrep. com, Apr. 2007, pp. 79-88.
"Around the World of ETFs," http://www.indexuniverse.com/JOI/printer.php?id=807, pp. 1-8, Apr. 23, 2007.
"Haiku-mania," http://www.indexuniverse.com/JOI/issue.php?year=2007&quarter=2&type=editors_notes , Apr. 23, 2007.
Shazar, Jonathan, "Taking on a Heavyweight: Two Strategies—With Attendant ETFs—Take Aim at Market-Cap Weighting", Institutional Investor, Jan. 24, 2006.
Savage, Steve, et al., "Kiplinger's Personal Finance Investing: Fund Insights, a Better Way of Indexing?", Kiplinger, Aug. 2006.
Business Wire, Investment-Technlgies; (IVES), p. 1.
Diversity-Weighted Indexing, Robert Fernholz, Journal of Portfolio Management, pp. 74-82.
Investing at the edge (investing in non-capitalization weighted index funds), Jarrod W. Wilcox, Journal of Portfolio Management, New York, vol. 24, Iss. 3; 16 pages.
"ActiveBeta Strategies," Westpeak Global Advisors, L.P., Working Paper Dec. 15, 2009.
Arnott, Robert D., "An Overwrought Orthodoxy", Institutional Investor Magazine, Dec. 2006.
Communication from the European Patent Office dated Dec. 3, 2009, issued in related European Patent Application No. 03726210.2.
Office Action issued Nov. 26, 2008 in related Eurasian Patent Appl. No. 200870083/27 (with English translation).
Office Action in related EP 05 712 005.7.
International Preliminary Report on Patentability issued Mar. 24, 2009 in related PCT/US2006/042430.
Office Action issued Jul. 8, 2009 in related U.S. Appl. No. 11/509,002.
Office Action issued Aug. 6, 2009 in related U.S. Appl. No. 10/159,610.
Arnott, et al., "Redefining Indexation," Research Affiliates, LLC, pp. 1-24, 2004.
Scott Burns, "Next-Generation Index Funds Coming," Dallas Morning News, Nov. 26, 2004.
Arnott, Robert, Hsu, Jason, Moore, Phil, "Redefining Indexation," Sep. 9, 2004.
Author Unknown, "Optimal Value-Weighted Portfolios," Economist's View: Value Weighted Portfolios, Jun. 14, 2006.
Author Unknown, "Stock Market Perspective: Better Ways to Index?" http://www.pankin.com/persp062.pdf.
Wooley, Scott, "The Index Insurgents," Forbes.com, Magazine article, Oct. 30, 2006.
Hsu, Jason D., "*Cap-Weighted Portfolios are Sub-Optimal Portfolios*", Journal of Investment Management, vol. 4, No. 3, Jul. 2006.

Arnott, Robert D., "*Disentangling Size and Value*", Financial Analyst Journal, Sep. 2005.
Arnott, Robert D., et al., "Does Noise Create the Size and Value Effect?", Working Paper, Jan. 2007.
Arnott, Robert D., et al., "Fundamental Indexes: Current and Future Applications", Institutional Investor Journals, Fall 2006.
Wood, Paul C., "*Fundamental Profit-Based Equity Indexation*", Journal of Indexes, Second Quarter, 2003.
Tamura, Hirmichi, et al., Global Fundamental Indices: Do they outperform market-cap weighted indices *on a Global Basis*?, Security Analysts Journal, Oct. 2005.
Siegel, Jeremy J., "*Long-term Returns on the Original S&P 500 Components*", Financial Analyst Journal, vol. 62, No. 1, Jan. 2006.
Asness, Clifford, "New and Improved Same Old Thing: The Value of Fundamental Indexing", Institutional Investor Magazine, Oct. 2006.
Arnott, Robert D., et al., "*Noise CAPM and the Size and Value Effects*", Journal of Investment Management, vol. 5, No. 1, Jan. 2007.
Siegel, Jeremy, "*The 'Noisy Market' Hypothesis*", Wall Street Journal, vol. 62, No. 1, Jun. 2006.
Research Affiliates Fundamental Index™ Fundamental Index™ Enhanced Power Point Presentations.
Retrospectives on Selected Enhanced Fundamental Index™—Strategies.
Research Affiliates, LLC Fact Sheets on RAFI™—Related—Limited Partnerships.
Unknown, "*South Dakota Signs on With New Strategy*", Pensions & Investments Online, Jan. 10, 2005.
Arnott, Robert D., "*Whither Finance Theory*", Financial Analysts Journal, Jan./Feb. 2005.
Petruno, Tom, "*New Take on Index Fund Concept*", Los Angeles Times, Jun. 26, 2005.
Hulbert, Mark, "*A Stock Market Riddle, May Have an Answer*", The New York Times, Jul. 3, 2005.
Foster, Mike, "*Playing Poker With the Indices*", Financial News, Jul. 11, 2005.
Jamieson, Dan, "Money Manager Challenges Cap-Weighted Market Indexes", Investment News, Jul. 18, 2005.
Coggan, Philip, "*A Sound Idea With Solid Backing*", Financial Times, Jul. 18, 2005.
Unknown, "FTSE and Rob Arnott Launch First Fundamental Indexes", Press Release, Jul. 19, 2005.
Unknown, "Nomura Asset Management and Research Affiliates to Launch Products Based on Fundamental Indexation", Press Release, Aug. 19, 2005.
Arvedlund, Erin E., "*Wall Street Pushes Designer Index Funds*", The Wall Street Journal, Aug. 25, 2005.
Unknown, "*San Joaquin Ups Value-Added Real Estate Allocation*", Pensions & Investments Online, Aug. 30, 2005.
Burr, Barry B., "Fundamental Index Concept Gets Institutional Investors' Attention", Pensions &Investments Online, Sep. 19, 2005.
Clements, Jonathan, "When Good Index Funds Go Bad: The Case for a 'Fundamental' Strategy", The Wall Street Journal Online, Sep. 21, 2005.
Unknown, "Canadian Fundamental 100 Income Fund Announces Initial Public Offering", Canada Newswire, Sep. 28, 2005.
Capon, Andrew, "*Beta Boosting*", Institutional Investor, Oct. 2005.
Burr, Barry B., "*Arnott, CFA Ethical Dance*", Pensions & Investments Online, Oct. 17, 2005.
Unknown, "*Letters to the Editor*", Pensions & Investments Online, Oct. 31, 2005.
Kinnel, Russel, "*The Five Best New Funds of 2005*", Morningstar.com, Nov. 7, 2005.
Unknown, "New Fundamental Index Series Launched by FTSE Group and Research Affiliates", PressRelease, Nov. 28, 2005.
Unknown, "PowerShares FTSE RAFI US1000 ETF Celebrates IPO on the NYSE", NYSE.com, Dec. 19, 2005.
Beales, Richard, "*Getting Back to Fundamentals*", Financial Times, Feb. 24, 2006.
Brockman, Joshua, "The New Calculus of Designer ETFs, Financial Engineers Create Enhanced Indexes" Kiplinger.com, Jun. 2006.
Goldberg, Steven, "Value Added, Don't Give Upon the S&P 500", Kiplinger.com, Mar. 21, 2006.

(56) References Cited

OTHER PUBLICATIONS

Luxenberg, Stan, "Fundamental 'Indexing", Registered Rep, Jul. 1, 2006.
Rinne, Jonas, "Translation From Swedish: The Stock Market's New Fundamentalist", Affarsvarlden, Apr. 19, 2006.
Salzinger, Mark, "An Indexing Alternative", No Load Fund Investor, Jul. 2006.
Strauss, Lawrence C., "Too Many ETFs?", Barrons, Jul. 3, 2006.
Greenberg, Gregg, "The Brains Behind Fundamental Indexing", TheStreet.com, Jul. 25, 2006.
Lauricella, Tom, et al., "Fund Track, Buyer Beware; Not All Index ETF's Are What They Appear", The Wall Street Journal Europe, Jul. 24, 2006.
Kinnel, Russ, "Fund Spy Column: Four Great Funds for 401K's and Iras Only", Morningstar, Jul. 24, 2006.
Unknown, "Asset Allocation Basics: Rebalancing", Seeking Alpha, Jul. 10, 2006.
Unknown, "CRQ, PowerShares Autonomic Allocation ETFs Cited in 'Portfolio Strategy'", Toronto Globe & Mail, Jul. 24, 2006.
Unknown, "Recap of No-Load Fund Investor Coverage of PRF, Boroson on Money", Daily Record (Morristown, NJ), Jul. 23, 2006.
Carrel, Lawrence, "Exchange-Traded Funds: ETF Focus Index Wars", SmartMoney.com, Aug. 16, 2006.
Watt, James L., CPA/PFS, "Is fundamental Indexing a Better Way to Index?", Fort Collins Coloradoan, Jul. 30, 2006.
Salisbury, Ian, "PowerShares FTSE RAFI US1000 in Article on Actively Managed ETF's", Wall Street Journal, Jul. 30, 2006.
Unknown, "Ten to Watch 2006", Registered Rep, Aug. 1, 2006.
Goldberg, Steven, "Wretched Excess Hits ETFs", Kiplinger.com, Aug. 3, 2006.
Siegel, Jeremy, "Consuelo Mack WealthTrack", PBS TV, Aug. 4, 2006.
Coggan, Philip, "Report: FT Fund Management, Fundamental Indices Are Proving Their Worth", Financial Times—UK Edition, Aug. 7, 2006.
Unknown, "Investing: Throughbred Indexes Work to Sustain Pace", International Herald Tribune, Aug. 7, 2006.
Kittsley, Dod, "Alternatively Weighted Indexes: Strategy or Benchmark?", Investment News, Op-Ed, Aug. 8, 2006.
Simon, Ellen, "New Indexes Aim to Beat Old Benchmarks", Associated Press Newswire, Aug. 8, 2006.
Simon, Ellen, "New Indexes Spiceup ETFs", Associated Press, Aug. 12, 2006.
Wherry, Rob, "Happy B-Day Vanguard 500", SmartMoney.com, Aug. 31, 2006.
Unknown, "Growth-stock Investing Has Required the Patience of Job During the Last Few Years", New York Times, Sep. 3, 2006.
Haines, Lisa et al., "AP2 Considering Expanding Use of Fundamental Indexation", Financial News (U.K.), Sep. 4, 2006.
Unknown, "Claymore Investments Announces New (RAFI) ETFs, on TSX", Canada Newswire: Claymore Investments, Inc., Sep. 8, 2006.
Unknown, "XACT—First in Europe With a fundamental ET," Announcing Launch of the EXACT FTSE RAFI Fundamental Euro ETF on the Stockholm Stock Exchange, and FTSE Licenses First European ETF on FTSE RAFI Index, XACT, Sep. 11, 2006.
Unknown, "Fundamental Indices Show Resilience", Financial News, Sep. 11, 2006.
Skypala, Pauline, "Stock Market Indices Prove Inefficien", Financial Times—UK Edition, Sep. 12, 2006.
Carrigan, Bill, "Being in Right Sector Proves Key With ETFs", Toronto Star, Business: Getting Technical, Sep. 15, 2006.
Unknown, "Breaking News: PowerShares Spreads the Love", IndexUniverse.com, Sep. 15, 2006.
O'Connor, Cecily, "A Fundamental Change, Research Affiliates, With 55% Gain So Far This Year, Applies Its Index Concept Beyond U.S. Stocks", Pensions & Investments Money Management, Sep. 18, 2006.
Unknown, "Merrill Lynch Claymore International Fundamental Index Accelerator Securities, Series 1", Canada NewsWire, Sep. 19, 2006.
Unknown, "ETF Versus No-Loads", No-Load Fund Investor, Sep. 19, 2006.
Carrel, Lawrence, "Exchanging Exchanges", SmartMoney.com, Sep. 20, 2006.
Conboy, Bill et al., "PowerShares Capital Management Launches Ten New ETF Portfolios on NASDAQ", M2 Presswire, Sep. 20, 2006.
Unknown, "FTSE RAFI Indexes to Be Used as Basis for World's First Fundamentally Weighted Sector ETF's", PR Newswire, Sep. 20, 2006.
Steel, Sandra, "FTSE RAFI Indexes to Be Used As Basis for the World's First Fundamentally Weighted Sector ETFs, Ten Fundamental Indexes Out-Perform Domestic Cap Weighted Equivalents", Media Information i.e. Press Release From FTSE The Index Company, Sep. 20, 2006.
Unknown, "Rob on Consuelo Mack WealthTrack", PBS Interview, Sep. 22, 2006.
Unknown, "PowerShares Pitches Alt-Weighted ETFs", Fund Action, Sep. 22, 2006.
O'Connor, Cecily, "At Research Affiliates, a Fundamental Change", Investment News. Sep. 25, 2006.
O'Donnell, Kathie, "One on One With Philip Taylor of AMVESCAP PLC, on New RAFI PowerShares", Investment News, Sep. 25, 2006.
Knight, Rebecca, "FT Wealth: Hands-On Investor, ETFs Start to Look Beyond the Index Model", Financial Times, Sep. 26, 2006.
Korn, Donald Jay, "Beyond Benchmarks, Tracking Alternative Indexes Can Add a Flavor of Active Management to the ETF Menu", Financial Planning, Oct. 1, 2006.
Saler, Tom, "Growing to the Sky", Barrons, Oct. 2, 2006.
Spence, John, "ETF Investing, for These ETFs, the Fundamental Things Apply, Firms, Experts Take Sides in Clash Over Best Investment Strategy", MarketWatch (Boston), Oct. 2, 2006.
Knight, Rebecca, "FT Report: FT Fund Management: The Big Picture", Financial Times, Oct. 2, 2006.
Ryan, Jen, "Ask the Street: So Many ETFs", TheStreet.com, Oct. 4, 2006.
Schlagheck, Jim, "Exchange Traded Funds, Getting an Edge With 'Fundamental Indices", TheStreet.com., Oct. 5, 2006.
Farrell, Christopher, Personal Finance, Battle for the Index Investor, Business Week, Oct. 9, 2006.
Tan, Kopin, "Lipper Mutual Fund Quarterly, The Weighting Game", Barron's, Oct. 9, 2006.
Unknown, "Alternative Indices", Financial Times (U.K. Edition), Oct. 13, 2006.
Nusbaum, Roger, "Personal Finance: ETFs, A Surge of Energy ETFs", TheStreet.com, Oct. 13, 2006.
Kinnel, Russell, "Fund Spy, Great Mutual Funds Go Head to Head, It's Marsico Vs. Janus and Fidelity Vs. Vanguard", Morningstar.com, Oct. 16, 2006.
Baker, Nick, "Arnott's 'Fundamental' Stock Index Beats S&P 500, Sparks Debate", Bloomberg.com, Oct. 18, 2006.
Asness, Clifford, "The Value of Fundamental Indexing", Daily ii.com a.k.a. Institutional Investor, Oct. 19, 2006.
Baker, Nick, "Business: Marketplace by Bloomberg: Around the Markets, Rebuilding Indexes From Ground Up", International Herald Tribune, Oct. 19, 2006.
Baker, Nick, "Financial Post: FP Investing, Manager Adds Twist to Index Investing: Focus on Fundamentals", National Post (Canada), Oct. 19, 2006.
Bloomberg News, "Is Jobs' Job Safe Amid Options Scandals?, Business, Analyst Touts 'Fundamentals'", St. Paul Pioneer Press, (St. Paul, Minnesota), Oct. 22, 2006.
Sivanithy, R., "Companies: Is Fundamental Weighting Better in Nourse Indices?" The Business Times Singapore, Oct. 27, 2006.
Pender, Kathleen, "Bogle Shares His Wisdom", San Francisco Chronicle, Oct. 29, 2006.
Hajim, Corey, "Smart Strategies, A Better Way to Index?", Fortune, Oct. 30, 2006.
Woolley, Scott, "The Index Insurgents", Forbes.com, Oct. 30, 2006.
Editorial Staff, "Marketplace", OnWallStreet, Nov. 1, 2006.

(56) References Cited

OTHER PUBLICATIONS

Voyles, Bennett, "New Kid in Town: The Fundamental Index", OnWallStreet, Nov. 1, 2006.
Unknown, "Breaking News, SSgA Goes Fundamental", IndexUniverse.com, Nov. 2, 2006.
Hoffman, David, "ETF Powerhouses Leery of Fundamental Indexing", InvestmentNews.com, Nov. 6, 2006.
Dunstan, Barrie, "Supplement: Quarterly Review of Funds, Fundamental Shift Towards Value is Best of Both Worlds", Australian Financial Review on Fundamental Indexation, Nov. 8, 2006.
Burns, Scott, "The Looming Battle: Fundamental Vs. Traditional Indexing", Scottburns.com, Nov. 11, 2006.
Burns, Scott, "As Index Funds Duke It Out, It Pays to Be Skeptical", The Boston Globe Via Boston.com, Nov. 12, 2006.
Burns, Scott, "Indexing Idea Has a Challenger", The Dallas Morning News Via DallasNews.com, Nov. 12, 2006.
Dunstan, Barrie, "News: Managed Funds—A Third Way: Fundamental Indexing (Sub-Head) There Is Fresh Life in the Debate Between Active Share Managers and Index Fund Managers", Independent Financial Review (New Zealand), Nov. 15, 2006.
Carrick, Rob, "Report on Business: Globe Investor: Portfolio Strategy, New ETFs Will Whet Your Appetite (Sub-Head) the Products May Satisfy Investors Who Like the Low Cost and Flexibility of These Funds That Trade Like a Stock", The Globe & Mail (Toronto), Nov. 18, 2006.
Plumpton, Emma (Redmayne-Bentley Stockbrokers), "Influence of Geography on the Wane", Aberdeen Press & Journal (UK), Nov. 20, 2006.
Carpenter, Margie et al., "Rethinking the World: Global Economic Changes Are Demanding a More Sophisticated Evaluation of Your Clients' Portfolio Allocations", Financial Planning Magazine, Dec. 1, 2006.
Gotlieb, Rish, "Why Portfolio Pros by ETFs, Money Managers Who Don't Have the Time to Specialize in Every Market Use the Convenience of Exchange-Traded Funds", Toronto Star, Dec. 7, 2006.
Hougan, Matthew, "Life From the Superbowl", IndexUniverse.com, Dec. 7, 2006.
Morris, Sonya, "Fund Spy—What's the Right Way to Index? (Sub-Head) Our Take on the Newest Breed of Index Funds", Morningstar.com, Dec. 12, 2006.
Unknown, "The Buttonwood Column, Weights and Measures, A Squabble Erupts Over How Best to Create a Stockmarket Index", The Economist Newspaper Limited (London), Dec. 13, 2006.
Woods, Nancy, "Financial Post: FP Weekend: Ask a Broker Column, Working Toward a Balanced Portfolio", National Post (Canada), Dec. 16, 2006.
Critchley, Barry, "Financial Post: Off the Record, Merrill (ML), Claymore (C) Steal a March," National Post (Canada), Dec. 19, 2006.
Unknown, "RA Among Enhanced-Index Managers Approved by Tacoma ERS", Pension & Investment Daily, Dec. 19, 2006.
Wherry, Rob, "Battle for Index Supremacy, and Centers of Attention: A New Generation of Indexers Want to Replace the S&P 500. Should You Follow Their Lead", SmartMoneySelect.com, Dec. 22, 2006.
Burns, Scott, "Sloth, Passivity Yield Tidy Profit, Index Funds and Broad Asset Class Diversification Keep Investing Simple", Austin-American Statesman, Statesman.com, Personal Finance, Dec. 24, 2006.
Ransom, Diana et al., "Talk the Talk: Financial Buzz Words of '07", Wall Street Journal, Dec. 26, 2006.
Time Middleton, "Mutual Funds, A Play-It-Safe Portfolio for 2007", MSN Money, Dec. 26, 2006.
Salzinger, Mark, "Feature Interview With Jason Hsu", Investor's ETF Report, Jan. 2007.
Gastineau, Gary L., "The Cutting Edge", IndexUniverse.com, Jan. 2007.
Unknown, "Bettering Fundamentals", IndexUniverse.com, Jan. 4, 2007.
Salisbury, Ian, "New ETFs to Weight Stocks by Revenue", Dow Jones, Jan. 4, 2007.
Wherry, Rob, "SmartMoney.com Picks the Best Mutual Fund of 2006", SmartMoney.com, Jan. 5, 2007.
Riley, Barry, "A Quest for Perpetual Profit Machines", Financial Times, Jan. 15, 2007.
Burton, Jonathan, "Putting ETFs in Their Place: Vanguard Indexing Guru Gus Sauter on the Best Kind of Exchanged-Traded Fund", MarketWatch.com, Jan. 9, 2007.
Fox, Justin, "Fundamentally Okay Index Funds", Time.com, Jan. 29, 2007.
Knight, Rebecca et al., "Active Solution Is Within Reach: In the Second Part in a Series, Rebecca Knight and John Authers Say the Asset Class Could Move Beyond the Passive Approach in 2007", Financial Times, Jan. 30, 2007.
Baker, Nick, et al., "Fundamental' Index Sparks Debate: Arnott's FTSE RAFI US 1000 Beats the S&P 500 With a New Stock Weighting Method", Boomberg Markets Magazine, Feb. 2007.
Fazzi, Raymond, "Surprisingly Few Surprises: Value Funds, International Equities and REITS Remained Strong Last Year", Financial Advisor, Feb. 2007.
Berman, David, "Claymore Fundamental Index ETF Among 'New Breed' of ETFs", National Post (Canada), Feb. 1, 2007.
Jacobius, Arleen, "Acting on Faith: Institutional Investors Are Leaping Into Alternative Investments, But Lack Tools to Assess the Risks", Pensions & Investments, Feb. 5, 2007.
Heuer, Max, "All the Rage: Schwab Joins Fundamental Indexers", Institutional Investor Newsletter, Feb. 5, 2007.
Tassell, Tony, "Building on the Fundamentals", Financial Times—U.S. Edition, Feb. 6, 2007.
Bogle, John C., "'Value' Strategies", Wall Street Journal, Feb. 9, 2007.
Lowry, Vincent T., "*undamentally Better: The case for revenue weighting*,"Journal of Indexes, Mar./Apr. 2007.
Tamura, Hirmichi, et al., "Global Fundamental Indices: Do they outperform market-cap weighted indices on a Global Basis?", Security Analysts Journal, Oct. 2005.
Research Affiliates Fundamental Index (TM) Fundamental Index (TM) Enhanced Power Point Presentations.
Unknown, "The most dangerous patent in finance! Is fundamental indexing patently absurd?," Research Comment, Desjardins Securities, May 7, 2007.
Salzinger, Mark, "Interview: Jason Hsu," The Investor's ETF Report, Jan. 2007.
David Hoffman, "Non-Traditional Indexes Gaining Ground in ETF World," Investment News, Feb. 12, 2007.
Rob Wherry, "Ready for an All-ETF Portfolio? Here Are Some Models," SmartMoney.com, Feb. 13, 2007.
Ray Turchansky, "Investment Vehicle Lines Get Blurry: Merits of Passive Versus Active Management Debated," Edmonton Journal, Feb. 14, 2007.
Jonathan Chevreau, "Trading Begins Today on Two New Exchange-Traded Funds From Claymore Investments," National Post (Canada), Feb. 14, 2007.
Trang Ho, "Exchange-Traded Funds: After an Excellent '06, Fast Start for Telecom," Investor's Business Daily, Feb. 16, 2007.
Matthew Richards, "Get Down to the Fundamental Factors," Financial Times, Feb. 17, 2007.
Warren Boroson, "A New Strategy for Stock Indexes," Daily Record, Feb. 18, 2007.
David Hoffman, "Weightings Ignoring Market Caps Gain in Popularity," Pensions&Investments Online, Feb. 19, 2007.
Trang Ho, "Exchange-Traded Funds: Consumer ETFs Reflect Strong Buying Trends," Investor's Business Daily, Feb. 20, 2007.
Diya Gullapalli, "On Tap: Retirement-Oriented Offerings," The Wall Street Journal, Feb. 22, 2007.
Rob Carrick, "For Your RRSP, Take a Page from the CPP," The Globe & Mail (Toronto), Feb. 24, 2007.
Rudy Luukko, "Enhanced Indexing Cuts Costs of Funds," Toronto Star, Feb. 24, 2007.
Brooke Southall, "Malkiel Defends Investing Strategy," Investment News, Feb. 26, 2007.
Brooke Southall, "Merrill Lynch Claymore International Fundamental Index Accelerator Securities, Series 2," Canada Newswire, Feb. 27, 2007.

(56) References Cited

OTHER PUBLICATIONS

Susan Trammell, "Applied Science: How to Jump-Start a Quantitative Investment Process," CFA Magazine, Mar./Apr. 2007.
Eric Uhlfelder, "Challenging EAFE: Managers Who Closely Track Market-Cap-Weighted Country Indexes May Miss Opportunities," Financial Advisor Magazine, Mar. 1, 2007.
John C. Bogle, "False Promises: Index Funds That Promise to Beat the Market," Journal of Indexes, Mar./Apr. 2007.
Vincent T. Lowry, "Fundamentally Better: The Case for Revenue Weighting," Journal of Indexes, Mar./Apr. 2007.
Ron Hylton, "It's the Volatility, Stupid: The Source of Excess Returns in Alternative Index Weighting Schemes," Journal of Indexes, Mar./Apr. 2007.
Eugene F. Fama, Kenneth R. French, "Straight Talk: Nouveau Indexes, Noise and the Nonsense of Active Management," Journal of Indexes, Mar./Apr. 2007.
Sonya Morris, Editor, "Introducing Model Portfolios," Morningstar ETFInvestor, Mar. 1, 2007.
Donald Jay Korn, "ETF Mania!," Financial Planning, Mar. 1, 2007.
David Hoffman, "New ETFs Highlight Belief That Simple Is Good," Investment News, Mar. 5, 2007.
Charles Paikert, "Oyster Bar powwow no pearl for Street," Investment News, Mar. 5, 2007.
Charles Paikert, "AIM Investments® Launches AIM Independence Funds," Yahoo!Finance, Mar. 6, 2007.
Charles Leary, "The Harsh Light of Day," IndexUniverse.com, Mar. 8, 2007.
Warren Boroson, "Tough Questions for Smart Manager," Daily Record, Mar. 25, 2007.
Warren Boroson, "New Fundamental Index Fund Listed in Stockholm," XACT, Mar. 26, 2007.
Tim Middleton, "With Market Reeling, Get More Aggressive," MSN Money, Mar. 27, 2007.
Tim Middleton, "Schwab to Launch Fundamental Index Mutual Funds," Reuters, Mar. 27, 2007.
Christine Ong, "AIM Vies for Lifecycle Edge by Diversification," Ignites.com, Mar. 28, 2007.
Karen Dolan, "Morningstar's Take: PIMCO Fundamental IndexPLUS TR D PIXDX," Morningstar, Mar. 28, 2007.
Jason Hsu, Jason Chia-Shang Tuan, "Indexing for an inefficient market," IPA, Apr. 1, 2007.
Jeffrey R. Kosnett, "Are Your Stocks Simply a Mishmash?," Kiplinger's Personal Finance, Apr. 1, 2007.
Brad Zigler, "Fundamentalism and Asset Allocation," Registered Rep, Apr. 1, 2007.
Kevin Burke, "The ETF Weighting Game," Registered Rep, Apr. 1, 2007.
Kathleen M. McBride, "Catching Up With . . . Jeffrey Mortimer," Investment Advisor Magazine, Apr. 1, 2007.
Sree Vidya Bhaktavatsalam, "Schwab Offers 'Fundamental' Index Funds to Beat Market Returns," Bloomberg, Apr. 2, 2007.
Kathleen M. McBride, "A Better Mousetrap?: Schwab Launches Three Fundamental Index Funds," Investment Advisor Magazine, Apr. 2, 2007.
Jesse Emspak, "Mutual Funds & Personal Finance: Schwab Focuses on Key Fundamentals," Investor's Business Daily, Apr. 2, 2007.
Murray Coleman, "New Twist on Indexing: Mutual Funds Meet ETFs," MarketWatch, Apr. 2, 2007.
Rob Wherry, "Schwab Launches Three Funds Similar to Popular ETFs," SmartMoney.com, Apr. 2, 2007.
Rob Wherry, "Schwab Launches Fundamental Index™ Mutual Funds," Yahoo!Finance, Apr. 2, 2007.
Rob Wherry, "Fundamentally Schwab," IndexUniverse.com, Apr. 5, 2007.
Brooke Southall, "Fundamental Differences Over Schwab Funds," Investment News, Apr. 9, 2007.
Max Heuer, "Schwab Looks Up Market," Defined Contribution & Savings Plan Alert, Apr. 9, 2007.

Katie Benner, "Trying to Build a Better Index Fund: Fortune's Guide to Exchange-Traded Funds Based on Fundamental Indexes," CNN Money, Apr. 11, 2007.
Janet Kidd Stewart, "401(k) options worth looking over: Investors should keep track as firms pitch employers more ETFs," Chicago Tribune, Apr. 15, 2007.
John Kimelman, "ETF Pro Says Stocks Aren't Worth the Risk," Barron's, Apr. 20, 2007.
Peter A. McKay, "More Professors Are Lured Out of Ivory Tower to Street: Demand for New Funds Offers a Chance to Test Theories, Make Money," The Wall Street Journal, Apr. 21, 2007.
Peter A. McKay, "North Dakota Considers Research Affiliates," Money Management Letter, Apr. 23, 2007.
Michael Krause, "S&P 500 Shows Passive Aggressive Side," Yahoo!Finance, Apr. 24, 2007.
Philip Coggan, "Presenting the Portfolio Rebalancing Act: Fundamental Indexation Rejects Weighting Stocks Within a Benchmark by Market Value," Investment Advisor (UK), Apr. 28, 2007.
Paul J. Lim, "The Indexing Wars," U.S. News & World Report, Apr. 29, 2007.
Douglas Appell, "Fundamental Indexing Superiority Disputed: Claim of Cap-Weighting's Drag on Return is 'False'," Pensions &Investments Online, Apr. 30, 2007.
Douglas Appell, "Fund News (excerpt)," No-Load Fund Investor, May 1, 2007.
Kathleen M. McBride, "The IA 25: Robert Arnott," Investment Advisor Magazine, May 1, 2007.
James Picerno, "The ETF revolution is looking more speculative by the day," Wealth Manager, May 1, 2007.
Jonathan Clements, "Why Aiming for Average Has Its own Genius," The Wall Street Journal, May 6, 2007.
Peter Gibson, Ed Sollbach, Jeff Evans, Elizabeth Leung, "Research Comment: Portfolio Strategy & Quantitative Research," Desjardins Securities, May 7, 2007.
Douglas Appell, "Disputing the superiority of fundamental indexing," Investment News, May 7, 2007.
Heather Bell, "Fundamental Analysis," IndexUniverse.com, May 8, 2007.
Heather Bell, "News Briefs: Analysts wary of fundamental indexes," Pensions&Investments Online, May 14, 2007.
Julian Harding, "Worth the Weight," Pensions Management, May 15, 2007.
Vernon Wessels, "Plexus Will Use Arnott's Index to Choose South African Stocks," Bloomberg, May 18, 2007.
Vernon Wessels, "Plexus scores home run with international partner," Fanews, May 18, 2007.
Jackie Cameron, "New threat for active asset managers," Moneyweb, May 18, 2007.
Kazuaki Fujita, "Eye on Fundamentals Buoying Japanese Investors (translated)," Nikkei Financial Daily, May 18, 2007.
Rob Carrick, "The case for blending passive, active indexing," The Globe & Mail (Toronto), May 19, 2007.
Warren Boroson, "Expert predicts volatile market," Daily Record, May 20, 2007.
Regis Nyamakanga, "Stock index system due to launch in SA," Business Day, May 21, 2007.
Jesse Emspak, "Exchange-Traded Funds: Fundamental Indexing Fuels PowerShares ETF," Investor's Business Daily, May 23, 2007.
Jesse Emspak, "Four New Lyxor ETFs on Fundamental Indices Launched in the XTF Segment," Deutsche Borse Group, May 24, 2007.
Rob Carrick, "Got high-dollar blues? Currency neutrality can bring peace of mind," The Globe & Mail (Toronto), May 24, 2007.
Consuelo Mack, "A message from Consuelo (an email to WealthTrack subscribers from Consuelo Mack)," PBS WealthTrack, May 24, 2007.
Kathleen Pender, "Changing indexes for funds," San Francisco Chronicle, May 24, 2007.
Kathleen Pender, "Consuelo Mack WealthTrack: An Interview with Rob Arnott (transcript)," PBS WealthTrack, May 25, 2007.
John Authers, "It's time to point the finger at the index," Financial Times, May 26, 2007.
Burton Malkiel, "Many Happy Returns," Barron's, May 28, 2007.

(56) References Cited

OTHER PUBLICATIONS

Don Vialoux, "More ways to access Japan: Seven exchange-traded funds now available," National Post (Canada), May 28, 2007.
Brad Zigler, "Fundamentalists at the Gates: The Trouble With Cap-Weighted Indexes," Seeking Alpha, May 31, 2007.
Rob Wherry, "Enhanced Index Funds Make a Move on Their Older Brethren," SmartMoney.com, May 31, 2007.
Marla Brill, "Indexing Debate Heats Up," Financial Advisor Magazine, Jun. 1, 2007.
Marla Brill, "The age of investment strategy indices (Roundtable Discussion)," Global Pensions, Jun. 1, 2007.
Stephen P. Brown, "Actively Managed ETFs: The Next Generation?," Registered Rep, Jun. 1, 2007.
David A. Geracioti, "From Theory to Practice," Registered Rep, Jun. 1, 2007.
Laura du Preez, "New index investment method promises more," Personal Finance, Jun. 2, 2007.
Rob Wherry, "The Index-Fund Makeover," The Wall Street Journal, Jun. 2, 2007.
Warren Boroson, "Having 'fun' in market is costly," Daily Record, Jun. 3, 2007.
Sophia Grene, "The fundamental rules apply: Rising interest in wealth weighted indices," Financial Times, Jun. 4, 2007.
Sophia Grene, "IPM launches four Fundamental Index™ Funds," Press Release, Jun. 5, 2007.
David Williams, "Want another 5% on top? (Interview with Paul Stewart)," Business Day, Jun. 7, 2007.
Sophia Grene, "Dilsaver Reveals Schwab Funds' Biggest Secret," MutualFundWire.com, Jun. 7, 2007.
Julia Taylor, "New Funds: Informed Portfolio Management," Financial Times, Jun. 11, 2007.
Pam Black, "Press Release for 'Index Smackdown' debate between Rob Arnott and Gus Sauter," Financial Planning, Jun. 12, 2007.
Lawrence Carrel, "Godfather of Fundamental Indexing Faces Challenge," TheStreet.com, Jun. 13, 2007.
Barry Critchley, "You learn something new every day: New tricks to make the market work better," National Post (Canada), Jun. 15, 2007.
Pauline Skypala, "Spa ETF's Multi-launch set to expand range of ETF trackers," Financial Times, Jun. 18, 2007.
Kathie O'Donnell, "Fundamentals-based index fund has goods, struggles for attention," Investment News, Jun. 18, 2007.
Kathie O'Donnell, "Genworth Financial's AssetMark Introduces New Fundamental Index™ Funds," Press Release, Jun. 18, 2007.
Maureen Darrigo, "Market Pulse: BNN Market Call—Som Seif," The Globe & Mail (Toronto), Jun. 19, 2007.
Maureen Darrigo, "PowerShares to Launch Four International ETFs Based on FTSE RAFI™ Indexes at the New York Stock Exchange Jun. 25, 2007," Press Release, Jun. 19, 2007.
Jesse Emspak, "Exchange-Traded Funds: PowerShares Launches Foreign Index Funds," Investor's Business Daily, Jun. 20, 2007.
Ellen Roseman, "Canadians spread cash worldwide," Toronto Star, Jun. 20, 2007.
John Kimelman, "Sampling the ETF Smorgasbord," Barron's, Jun. 22, 2007.
Kevin Bailey, "New Funds Are Old Hat," Herald Sun (Australia), Jun. 25, 2007.
Matthew Hougan, "International RAFI ETFs List on ARCA," IndexUniverse.com, Jun. 25, 2007.
Jonathan Chevreau, "One in Ten Licensed for ETF Run-Up," National Post (Canada), Jun. 25, 2007.
Jonathan Chevreau, "PowerShares Launches Four New FTSE RAFI™ International ETFs on NYSE Arca," Press Release, Jun. 25, 2007.
Jonathan Chevreau, "Hirings: AssetMark Investment Services," Pensions&Investments Online, Jun. 25, 2007.
Jonathan Chevreau, "New U.S. ETFs include Sudan-Free social ETF," Reuters, Jun. 25, 2007.
Jonathan Chevreau, "PowerShares Expands Its Global ETF Initiative Strategy at NYSE," Press Release, Jun. 25, 2007.
Tim Middleton, "Don't follow the dumb money," MSN Money, Jun. 26, 2007.
Matthew Hougan, "ETF Watch: Jun. 7-25," IndexUniverse.com, Jun. 27, 2007.
Rob Wherry, "New From Morningstar's Conference," SmartMoney.com, Jun. 28, 2007.
Mark Salzinger, "Navigating Choppier Waters With ETFs, Funds & Stocks," No-Load Fund Investor, Jul. 1, 2007.
John Spence, "Tempest in an index fund: Robert Arnott and John Bogle clash over best indexing strategy," MarketWatch, Jul. 1, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Jul. 5, 2007.
Trang Ho, "Foreign ETF Assets Up 24% So Far This Year," Investor's Business Daily, Jul. 11, 2007.
Charles Paikert, "Index battle (p. 2)," Investment News, Jul. 16, 2007.
Sonya Morris, "Measuring the Market's Value," Morningstar, Jul. 16, 2007.
Gastineau, Gary L, "The Cutting Edge," IndexUniverse.com, Jan. 2007.
International Search Report issued in related PCT/US2005/002345 mailed Dec. 19, 2006.
Kalotay, Andrew J. et al., "A Model for Valuing Bonds and Embedded Options," Financial Analysts Journal, May-Jun. 1993, pp. 35-46.
Curran, Greg, "Security Selection for Bond Index Portfolios," Mellon Institutional Asset Management, Standish Mellon, Copyright 2005, publication date unknown.
Jaffe, Jeffrey et al., "Earnings Yields, Market Values, and Stock Returns," The Journal of Finance, vol. XLIV, No. 1, Mar. 1989.
Author Unknown, "Bond Basics: Selecting a Fixed Income Benchmark," www.pimco.com, a company of Allianz, Jul. 2006, pp. 1-5.
Davis, James L., The Cross-Section of Realized Stock Returns: The Pre-Compustat Evidence, The Journal of Finance, vol. 49, No. 5 (Dec. 1994), pp. 1579-1593.
Bernard, Victor et al., "Accounting-Based Stock Price Anomalies: Separating Market Inefficiencies from Risk," 1996 Contemporary Accounting Research Conference, Sep. 1996, pp. 1-57.
Siracusano, Luciano, "A Fundamental Challenge," The Wisdom Tree, Aug. 9, 2007.
Author Unknown, "The Role of high Yield Bonds," www.pimco.com, Publication, Feb. 2006, pp. 1-5.
Author Unknown, "Emerging Markets May Offer Opportunity to Enhance Returns," www.pimco.com, an Allianz Company, Oct. 2005, pp. 1-3.
Author Unknown, "About Corporate Bonds, Overview," www.investinginbonds.com, The Securities Industry and Financial markets Association, 2005, p. 1.
Author Unknown, "Bond Basics, Fundamental Investment Strategies," www.investinginbonds.com, the Securities Industry and Financial Markets Association, 2005, p. 1.
Author Unknown, "Types of Bonds, Bond and Bond Funds; What You Should Know Before Deciding," www.investinginbonds.com, The Securities Industry and Financial Markets Association, 2005, pp. 1-2.
Lakonishok, Josef et al., NBER Working Paper Series, "Contrarian Investment, Extrapolation, and Risk," National Bureau of Economic Research, Working Paper No. 4360, May 1993.
Chan, Louis K.C., et al., "Fundamentals and Stock Returns in Japan," The Journal of Finance, vol. 46, No. 5 (Dec. 1991), pp. 1739-1764.
Chan, Louis K.C., et al., "The Risk and Return from Factors," The Journal of Financial and Quantitative Analysis, vol. 33, No. 2 (Jun. 1998), pp. 159-188.
Banz, Rolf W. et al., "Sample-Dependent Results Using Accounting and Market Data: Some Evidence," The Journal of Finance, vol. 41, No. 4 (Sep. 1986), pp. 779-793.
Bergstresser, Daniel, et al., "Investment Taxation and Portfolio Performance," Preliminary Draft, Boston College Finance Wednesday Seminar and the 2006 UNC Tax Symposium, Apr. 12, 2006.
Office Action issued Aug. 19, 2009 in related U.S. Appl. No. 10/961,404.
Office Action dated Nov. 25, 2008 issued in related U.S. Appl. No. 10/961,404.

(56) References Cited

OTHER PUBLICATIONS

Office Action issued Dec. 5, 2008 in related CN application No. 200580000459.0.
Decision issued Feb. 2, 2009 in related GB application No. 0616163.2.
Decision issued Feb. 19, 2009 in related GB application No. 0222239.6.
International Search Report and Written Opinion issued Dec. 21, 2007 in related Appl. PCT/US2006/042430.
Kaplan, Paul, "Let's Not All Become Fundamental Indexers Just Yet," Journal of Indexes, Jan./Feb. 2009, pp. 34-37.
Point/Counterpoint, "The Fundamental Debate," Journal of Indexes, Jan./Feb. 2009, pp. 30-33, continued on p. 51.
Prestbo, John, "In Perspective; Weighting It Out," Journal of Indexes, Jan./Feb. 2009, pp. 38-40.
Business Wire, Investment Technologies, (IVES), Jan. 6, 1989, p. 1.
Arnott, et al., "Fundamental Indexation," Financial Analysis Journal, vol. 61, No. 2, pp. 83-89, Mar./Apr. 2005.
Arnott et al., "Redefining Indexation," Research Affiliates, LLC, pp. 1-24, 2004.
Author Unknown, "MSCI Methodology Book: MSCI Global Value and Growth Index Series," Morgan Stanley Capital International Inc., pp. 1, 2, 8-11, 2003.
Author Unknown, "About the America's Fastest Growing companies Family of Stock Indexes," America's Fastest Growing Companies, Jan. 2002.
Author Unknown, "America's Fastest Growing Companies Index," America's Fastest Growing Companies, Jan. 2002.
Author Unknown, "America's Fastest Growing Companies Midcap Index," America's Fastest Growing Companies, Jan. 2002.
Author Unknown, "America's Fastest Growing Companies LargeCap Index," America's Fastest Growing Companies, Jan. 2002.
Author Unknown, "America's Fastest Growing Companies Total Growth Index," America's Fastest Growing Companies, Jan. 2002.
Author Unknown, "CME: Goldman Sachs Commodity Index (GSCI) to include CME Feeder Cattle in 2002 INdex Weighting," Nov. 7, 2001.
Warren Buffet, "Letter to Bershire Hathaway, Inc. Shareholders," pp. 3, 16, 19, 1999.
Chernoff, Joel, "A New Look in Benchmarks: Consultant Devises Alternative Based on Country Wealth," Pensions & Investments Online, Issue Date: Apr. 14, 1997.
Raub, David, "Rethinking Indexing," www.NorthBaybiz.com, Issue: Apr. 2006.
Author Unknown, "Methodology for the Management of the FTSE RAFI (Research Affiliates Fundamental Index) Index Series," The FTSE RAFI Index Series Ground Rules, Version 1.1, Dec. 2005.
Serwer, Andy, "Brains, Pluck, and Bucks," CNNMoney.com/magazines/fortune/fortune_archives, Jul. 3, 2006.
Arnott, Robert, "Retrospectives on Selected Fundamental Index Strategies," Research Affiliates, Dec. 2005.
Treynor, Jack, "Perspectives; Why Market-Valuation-Indifferent Indexing Works," Financial Analysts Journal, vol. 61, No. 5, CFA Institute, Sep./Oct. 2005.
Arnott, Rob and Hennessy, David, "Research Affiliates Fundamental Index," Feb. 2006.
Author Unknown, "PowerShares FTSE RAFI US 1000 Portfolio," www.powershares.com, PRF Facts, Sep. 30, 2005.
Markowitz, Harry M., "Market Efficiency: A Theoretical Distinction and So What?" www.cfapubs.org, Financial Analysts Journal, Reflections, CFA Institute, Sep./Oct. 2005, pp. 17-30.
Author Unknown, "PowerShares Exchange-Traded Fund Trust," PowerShares FTSE RAFI US 1000 Portfolio-PRF, Prospectus Supplement dated Feb. 22, 2006, Prospectus dated Dec. 19, 2005.
Hsu, Jason C. and Campollo, Carmen, "New Frontiers in Index Investing," Journal of Indexes, Jan./Feb. 2006, pp. 32-34, 36, 37, 58.
Makepeace, Mark, "FTSE: Coming to America," Journal of Indexes, Jan./Feb. 2006, pp. 38-39.
Blanchett, David, "Building the Best Index; Equal-Weighting vs. Market Capitalization," Journal of Indexes, Jan./Feb. 2006, pp. 40-42.
Gastineau, Gary, "Is Indexing Ready for the Challenges of the 21st Century?", Journal of Indexes, The Cutting Edge, Mar./Apr. 2006, pp. 32-35.
Author Unknown, "William F. Sharpe Awards—Plus Editorial Board Meeting Excerpts," Journal of Indexes, Mar./Apr. 2006, pp. 36-41.
Author Unknown, "FTSE/RAFI PowerShares ETF Launches on Big Board," Journal of Indexes, Mar./Apr. 2006, pp. 51-52.
Leake, Thomas and Morris, David, "Where Next for the Index Business Model? Bringing Low Cost to the World of Active Management," Journal of Indexes, May/Jun. 2006, pp. 22-26.
Schoenfeld, Steven A. and Ginis, Robert E., "Worth Weighting For? A Survey and Critique of Alternatively Weighted Indexes," Journal of Indexes, May/Jun. 2006, pp. 10-21.
Author Unknown, "CaIPERS Goes Fundamental," News, Indexing Developments, Journal of Indexes, May/Jun. 2006, p. 52.
Arnott, Robert D., "What Cost "Noise"?" Financial Analysts Journal, Editor's Corner, CFA Institute, Mar./Apr. 2005, pp. 10-14.
Author Unknown, "Dividend Party Goes Global," Journal of Indexes, Mar./Apr. 2006, p. 52.
Author Unknown, DRM Portion of CaIPERS' Presentation Given on Jan. 12, 2001, 4 pages.
D. Morris, AIMIC Press Conference Presentation—Tokyo, May 29, 1998 (10 pages).
J. Chernoff, "A New Look in Benchmarks: Consultant Devises Alternative Based on Country Wealth," Pensions & Investments Onling (pionline.com), Apr. 14, 1997 (4 pages).
Author Unknown, "Index Industry Leaders . . . In Their Own Words," Journal of Indexes, Sep./Oct. 2006, pp. 10-21.
Author Unknown, FRC Monitor, "Industry Trends," Nov. 2005.
Author Unknown, "Separately Managed Accounts to Become Dominant Vehicle for Individual Securities," Tower Group Research, www.advisorpage.com/modules, Advisor Page, Competitive Intelligence, Feb. 6, 2008.
Pruitt, Ron, "The Tax Advisor: All Hail the Overlay Manager," Placemark Investments, Investment Advisor, Apr. 2005.
Pruitt, Ron, "A Comprehensive View of After-tax Investing and Tax Efficiency," Placemark Investment, 2002.
Coyle, Thomas, "SunGard Hunts Trust Assets With Overlay Offering," SunGard Managed Account Solutions, www.sungard.com/Managed Accounts, Aug. 30, 2004.
Reinhart, Len, "The Bigger Picture: Will Overlay Management Become the New Business Model for Separately Managed Accounts?" Financial-Planning.com, Apr. 1, 2007.
Search Results, TowerGroup, Sep. 25, 2007.
Reinhart, Len, "The Next Big Thing: Unified Managed Accounts Must Mature Some More Before They Are Ready for Prime Time." Financial-Planning.com, Dec. 1, 2003.
Author Unknown, "Generation OPM," Wall Street Technology, www.wallstreetandtech.com, Oct. 25, 2004.
Geffen, David A., "SMAs Take on Multiple Personalities," www.registeredrep.com, May 1, 2003.
Arnott, Robert D. et al., "The Management and Mismanagement of Taxable Assets," First Quadrant, L.P., Investment Management Reflections, 2000, No. 2.
FRC Monitor, Jan. 2001, pp. 1-12.
Waid, Robert, "Fundamentally Active," IndexUniverse.com, www.indexuniverse.com/index, Feb. 8, 2008, pp. 1-6.
Hemminki, Julius et al., "Fundamental Indexation in Europe," Journal of Asset Management, vol. 8, 6, pp. 401-405, www.palgrave-journals.com/jam, Oct. 26, 2007.
Morris, Stephen, "CARESS Working Paper #95-13 Speculative Investor Behavior and Learning," Department of Economics, University of Pennsylvania, Philadelphia, PA, May 1995.
Author Unknown, "MSCI to Adjust for Free Float and to Increase Coverage to 85%," MSCI Press Release, www.msci.com, Geneva, Dec. 10, 2000, pp. 1-3.
Brandhorst, Eric, "MSCI's Methodology Enhancements: Free-Float and Capitalization Extension," www.ssga.com, Jul. 20, 2001, pp. 1-6.

(56) References Cited

OTHER PUBLICATIONS

Chance, Don M., "Six One Way, Half-A-Dozen The Other," www.indexuniverse.com/component/content/article/4035, Trading Places, May/Jun. 2008.

Brock, Woody, The Role of Pricing Model Uncertainty,:—Resolving Four Paradoxes in Today's Market Behavior, Strategic Economic Decisions, SED Profile May 2008.

Lydon, Tom; Wasik, John F., iMoney, "Profitable Exchange-Traded Fund Strategies for Every Investor," Chapter 2, The Art of Indexing Using the iMoney Plan, date unknown.

Author Unknown, "The Role of Pricing Model Uncertainty"—Resolving Four Paradoxes in Today's Market Behavior,—Strategic Economic Decisions, www.SEDinc.com, SED Profile, May 2008.

Office Action from related U.S. Appl. No. 10/961,404 mailed Mar. 13, 2008.

Office Action from related U.S. Appl. No. 11/196,509 mailed Mar. 19, 2008.

Bazley, John D., Financial Accounting Concepts and Uses, PWS-Kent Publishing Company, 1988, p. 4.

Fernholz, Robert, Diversity-Weighted Indexing, Journal of Portfolio Management, Winter 1998, pp. 74-82.

International Search Report and Written Opinion from PCT/US2008/003762 mailed Sep. 10, 2008.

International Search Report and Written Opinion issued in PCT/US2007/018534 mailed Sep. 17, 2008.

Office Action issued Oct. 3, 2008 in related U.S. Appl. No. 10/159,610.

Robert Arnott, Fundamental Indexation, 2004, 36 pages.

Interrogatory in JP Appeal 2012-4715 of Counterpart JP Application No. 2006-552146, Sep. 18, 2012.

Decision of Rejection in JP 2008-547223, Oct. 30, 2012.

Notice of Preliminary Rejection in KR Counterpart KR 10-2008-7017731, Oct. 29, 2012.

\* cited by examiner

USING ACCOUNTING DATA BASED INDEXING TO CREATE A PORTFOLIO OF FINANCIAL OBJECTS

CROSS-REFERENCE TO RELATED APPLICATIONS

The present application is a continuation-in-part of U.S. patent application Ser. No. 11/931,913, filed Oct. 31, 2007, now U.S. Pat. No. 8,005,740, issued Aug. 23, 2011, which is a continuation-in-part of and claims the benefit of U.S. Patent Application No. 60/896,867, filed Mar. 23, 2007, the contents of which are incorporated herein by reference in their entirety and are of common assignee.

U.S. patent application Ser. No. 11/931,913 is also a continuation-in-part of and claims the benefit of U.S. patent application Ser. No. 11/509,002, filed Aug. 24, 2006, the contents of which are incorporated herein by reference in their entirety and are of common assignee, which claims the benefit of (i) U.S. Patent Application No. 60/751,212, filed Dec. 19, 2005, the contents of which are incorporated herein by reference in their entirety and are of common assignee, and (ii) U.S. patent application Ser. No. 11/196,509, filed Aug. 4, 2005, the contents of which are incorporated herein by reference in their entirety and are of common assignee, which claims the benefit (a) of U.S. patent application Ser. No. 10/159,610, filed Jun. 3, 2002, the contents of which are incorporated herein by reference in their entirety and are of common assignee, and (b) U.S. patent application Ser. No. 10/961,404, filed Oct. 12, 2004, the contents of which are incorporated herein by reference in their entirety and are of common assignee, which in turn claims the benefit of (A) U.S. Patent Application No. 60/541,733, filed Feb. 4, 2004, the contents of which are incorporated herein by reference in their entirety and are of common assignee.

The present application also claims the benefit of, and is a continuation-in-part of each of copending, related U.S. patent application Ser. No. 12/619,668, filed Nov. 16, 2009; U.S. patent application Ser. No. 12/554,961, filed Sep. 7, 2009; U.S. patent application Ser. No. 12/752,159, filed Apr. 1, 2010; and U.S. patent application Ser. No. 12/819,199, filed Jun. 19, 2010; the contents of all of which are incorporated herein by reference in their entirety and are of common assignee.

BACKGROUND OF THE INVENTION

1. Field of the Invention

Exemplary embodiments relate generally to securities investing, and more particularly to construction and use of indexes and portfolios based on indexes.

2. Related Background

Conventionally, there are various broad categories of securities portfolio management. One conventional securities portfolio management category is active management wherein the securities are selected for a portfolio individually based on economic, financial, credit, and/or business analysis; on technical trends; on cyclical patterns; etc. Another conventional category is passive management, also called indexing, wherein the securities in a portfolio duplicate those that make up an index. The securities in a passively managed portfolio are conventionally weighted by relative market capitalization weighting or equal weighting. Another middle ground conventional category of securities portfolio management is called enhanced indexing, in which a portfolio's characteristics, performance and holdings are substantially dominated by the characteristics, performance and holdings of the index, albeit with modest active management departures from the index.

The present invention relates generally to the passive and enhanced indexing categories of portfolio management. A securities market index, by intent, reflects an entire market or a segment of a market. A passive portfolio based on an index may also reflect the entire market or segment. Often every security in an index is held in the passive portfolio. Sometimes statistical modeling is used to create a portfolio that duplicates the profile, risk characteristics, performance characteristics, and securities weightings of an index, without actually owning every security included in the index. (Examples could be portfolios based on the Wilshire 5000 Equity Index or on the Lehman Aggregate Bond Index.) Sometimes statistical modeling is used to create the index itself such that it duplicates the profile, risk characteristics, performance characteristics, and securities weightings of an entire class of securities. (The Lehman Aggregate Bond Index is an example of this practice.)

Indexes are generally all-inclusive of the securities within their defined markets or market segments. In most cases indexes may include each security in the proportion that its market capitalization bears to the total market capitalization of all of the included securities. The only common exceptions to market capitalization weighting are equal weighting of the included securities (for example the Value Line index or the Standard & Poors 500 Equal Weighted Stock Index, which includes all of the stocks in the S&P 500 on a list basis; each stock given equal weighting as of a designated day each year) and share price weighting, in which share prices are simply added together and divided by some simple divisor (for example, the Dow Jones Industrial Average). Conventionally, passive portfolios are built based on an index weighted using one of market capitalization weighting, equal weighting, and share price weighting.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index funds, or investors who desire their funds to closely track an index, are compelled to have a higher weighting in companies whose share prices or market capitalizations have already risen and a lower weighting in companies that have seen a decline in their share price or market capitalization.

Advantages of passive investing include: a low trading cost of maintaining a portfolio that has turnover only when an index is reconstituted, typically once a year; a low management cost of a portfolio that requires no analysis of individual securities; and/or no chance of the portfolio suffering a loss—relative to the market or market segment the index reflects—because of misjudgments in individual securities selection.

Advantages of using market capitalization weighting as the basis for a passive portfolio include that the index (and therefore a portfolio built on it) remains continually 'in balance' as market prices for the included securities change, and that the portfolio performance participates in (i.e., reflects) that of the securities market or market segment included in the index.

The disadvantages of market capitalization weighting passive indexes, which can be substantial, center on the fact that any under-valued securities are underweighted in the index and related portfolios, while any over-valued securities are over weighted. Also, the portfolio based on market capitalization weighting follows every market (or segment) bubble up and every market crash down. Finally, in general, portfolio securities selection is not based on a criteria that reflects a better opportunity for appreciation than that of the market or market segment overall.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index funds, or investors who desire their funds to closely track an index, are compelled to have a higher weighting in companies whose share prices or market capitalizations have already risen and a lower weighting in companies that have seen a decline in their share price or market capitalization.

Price or market capitalization based indices can contribute to a 'herding' behavior on the behalf of investors by effectively compelling any of the funds that attempt to follow these indices to have a larger weighting in shares as their price goes up and a lower weighting in shares that have declined in price. This creates unnecessary volatility, which is not in the interests of most investors. It may also lead to investment returns that have had to absorb the phenomenon of having to repeatedly increase weightings in shares after they have risen and reduce weightings in them after they have fallen.

Capitalization-weighted indexes ("cap-weighted indexes") dominate the investment industry today, with approximately $2 trillion currently invested. Unfortunately, cap-weighted indexes suffer from an inherent flaw as they overweight all overvalued stocks and underweight all undervalued stocks. This causes cap-weighted indexes to underperform relative to indexes that are immune to this shortcoming. In addition, cap-weighted indexes are vulnerable to speculative bubbles and emotional bear markets which may unnaturally drive up or down stock prices respectively.

Equal-weighted indexation is a popular alternative to cap-weighting but one that suffers from its own shortcomings. One significant problem with equal-weighted indexes is that they come out of the same cap-weighted universes as cap-weighted indexes. For example, the S&P Equal Weighted Index simply re-weights the 500 equities that comprise the S&P 500, retaining the bias already inherent to cap-weighted indexes.

High turnover and associated high costs are additional problems of equal-weighted indexes. Equal-weighted indexes include small illiquid stocks, which are required to be held in equal proportion to the larger, more liquid stocks in the index. These small illiquid stocks must be traded as often as the larger stocks but at a higher cost because they are less liquid.

What is needed then is an improved method of weighting financial objects in a portfolio based on an index that overcomes shortcomings of conventional solutions.

SUMMARY

In an exemplary embodiment a system, method and computer program product for index construction and/or portfolio weighting of financial objects for the purpose of investing in the index is disclosed.

Exemplary embodiments may use accounting data based indexing, i.e., accounting data based measures of firm size, rather than market capitalization, to construct an index of financial objects Construction of an index, according to an exemplary embodiment, may include selecting financial objects to be included in an index, and weighting the financial objects in the index. By avoiding the inherent valuation bias of cap-weighted indexes, accounting data based indexes (ADBI) may outperform cap-weighted indexes by as much as 200 bps in the US and by more than 250 bps internationally, based on extensive back testing (to 1962 in the US and to 1988 internationally).

An exemplary embodiment may use four specific metrics in ADBI construction: book equity value; income (free cash flow); sales; and/or gross dividends, if any. Another exemplary embodiment may include additional and/or alternative metrics. Metrics may be varied by country according to another exemplary embodiment. An ADBI construction strategy may offer several advantages. For example, ADBI may outperform cap-weighted indexes. Additionally, ADBI may be adaptable to distinct strategies. ADBI may be used to construct either large or small company indexes, industry sector indexes, geographic indexes and others. ADBI may also effectively limit portfolio risk by providing the benefits of traditional cap-weighted indexes, including diversification, broad market participation, liquidity and low turnover, while generating incrementally higher returns with somewhat lower volatility than comparable cap-weighted indexes. ADBI may also provide protection against market bubbles and fads because a stock's weight in the index is immune to errors in stock valuation.

An exemplary embodiment may be a method of constructing a portfolio of financial objects, including the steps of: purchasing a portfolio of a plurality of mimicking or resampling of financial objects to obtain and/or create a mimicking portfolio, where performance of the portfolio of mimicking or resampled financial objects substantially mirrors the performance of an accounting data based index based portfolio without substantially replicating the accounting data based index based portfolio.

The embodiment may further include: obtaining and/or using a risk model for the portfolio of mimicking or resampled financial objects, where the risk model mirrors a risk model of the accounting data based index.

The performance of the portfolio of mimicking or resampled financial objects may substantially mirror the performance of the accounting data based index based portfolio without substantially replicating financial objects and/or weightings in the accounting data based index based portfolio. The risk model may be substantially similar to the Fama-French factors, where the Fama-French factors may include at least one of size effect, value effect, and/or momentum effect.

A financial object, according to one exemplary embodiment, may include: at least one unit of interest in at least one of: an asset; a liability; a tracking portfolio; a resampled portfolio, a financial instrument and/or a security, where the financial instrument and/or the security denotes a debt, an equity interest, and/or a hybrid; a financial position, a currency position, a trust, a real estate investment trust (REIT), a portfolio of trusts and/or REITS, a security instrument, an equitizing instrument, a commodity, an exchange traded note, a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments. In an exemplary embodiment, the financial object may include a debt instrument, including, according to one exemplary embodiment, any one or more of a bond, a debenture, a subordinated debenture, a mortgage bond, a collateral trust bond, a convertible bond, an income bond, a guaranteed bond, a serial bond, a deep discount bond, a zero coupon bond, a variable rate bond, a deferred interest bond, a commercial paper, a government security, a certificate of deposit, a Eurobond, a corporate bond, a government bond, a municipal bond, a treasury-bill, a treasury bond, a foreign bond, an emerging market bond, a developed market bond, a high yield bond, a junk bond, a collateralized instrument, an exchange traded note (ETN), and/or other agreements between a borrower and a lender.

Another exemplary embodiment, may be a method of constructing a portfolio of financial objects, including the steps of: purchasing a plurality of financial objects according to weightings substantially similar to the weightings of an accounting data based index, where performance of the plurality of financial objects substantially mirrors the performance of the accounting data based index without using substantially the same financial objects in the accounting data based index.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

Another exemplary embodiment, the may be a method of constructing a portfolio of financial objects, including the steps of: determining overlapping financial objects appearing in both an accounting data based index (ADBI) and a conventional weighted index, where the conventionally weighted index may include an index weighted based on at least one of capitalization, equal weighting, and/or share price weighting, and where the ADBI may include weighting based on at least one accounting data based factor and not based on any of capitalization, equal weighting, and/or share price weighting index; comparing weightings of the overlapping financial objects in the ADBI with weightings of the overlapping financial objects in the conventionally weighted index; and/or purchasing at least one financial object based on the comparing.

The purchasing may include at least one of: purchasing a long position in at least one overlapping financial object when the comparing indicates the at least one overlapping financial object is over weighted in the non-capitalization weighted index relative to the conventional index; and/or purchasing a short position in at least one overlapping financial object when the comparing indicates the at least one overlapping financial object is underweighted in the non-capitalization weighted index relative to the conventional index.

The purchasing of the long and/or short positions may be implemented by using total return swaps. The long and/or short positions may be held for one year.

The embodiment may further include rebalancing the portfolio. The rebalancing may include: at least one of creating new long and/or short positions using cash flow from new capital contributions; and/or altering existing long and/or short positions using cash flow from new capital contributions.

The embodiment may further include using leverage to obtain the long and/or short positions.

The comparing may include calculating a difference between the weightings, and/or calculating a difference between arithmetically modified values of the weightings. The arithmetically modified values of the weightings may include square roots of the weightings.

The comparing may include calculating a difference based on tiers of weightings using stratified sampling.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, closed end fund, an investment vehicle, and/or any other pooled and/or separately managed investments or accounts.

In another exemplary embodiment, the present invention may be a method of constructing a portfolio of financial objects, including the steps of: determining non-overlapping financial objects appearing in only one of either an accounting data based index (ADBI) or a conventional weighted index by comparing financial objects in an ADBI with financial objects in a conventionally weighted index, where the conventionally weighted index may include conventionally weighting based on at least one of capitalization, equal weighting, and/or share price weighting, and where the ADBI may include accounting data based weighting on at least one accounting data based factor and not based on any of capitalization, equal weighting, and/or share price weighting index; weighting the non-overlapping financial objects appearing only in the ADBI by accounting data based weighting; weighting the non-overlapping financial objects appearing only in the conventionally weighted index by the conventional weighting; and/or purchasing financial objects based on the weightings.

The accounting data based weighting may include: (a) gathering data about a plurality of financial objects; (b) selecting a plurality of financial objects to create an index of financial objects; and/or (c) weighting each of the plurality of financial objects selected in the index based on an objective measure of scale and/or size based on accounting data of a company associated with each of the plurality of financial objects, where the weighting may include: (i) weighting at least one of the plurality of financial objects based on accounting data; and/or (ii) weighting other than weighting based on at least one of market capitalization, equal weighting, and/or share price weighting.

The embodiment may further include weighting each of the plurality of financial objects, where each of the financial objects may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, closed end fund, an investment vehicle, and/or any other pooled and/or separately managed investments.

An exemplary embodiment may further include weighting each of the plurality of financial objects, where the each of the financial objects may include a stock.

Exemplary objective measures of scale and/or size may include weighting based on any dividends, book value, cash flow, and/or revenue. An exemplary embodiment may include additional metrics. The embodiment may further include equally weighting each objective measure of scale and/or size.

The embodiment may further include weighting based on the objective measure of scale and/or size, where the objective measure of scale and/or size may include a measure of company size and/or country or industry sector size associated with each of the plurality of financial objects.

The measure of company size may include at least one of: inventory, revenue, sales, income, book income, taxable income, earnings growth rate, earnings before interest and tax (EBIT), earnings before interest, taxes, depreciation and amortization (EBITDA), retainer earnings, number of employees, capital expenditures, salaries, book value, assets, fixed assets, current assets, quality of assets, operating assets, intangible assets, dividends, gross dividends, dividend yields, cash flow, liabilities, losses, long term liabilities, short term liabilities, liquidity, long term debt, short term debt, bonds, corporate bonds, net worth, shareholder equity, goodwill, research and development expenditures, costs, cost of goods sold (COGS), liquidity and/or research and development costs.

The measure of country size may include measures relating to the economy, demographics, geographic scale, population, area, gross domestic product and its growth, oil consumption, inflation, unemployment, reserves of natural and/or man-made resources and/or products, relative corruption (as perhaps measured by indices), expenditures, democracy and/or political factors, social and/or religious factors, expenditures, gross national income (GNI), gross national product (GNP), and/or gross national debt (GND). Derivatives of the foregoing may also be included, such as, for example, changes, averages and ratio between any of the foregoing measures, as well as per capita numbers thereof.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

Another exemplary embodiment may be a method, executed on a data processing system, including the steps of: creating an accounting data based index (ADBI) based on accounting data including: selecting a universe of financial objects, and selecting a subset of the universe based on the accounting data to obtain the ADBI; and/or creating a portfolio of financial objects using the ADBI, including weighting the financial objects in the portfolio according to a measure of value of a company associated with each financial object in the portfolio.

The universe according to an exemplary embodiment may include at least one of: a sector; a market; a market sector; an industry sector; a geographic sector; an international sector; a sub-industry sector; a government issue; and/or a tax exempt financial object.

The accounting based data used in weighting as a measure of value of the company associated with the financial object, may include at least one of: any dividends; revenue; cash flow; and/or book value. An exemplary embodiment may include selecting and/or weighting constituents based on industry sector based metrics.

The accounting based data may be weighted relatively dependent on the geography and/or other country metric of the company associated with the financial object The financial object may include: a debt instrument; at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

Another exemplary embodiment may be a computer-implemented method for construction and management of an index and at least one index fund containing a portfolio of financial objects based on the index, where weighting of the index is based on accounting based data rather than on stock prices or market capitalization or equal weighting, the computer-implemented method including the steps of: creating an index, and at least one index fund containing a portfolio of financial objects, where the constituent weightings of the companies issuing the financial objects in the index fund are based upon accounting based data regarding the companies associated with the financial objects, where the accounting based data may includes any dividends, cash flow, revenues, and/or book value.

The embodiment may further include: creating the index, and the at least one index fund containing a portfolio of financial objects where the constituent weightings are based upon any ratio of accounting based data, or any manipulation of accounting based data, that is contained within a standard company annual report and accounts.

The embodiment may further include: creating the index, and the at least one index fund containing a portfolio of financial objects where the constituent weightings are based upon any ratio of accounting based data per share, or any manipulation of accounting based data, that is contained within a standard company annual report and accounts.

The embodiment may further include: managing an accounting based data index, and at least one index fund containing a portfolio of financial objects based on the index including: altering the relative weightings of the financial objects within the at least one index fund as the accounting based data concerning the companies associated with the financial objects changes.

The altering may include at least one of: altering based on at least one of: changes in relative weightings of financial objects in the index; and/or changes in the financial objects that are members of the index outside the sample changes; and/or altering at the time of at least one of when, and/or after at least one company associated with a financial object of the index reports its accounting information.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity of any kind, including an interest in, or rights relating to: a hedge fund, an exchange traded fund (ETF), a fund of funds, a mutual fund, an investment vehicle, and/or any other pooled and/or separately managed investments.

The measure of company size may include at least one of: a financial ratio of a company; a ratio of accounting based data; a ratio of accounting based data per share; a ratio of a first accounting based data to a second accounting based data; a liquidity ratio; a working capital ratio; a current ratio; a quick ratio; a cash ratio; an asset turnover ratio; a receivables turnover ratio; an average collection period ratio; an average collection period ratio; an inventory turnover ratio; an inventory period ratio; a leverage ratio; a debt ratio; a debt-to-equity ratio; an interest coverage ratio; a profitability ratio; a return on common equity (ROCE) ratio; profit margin ratio; an earnings per share (EPS) ratio; a gross profit margin ratio; a return on assets ratio; a return on equity ratio; a dividend policy ratio; a dividend yield ratio; a payout ratio; a capital market analysis ratio; a price to earnings (PE) ratio; and/or a market to book ratio.

In accordance with present embodiments, a method, executed on a data processing system, includes: creating an accounting data based index (ADBI) based on accounting data including: selecting a universe of financial objects, selecting a subset of the financial objects of the universe based on at least one of the accounting data, and weighting the subset of the universe according to at least one of the accounting data to obtain the ADBI; and creating a portfolio of financial objects using the ADBI, including the subset of selected and weighted financial objects.

In an embodiment, the universe may include at least one of: a sector; a market; a market sector; an industry sector; a geographic sector; an international sector; a sub-industry sector; a government issue; and/or a tax exempt financial object; agriculture, forestry, fishing and/or hunting industry sector; mining industry sector; utilities industry sector; construction industry sector; manufacturing industry sector; wholesale trade industry sector; retail trade industry sector; transportation and/or warehousing industry sector; information industry sector; finance and/or insurance industry sector; real estate and/or rental and/or leasing industry sector; professional, scientific, and/or technical services industry sector; management of companies and/or enterprises industry sector; administrative and/or support and/or waste management and/or remediation services industry sector; education services industry sector; health care and/or social assistance industry sector; arts, entertainment, and/or recreation industry sector; accommodation and/or food services industry sector; other services (except public administration) industry sector; and/or public administration industry sector.

In an embodiment, the accounting based data used in weighting as a measure of value of the company associated with the financial object, may include at least one of: dividends, if any; revenue; cash flow; book value; collateral; assets; distributions; funds from operations; adjusted funds from operations; earnings; income; liquidity; country metrics including at least one of: economic metrics, area, population, unemployment rate, reserves, resource consumption, democracy index, corruption index, government debt, private debt, government expenditures, nominal interest rate, commercial paper yield, consumer price index (CPI), purchasing power, relation of purchasing power to nominal exchange rate and any deviations from historical trend, and/or country current account flow; the economic metrics including at least one of: a gross domestic product (GDP), a gross national product (GNP), a gross net income (GNI), and/or a gross national debt (GND); industry metrics including at least one of: industry growth rate, total capital expenditures, inventories total—end of year, average industry dividends, supplemental labor costs, inventories finished products—end of year, new orders for manufactured goods, fuel costs, inventories work in process—end of year, shipments, electric energy used, inventories, materials, supplies, fuels, etc.—end of year, unfilled orders, inventories by stage of fabrication, value of manufacturers inventories by stage of fabrication—beginning of year, Inventories Number of production workers, inventories total—beginning of year, inventories-to-shipments ratio, payroll of production workers, inventories finished products—beginning of year, value of product shipments, hours of production workers, inventories work in process—beginning of year, statistics from department of commerce, industry associations, for industry groups and industries, cost of purchased fuels and electric energy, inventories, materials, supplies, fuels,—beginning of year, geographic area statistics, electric energy quantity purchased, value of shipments—total, annual survey of manufacturers (ASM), electric energy cost, value of shipments—products, employment, electric energy generated, value of shipments—total miscellaneous receipts, all employees payroll, electric energy sold and/or transferred, total miscellaneous receipts—value of resales, all employees hours, cost of purchased fuels, total miscellaneous receipts—contract receipts, all employees total, compensation, capital expenditure for plant and/or equipment total, other total miscellaneous receipts, all employees total fringe benefit costs, capital expenditure for plant and/or equipment—buildings and/or other structures, interplant transfers, total cost of materials, capital expenditure for plant and equipment—machinery and/or equipment total, costs of materials—total, payroll, capital expenditure for plant and equipment—autos, trucks, etc for highway use, costs of materials—materials, parts, containers, packaging, value added by manufacture, capital expenditure for plant and equipment—computers, peripheral data processing equipment, costs of materials—resales, cost of materials consumed, capital expenditure for plant and equipment—all other expenditures, costs of materials—purchased fuels, value of shipments, value of manufacturers inventories by stage of fabrication—end of year, costs of materials—purchased electricity, costs of materials—contract work, industry cost of capital, and/or average industry dividend; employees; margin; profit margin; term structure; interest rate; seasonal factor; a financial ratio of a company; a ratio of accounting based data; a ratio of accounting based data per share; a ratio of a first accounting based data to a second accounting based data; a liquidity ratio; a working capital ratio; a current ratio; a quick ratio; a cash ratio; an asset turnover ratio; a receivables turnover ratio; an average collection period ratio; an average collection period ratio; an inventory turnover ratio; an inventory period ratio; a leverage ratio; a debt ratio; a debt-to-equity ratio; an interest coverage ratio; a profitability ratio; a return on common equity (ROCE) ratio; profit margin ratio; an earnings per share (EPS) ratio; a gross profit margin ratio; a return on assets ratio; a return on equity ratio; a dividend policy ratio; a dividend yield ratio; a payout ratio; a capital market analysis ratio; a price to earnings (PE) ratio; and/or a market to book ratio.

In an embodiment, the accounting based data may be weighted relatively dependent on the geography of the company associated with the financial object.

In an embodiment, the financial object may include: at least one unit of interest in at least one of: an asset; a liability; a tracking portfolio; financial instrument and/or a security, wherein the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a commodity; a financial position; a currency position; a trust, a real estate investment trust (REIT), real estate operating company (REOC), and/or a portfolio of trusts; a debt instrument including at least one of: a bond, a debenture, a subordinated debenture, a mortgage bond, a collateral trust bond, a convertible bond, an income bond, a guaranteed bond, a serial bond, a deep discount bond, a zero coupon bond, a variable rate bond, a deferred interest bond, a commercial paper, a government security, a certificate of deposit, a Eurobond, a corporate bond, a government bond, a municipal bond, a treasury-bill, a treasury bond, a foreign bond, an emerging market bond, a high yield bond, a developed market bond, a junk bond, a collateralized instrument, an exchange traded note (ETN), and/or other agreements between a borrower and a lender; a fund; and/or an investment entity or account of any kind, including an interest in, or rights relating to: hedge fund, an exchange traded fund (ETF), a fund of funds, a mutual fund, a closed end fund, an investment vehicle, and/or any other pooled and/or separately managed investments.

In an embodiment, a computer-implemented method for constructing at least one of a high-yield debt instruments index and/or a portfolio of high-yield debt instruments based on the high yield debt instruments index is provided, the method including: selecting constituent high-yield debt instruments of the high-yield debt instruments index based upon at least one metric regarding the companies associated with the high-yield debt instruments, wherein the at least one metric includes at least one of sales, book value, cash flow, dividends if any, collateral, a composite of the other metrics, and/or ratios pertaining thereto; and weighting the constituent high-yield debt instruments based upon at least one metric regarding the size of the companies associated with the high-yield debt instruments to obtain constituent weightings for each respective constituent high-yield debt instrument, wherein the at least one metric includes at least one of sales, book value, cash flow, dividends if any, collateral, a composite of the other metrics, and/or ratios pertaining thereto.

In an embodiment, the weighting is substantially exclusive of an influence of price of the companies. In another embodiment, the weighting is not based on any of equal weighting, weighting in proportion to price, weighting in proportion to market capitalization, and/or weighting in proportion to free float. In another embodiment, the at least one metric includes data found within a generally accepted accounting principles (GAAP) company annual report and accounts (GAAP reports). In an embodiment, the method further includes basing the constituent weightings of the high-yield debt instruments upon at least one of a ratio or a manipulation of the accounting data. In another embodiment, the constituent weightings are based upon at least one of a ratio or a manipulation of the accounting data including basing the constituent weightings on at least one of: a relative size of the return on assets of the selected companies, the return on investment thereof, and/or the return on capital thereof compared to the cost of capital thereof, wherein the return is determined based on cash flow. In another embodiment, the constituent weightings of the high-yield debt instruments within the high-yield debt instruments index or high yield debt instruments fund are altered as the accounting data concerning the companies in or outside the index changes. In another embodiment, the constituent weightings of the high-yield debt instruments within the fund are altered when at least one of: one or more of the companies report their quarterly and/or annual accounting information; and/or at a pre-determined time after which the majority of the companies in the index have reported their quarterly and/or annual accounting data. In an embodiment, the weighting includes calculating the constituent weightings based upon the at least one accounting data. In another embodiment, the calculating is performed by an index manager calculator.

In an embodiment, a computer-implemented method for constructing at least one of an emerging markets financial objects index and/or an emerging markets financial objects portfolio of emerging market financial objects based on the emerging markets financial objects index is provided, the method including: selecting constituent emerging market financial objects of the emerging markets financial objects index based upon at least one accounting data regarding a company relating to the emerging market financial object and/or demographic data regarding the region, country, and/or sovereign associated with the emerging market financial object; and weighting the constituent emerging market financial objects based upon at least one accounting and/or demographic data regarding the region, country and/or sovereign associated with the emerging market financial objects to obtain constituent weightings for each respective constituent emerging market financial object, wherein the emerging market financial object includes at least one of an emerging market debt instrument and/or an emerging market equity instrument, and wherein the at least one accounting data and/or demographic data includes at least one of a demographic measure, a population level, an area, a geographic area, an economic factor, a gross domestic product (GDP), GDP growth, a natural resource characteristic, an energy metric, a petroleum characteristic, a resource consumption metric, a petroleum consumption amount, a liquid natural gas (LNG) characteristic, a liquefied petroleum gas (LPG) characteristic, an expenditures characteristic, gross national income (GNI), a debt characteristic, a rate of inflation, a rate of unemployment, a reserves level, a population characteristic, a corruption characteristic, a democracy characteristic, a social metric, a political metric, a per capita ratio of any of the foregoing or any other characteristic, a derivative of any foregoing or any other characteristic and/or a ratio of two of the foregoing or any other characteristics.

In an embodiment, the weighting is not based on any of equal weighting, weighting in proportion to share price, weighting in proportion to market capitalization, and/or weighting in proportion to free float. The demographic data may include data found within a database of information pertaining to at least one of regions, sovereigns and/or countries. In an embodiment, the method may further include basing the constituent weightings of the emerging market financial objects upon at least one of a ratio or a manipulation of the accounting and/or demographic data. In an embodiment, the constituent weightings of the emerging market financial objects within the emerging markets financial objects index and/or emerging markets financial objects portfolio are altered as the accounting data and/or demographic data concerning the regions, countries and/or sovereigns in or outside the index changes. In an embodiment, the weighting includes calculating the constituent weightings based upon the at least one accounting data and/or demographic data. In another embodiment, the calculating is performed by an index manager calculator.

In an embodiment, a computer-implemented method for constructing at least one of a Real Estate Investment Trust (REIT) and/or Real Estate Operating Company (REOC) index or a REIT and/or REOC fund including a portfolio of REITs and/or REOCs based on the REIT and/or REOC index is provided, the method including: selecting constituent REITs and/or REOCs for the REIT and/or REOC index based upon at least one data metric of REIT and/or REOC size, wherein the data metric includes at least one of revenues, adjusted funds from operations (AFFO), funds from operations (FFO), distributions, dividends, and/or assets; and weighting the constituent REITs based upon at least one data metric of REIT and/or REOC size, wherein the data metric includes at least one of revenues, adjusted funds from operations (AFFO), funds from operations (FFO), distributions, dividends, and/or assets, to obtain constituent weightings for each respective constituent REIT and/or REOC.

In an embodiment, the weighting is substantially exclusive of an influence of REIT and/or REOC price. In another embodiment, the weighting is not based on any of equal weighting, weighting in proportion to REIT and/or REOC price, weighting in proportion to market capitalization, and/or weighting in proportion to free float. In another embodiment, at least one accounting data includes at least one of total assets, funds from operations (FFO), adjusted funds from operations (AFFO), revenues, total dividend distributions, and/or ratios pertaining thereto. In another embodiment, the accounting data includes data found within a. generally accepted accounting principles (GAAP) company annual report and accounts (GAAP reports). In another embodiment, the method further includes basing the constituent weightings of the REITs upon at least one of a ratio or a manipulation of the accounting data.

In an embodiment, the basing of the constituent weightings upon at least one of a ratio or a manipulation of the accounting data includes basing the constituent weightings on at least one of: a relative size of the return on assets of the selected companies, the return on investment thereof, and/or the return on capital thereof compared to the cost of capital thereof, wherein the return is determined based on at least one of funds from operations (FFO) or adjusted funds from operations (AFFO). In another embodiment, the constituent weightings of the REITs within the REIT index or REIT fund are altered as the accounting data concerning the companies in or outside the index changes. In another embodiment, the constituent weightings of the REITs within the fund are altered when at least one of: one or more of the companies report their quarterly and/or annual accounting information; and/or at a predetermined time after which the majority of the companies in the index have reported their quarterly and/or annual accounting data.

In another embodiment, the weighting includes calculating the constituent weightings based upon the at least one accounting data. In another embodiment, the step of calculating is performed by an index manager computer system. In another embodiment, In an embodiment, a computer-implemented method for constructing at least one of a currency instrument index and/or a currency instrument portfolio of currency and/or related foreign exchange (FX) instruments based on the currency instrument index is provided, the method including: selecting constituent currencies and/or FX instruments of the currency index based upon at least one accounting and/or demographic data regarding at least one of the regions, countries, and/or sovereigns associated with the currencies and/or FX instruments; and weighting the constituent currencies and/or FX instruments based upon at least one accounting and/or demographic data regarding at least one of the regions, countries and/or sovereigns associated with the currencies and/or FX instruments to obtain constituent weightings for each respective constituent currency and/or FX instrument.

In an embodiment, the weighting is not based on any of equal weighting, weighting in proportion to share price, weighting in proportion to market capitalization, and/or weighting in proportion to free float.

In another embodiment, the at least one accounting or demographic data includes at least one of a demographic measure; a population level; an area; a geographic area; an economic factor; a gross domestic product (GDP); GDP growth; a natural resource characteristic; a petroleum characteristic; a resource consumption metric; a petroleum consumption amount; a liquid natural gas (LNG) characteristic; a liquefied petroleum gas (LPG) characteristic; an expenditures characteristic; gross national income (GNI); a debt characteristic; a rate of inflation; a rate of unemployment; a reserves level; a population characteristic; a corruption characteristic; a democracy characteristic; a social metric; a political metric; nominal interest rates and the ratios of nominal interest rates between issuing sovereign entities; commercial paper yield metric; credit rating metric; consumer price index (CPI); purchasing power of local currency metric; metrics measuring relations between the purchasing power of local currency metric and nominal exchange rates and deviations from historical trends in such metrics; government exchange rate regime; a per capita ratio of any of the foregoing or any other characteristic; a derivative of any foregoing or any other characteristic and/or a ratio of two of the foregoing or any other characteristics.

In an embodiment, the demographic data includes data found within a database of information pertaining to regions, sovereigns and/or countries. In another embodiment, the method further includes basing the constituent weightings of the currency and related FX instruments upon at least one of a ratio or a manipulation of the accounting data. In another embodiment, the constituent weightings of the currency and related FX instruments within the currency index or currency fund are altered as the demographic data concerning the regions, countries, or sovereigns associated with currency or related debt instruments in or outside the index changes.

In another embodiment, the constituent weightings of the currency and related FX instruments within the FX fund are altered when at least one of: one or more of the regions, countries or sovereigns report their quarterly and/or annual accounting or demographic information; and/or at a pre-determined time after which the majority of the regions, countries, or sovereigns in the index have reported their quarterly and/or annual accounting or demographic data. In another embodiment, the weighting includes calculating the constituent weightings based upon the at least one accounting data. In another embodiment, the calculating is performed by an index manager calculator.

In an embodiment, a computer-implemented method for constructing at least one of a commodities index and/or a commodities portfolio of commodities and/or derivative instruments based on the commodities index is provided, the method including: selecting constituent commodities and/or derivative instruments of the commodities index based upon at least one accounting data regarding the companies or industries associated with the commodities; and weighting the constituent commodities and/or derivative instruments based upon at least one accounting data regarding the companies and/or industries associated with production and consumption of the commodities to obtain constituent weightings for each respective commodity and/or derivative instrument. In an embodiment, the weighting is substantially exclusive of an influence of share price of the companies or industries. In another embodiment, the weighting is not based on any of equal weighting, weighting in proportion to share price, weighting in proportion to market capitalization, and/or weighting in proportion to free float. In another embodiment, the at least one accounting data includes at least one of sales, book value, cash-flow, any dividends, total assets, revenue, number of employees, profit margins, and/or collateral, and/or ratios pertaining thereto of the companies or industries responsible for the production and consumption of a commodity, total per unit cost of production of the commodity, the commodity reserves value, term structure of the commodity's futures, momentum in price of the commodity, and any seasonal factors that affect the valuation of the commodity.

In another embodiment, the accounting data includes data found within a generally accepted accounting principles (GAAP) company annual report and accounts (GAAP reports). In another embodiment, the method further includes basing the constituent weightings of the commodities and related derivative instruments upon at least one of a ratio or a manipulation of the accounting data. In another embodiment, the basing of the constituent weightings upon at least one of a ratio or a manipulation of the accounting data includes basing the constituent weightings on at least one of: a relative size of the return on assets of the companies or industries responsible for producing and consuming selected commodities, the return on investment thereof, and/or the return on capital thereof compared to the cost of capital thereof, wherein the return is determined based on cash flow.

In another embodiment, the constituent weightings of the commodities and related derivative instruments within the commodities index or commodities fund are altered as the accounting data concerning the companies or industries responsible for producing and consuming the commodities in or outside the index changes. In another embodiment, the constituent weightings of the commodities and related derivative instruments within the fund are altered when at least one of: one or more of the companies or industries report their quarterly and/or annual accounting information; and/or at a pre-determined time after which the majority of the companies or industries responsible for producing and consuming the commodities in the index have reported their quarterly and/or annual accounting data.

In another embodiment, the weighting includes calculating the constituent weightings based upon the at least one accounting data. In another embodiment, the calculating is performed by an index manager calculator.

In an embodiment, a computer-implemented method for the construction and management of a financial object index and/or a financial object market index fund containing a portfolio of financial objects based on the financial object market index is provided, the method including: creating a financial object market index, and/or at least one financial object market index fund including a portfolio of financial objects, wherein the creating includes: selecting constituent financial object of the financial object market index based upon at least one accounting data about the entities associated with the financial object, wherein the selecting is exclusive of a material influence of price, and weighting the constituent financial object of the financial object market index to obtain constituent weightings based upon at least one accounting data regarding the entities associated with the financial objects, wherein the weighting is exclusive of a material influence of price of the financial object associated with the entity, and wherein the weighting is not based on any of equal weighting, weighting in proportion to share price of the stocks of the companies, weighting in proportion to market capitalization of the entities associated with the financial object, and/or weighting in proportion to free float.

In another embodiment, the method further includes basing the constituent weightings of the financial object upon at least one of: a ratio and/or a manipulation of the accounting data. In another embodiment, the constituent weightings of the financial object within the financial object market index fund are altered as the accounting data concerning the companies in or outside the index changes.

In another embodiment, the constituent weightings of the financial object within the financial object fund are altered when at least one of: one or more of the companies report their quarterly and/or annual accounting information; and/or at a pre-determined time after which the majority of the companies in the index have reported their quarterly and/or annual accounting data. In another embodiment, the accounting data may include data found within a generally accepted accounting principles (GAAP) company annual report and accounts (GAAP reports). In another embodiment, the accounting data may include at least one of: relative size of profit of a company, and/or pre-exceptional profits, sales, assets, cash flow, shareholders' equity, and/or a return on investment of the entity.

In another exemplary embodiment, the accounting data may include: a weighted combination of sales, cash flow, and any other generally accepted accounting data. In another embodiment, the data includes at least one of any dividends, profit, assets and/or ratios pertaining thereto. In another embodiment, the another accounting data includes at least one of any dividends, profit, assets, and any fundamental accounting item, and/or ratio pertaining thereto. In another embodiment, the basing of the constituent weightings upon at least one of a ratio and/or a manipulation of the accounting data includes basing the constituent weightings on at least one of: a relative size of the return on assets of the selected companies, the return on investment thereof, and/or the return on capital thereof compared to the cost of capital thereof.

In another exemplary embodiment, the creating including calculating the constituent weightings based upon the at least one accounting data. In another embodiment, the calculating is performed by an index manager calculator.

In an exemplary embodiment, a computer-implemented system for construction and management of a financial index and a portfolio based on the financial index is provided, where the financial index is generated based on accounting data, the system including: an index manager configured to create the financial index, and at least one portfolio based on the financial index, wherein constituent weightings of constituents of the portfolio are based upon at least one accounting data regarding a company associated with each of the constituents of the financial portfolio, the selection of the constituents of the financial index based upon at least one accounting data about the companies exclusive of a material influence of share price, and wherein the constituent weightings are exclusive of a material influence of share price of the companies and wherein the constituent weightings are not based on any of equal weighting, weighting in proportion to share price, weighting in proportion to market capitalization, and/or weighting in proportion to free float. In an embodiment, the accounting based data includes at least one of: dividends and/or ratios related thereto.

In another embodiment, a computer readable medium is provided embodying program logic which when executed by a computer performs a method including: creating a financial index, and at least one portfolio based on the financial index, wherein constituent weightings of constituents of the portfolio are based upon at least one accounting data regarding a company associated with each of the constituents of the portfolio, the creating including: selecting constituents of the financial index based upon at least one accounting data about the companies exclusive of a material influence of share price, and weighting the constituents based on at least one accounting data exclusive of a material influence of share price of the companies to obtain constituent weightings, wherein the constituent weightings are not based on any of equal weighting, weighting in proportion to share price, weighting in proportion to market capitalization, and/or weighting in proportion to free float.

In an embodiment, the method further includes: creating the financial index, and the at least one portfolio, wherein the at least one accounting data includes at least one of: dividends and/or ratios pertaining thereto. In another embodiment, the another accounting data includes at least one of: any dividends and/or ratios pertaining thereto. In another embodiment, the accounting data includes at least one of: any dividends and/or ratios pertaining thereto. In another embodiment, the accounting data includes at least one of: any dividends and/or ratios pertaining thereto.

In another embodiment, the financial object market index is based on accounting data, the method including: creating a financial object market index including: selecting constituent financial objects of the financial object market index based upon at least one accounting data regarding the companies associated with the financial objects, wherein the selecting is substantially exclusive of an influence of price, and weighting the constituent financial object based upon at least one accounting data regarding the entities associated with the financial object to obtain constituent weightings, wherein the weighting is substantially exclusive of an influence of price of the financial object associated with the entity, and wherein the weighting is not based on any of equal weighting, weighting in proportion to share price, weighting in proportion to market capitalization, and/or weighting in proportion to free float.

In another embodiment, a financial object market index fund containing a portfolio of stocks based on a stock market index is provided, the method including: creating a stock market index fund including a portfolio of financial objects based on the financial objects market index wherein the financial objects market index is created by selecting constituent stocks of the financial objects market index based upon at least one accounting data about the companies exclusive of a material influence of price, and by weighting the constituent financial objects of the financial objects market index based upon at least one accounting data regarding the companies whose financial objects are in the financial objects market index, wherein the weighting is exclusive of a material influence of price of the entities, and wherein the weighting is not based on any of equal weighting, weighting in proportion to share price, weighting in proportion to market capitalization, and/or weighting in proportion to free float.

In another embodiment, the financial objects market index fund is held by, or on behalf of, one or a plurality of investors. In another embodiment, the selecting includes selecting based upon at least one of: a ratio of the accounting data; and/or a manipulation of the accounting data. In another embodiment, the accounting data includes at least one of: relative size of a profits of a the entity; and/or pre-exceptional profits, sales, assets, cash flow, shareholders' equity, and/or a return on investment of a the entity. In another embodiment, the accounting data includes any generally accepted accounting data. In another embodiment, In another embodiment, creating the stock market index includes selecting stocks from a set of entities having a publicly available periodic financial report. In another embodiment, the set of companies is not substantially equivalent to any one of the S&P 500 Index, and/or the Dow Jones Industrial Average. In another embodiment, selecting includes: selecting a subset from the set, wherein the set includes at least one of substantially all of the companies having a publicly available periodic financial report, and/or a plurality of subsets of the set. In another embodiment, the set includes a collection of a plurality of partitioned subsets of financial objects. In another embodiment, wherein the index includes a collection of a plurality of partitioned subindexes. In another embodiment, the index is partitioned into subindexes based on any criterion. In another embodiment, the set includes a group of entities greater than 500 companies. In another embodiment, the set includes substantially all entities having publicly available periodic financial reports.

In another embodiment, the selecting includes eliminating from the set a subset of entities chosen according to at least one accounting data substantially independent of price. In another embodiment, the weighting includes weighting the remaining companies after the eliminating, according to at least one accounting data. In another embodiment, the eliminating includes eliminating based on illiquidity. In another embodiment, the financial objects include at least one of: substantially all U.S. financial objects, all financial objects in a market, all stocks in a sector of a market, and/or all stocks in a subset of a market. In another embodiment, the stocks include U.S. stocks. In another embodiment, the financial objects include securities. In another embodiment, the financial objects include common financial objects. In yet another embodiment, the financial objects market index fund is held by, or on behalf of, one or a plurality of investors.

In an embodiment, a system is provided, including: an entity database storing aggregated accounting based data about a plurality of entities obtained from an external data source, each of the entities having at least one asset type associated therewith, the aggregated accounting based data including at least one non-market capitalization objective measure of scale metric associated with each the entity; and an analysis host computer processing apparatus coupled to the entity database, the analysis host computer processing apparatus including: a data retrieval and storage subsystem operative to retrieve the aggregated accounting based data from the entity database and store the aggregated accounting based data to the entity database; an index generation subsystem including: a selection subsystem operative to select a group of the entities based on at least one non-market capitalization objective measure of scale metric; a weighting function generation subsystem operative to generate a weighting function based on at least one non-market capitalization objective measure of scale metric; a index creation subsystem operative to create a non-market capitalization objective measure of scale index based on the group of selected entities and the weighting function; and a storing subsystem operative to store the non-market capitalization objective measure of scale index. An asset type may include a financial object, as well as any other asset type.

In another embodiment, the analysis host computer processing apparatus further includes: a normalization calculation sub-system operative to normalize the data for the at least one non-market capitalization objective measure of scale across the plurality of entities. In another embodiment, the at least one non-market capitalization objective measure of scale metric used by the selection subsystem differs from the at least one non-market capitalization objective measure of scale metric used by the weighting function generating subsystem. In another embodiment, the at least one non-market capitalization objective measure of scale metric used by the selection subsystem excludes any combination of: market capitalization; and/or share price.

In another embodiment, the at least one non-market capitalization objective measure of scale metric used by the weighting function generation subsystem excludes any combination of: market capitalization weighting; equal weighting; and/or share price weighting. In another embodiment, the selection subsystem is operative to: (i) for each entity, assign a percentage factor to each of a plurality of the at least one non-market capitalization objective measure of scale metric, each percentage factor corresponding to the importance of the at least one non-market capitalization objective measure of scale metric to the selection; (ii) for each entity, multiply each of the percentage factors with the corresponding non-market capitalization objective measure of scale metric thereof, to compute a selection relevance factor for the entity; (iii) determine the selected group of entities by: (A) comparing the selection relevance factors for the entities; (B) ranking the entities based on the comparison; (C) selecting a predetermined number of the entities having highest rankings to be the selected group of entities.

In another embodiment, the weighting function generating subsystem is operative to: (i) for each entity including the selected group of entities, assign a percentage factor to each of a plurality of the at least one non-market capitalization objective measure of scale metric, each percentage factor corresponding to the importance of the at least one non-market capitalization objective measure of scale metric to the weighting; and (ii) for each entity including the selected group of entities, multiply each of the percentage factors with the corresponding non-market capitalization objective measure of scale metric thereof, the corresponding non-market capitalization objective measure of scale metric being a member of the plurality, to compute an entity function; and (iii) set the weighting function as a combination of the totality of the entity functions.

In another embodiment, each of asset type includes at least one of: a stock; a commodity; a futures contract; a bond; a mutual fund; a hedge fund; a fund of funds; an exchange traded fund (ETF); a derivative; and/or a negative weighting on any asset. In another embodiment, the at least one asset type includes a stock. In another embodiment, the at least one asset type includes a commodity. In another embodiment, the at least one asset type includes a futures contract. In another embodiment, the at least one asset type includes a bond. In another embodiment, the at least one asset type includes a mutual fund. In another embodiment, the at least one asset type includes a hedge fund. In another embodiment, the at least one asset type includes a fund of funds. In another embodiment, the at least one asset type includes an exchange traded fund (ETF). In another embodiment, the at least one asset type includes a derivative. In another embodiment, the at least one asset type includes a negative weighting on any asset type. In another embodiment, the negative weighting is performed for purposes of at least one of establishing and/or measuring performance for at least one of: any security; a portfolio of assets; a hedge fund; and/or a long/short position. In another embodiment, the at least one non-market capitalization objective measure of scale metric includes a measure of size of the entity. In another embodiment, the measure of size of the entity includes at least one of: gross revenue; sales; income; earnings before interest and tax (EBIT); earnings before interest, taxes, depreciation and amortization (EBITDA); number of employees; book value; assets; liabilities; and/or net worth. In another embodiment, the non-market capitalization objective measure of scale metric includes a metric relating to an underlying asset type itself In an embodiment, the asset type includes at least one of: a municipality; a municipality issuing bonds; and/or a commodity. In another embodiment, the at least one non-market capitalization objective measure of scale metric includes at least one of: revenue; profitability; sales; total sales; foreign sales, domestic sales; net sales; gross sales; profit margin; operating margin; retained earnings; earnings per share; book value; book value adjusted for inflation; book value adjusted for replacement cost; book value adjusted for liquidation value; dividends; assets; tangible assets; intangible assets; fixed assets; property; plant; equipment; goodwill; replacement value of assets; liquidation value of assets; liabilities; long term liabilities; short term liabilities; net worth; research and development expense; accounts receivable; earnings before interest and tax (EBIT); earnings before interest, taxes, dividends, and amortization (EBITDA); accounts payable; cost of goods sold (CGS); debt ratio; budget; capital budget; cash budget; direct labor budget; factory overhead budget; operating budget; sales budget; inventory system; type of stock offered; liquidity; book income; tax income; capitalization of earnings; capitalization of goodwill; capitalization of interest; capitalization of revenue; capital spending; cash; compensation; employee turnover; overhead costs; credit rating; growth rate; tax rate; liquidation value of entity; capitalization of cash; capitalization of earnings; capitalization of revenue; cash flow; and/or future value of expected cash flow.

In an embodiment, the at least one non-market capitalization objective measure of scale metric includes a ratio of any combination of two or more non-market capitalization objective measure of scale metrics. In another embodiment, the ratio of any combination of the objective measure of scale metrics comprise at least one of: current ratio; debt ratio; overhead expense as a percent of sales; and/or debt service burden ratio. In another embodiment, the at least one non-market capitalization objective measure of scale metric includes a demographic measure.

In an embodiment, the demographic measure of scale includes at least one of: a measure relating to employees; floor space; office space; location; and/or other demographics of an asset. In another embodiment, the measure of size of the entity includes at least a demographic measure. In another embodiment, the demographic measure includes at least one of: a non-financial metric; a non-market related metric; a number of employees; floor space; office space; and/or other demographics of the asset. In another embodiment, the at least one non-market capitalization objective metric includes a metric relating to geography. In another embodiment, the geographic metric relating to geography includes a geographic metric other than gross domestic product (GDP).

In an embodiment, the system further includes a trading host computer processing apparatus, coupled to the analysis host computer processing apparatus, and operative to construct a portfolio of assets including one or more trading assets, the trading host computer processing apparatus including: an index retrieval subsystem operative to retrieve the non-market capitalization objective measure of scale index; a trading accounts management subsystem operative to receive one or more data indicative of investment amounts from one or more investors; a purchasing subsystem operative to permit purchasing of one or more of the trading assets using the investment amounts based on the non-market capitalization objective measure of scale index.

In an embodiment, the system further includes a trading accounts database coupled to the trading accounts management subsystem, the trading accounts database operative to store the one or more data indicative of the investment amounts. In another embodiment, the system further includes an exchange host computer processing apparatus coupled to the purchasing subsystem, the exchange host computer processing apparatus operative to perform one or more functions of the purchasing subsystem. In another embodiment, the asset type includes at least one of: a fund; a mutual fund; a fund of funds; an asset account; an exchange traded fund (ETF); a separate account, a pooled trust; and/or a limited partnership.

In an embodiment, the system further includes: rebalancing a pre-selected group of trading assets based on the non-market capitalization objective measure of scale index. In another embodiment, the rebalancing is performed on a periodic basis. In another embodiment, the rebalancing is based on the group of assets reaching a predetermined threshold.

In an embodiment, the system further includes: applying one or more rules associated with the non-market capitalization objective measure of scale index. In another embodiment, the system may be used for at least one of: investment management, and/or investment portfolio benchmarking. In another embodiment, the selection sub-system is operative to perform enhanced index investing, including: computing the portfolio of assets in a fashion wherein at least one of: holdings; performance; and/or characteristics, are substantially similar to an external index. In another embodiment, the weighting subsystem is further operative to weight based on a non-financial metric associated with each of the selected group of entities.

In an embodiment, a system is operative to produce data indicative of the state of a plurality of entities, including: (i) an entity database storing aggregated entity data about the plurality of entities obtained from an external data source, each of the entities having at least one object type associated therewith, the aggregated entity data including at least one objective metric associated with each entity; (ii) an input/output subsystem; and (iii) an analysis host computer processing apparatus coupled to the entity database via the input/output subsystem, the analysis host computer processing apparatus including: (A) a data retrieval and storage subsystem operative to retrieve the aggregated entity data from the entity database and store the aggregated entity data to the entity database; (B) a data generation apparatus subsystem including: (1) an object selection subsystem operative to select a group of the entities based on a the at least one objective metric; (2) an object weighting function generating subsystem operative to generate a weighting function based on the at least one objective metric; (3) a data creating subsystem operative to create the data based on the group of selected entities and the weighting function; (4) an object storing subsystem operative to store the data; and (5) a displaying subsystem operative to generate for visual display the data indicative of the state of the plurality of entities.

In another embodiment, (i) the data includes an index; (ii) each objective metric includes a non-market capitalization objective measure of scale metric; (iii) each entity data includes a corporate entity data; and (iv) each object type includes an asset data of the entity.

In another embodiment, the analysis host computer processing apparatus further includes: a normalization calculation subsystem operative to normalize the data for the at least one non-market capitalization objective measure of scale metric across the plurality of entities.

In another embodiment, the at least one objective metric used by the object selection subsystem differs from the at least one objective metric used by the object weighting function generating subsystem. In another embodiment, the at least one object metric used by the object selection subsystem excludes any combination of data regarding: market capitalization; and/or share price.

In another embodiment, the at least one object used by the object weighting function generating subsystem excludes any combination of data regarding: market capitalization weighting; equal weighting; and/or share price weighting. In another embodiment, the object selection subsystem includes a selection subsystem operative to: (i) for each entity, assigning a percentage factor to each of a plurality of the at least one objective metric, each percentage factor corresponding to the importance of the at least one objective metric to the selection; (ii) for each entity, multiplying each of the percentage factors with the corresponding objective metric thereof, to compute a selection relevance factor for the entity; (iii) determining the selected group of entities by: (A) comparing the selection relevance factors for the entities; (B) ranking the entities based on the comparison; (C) selecting a predetermined number of the entities having highest rankings to be the selected group of entities.

In another embodiment, the object weighting function generating subsystem is operative to: (i) for each entity including the selected group of entities, assigning a percentage factor to each of a plurality of the at least one objective metric, each percentage factor corresponding to the importance of the at least one objective metric to the weighting; (ii) for each entity including said selected group of entities, multiplying each of the percentage factors with the corresponding objective metric thereof, the corresponding objective metric being a member of the plurality, to compute an entity function; and (iii) setting the weighting function as a combination of the totality of the entity functions.

In another embodiment, each of the object types includes data regarding an asset of the entity, said asset including at least one of: a stock; a commodity; a futures contract; a bond; a mutual fund; a hedge fund; a fund of funds; an exchange traded fund (ETF); a derivative; and/or a negative weighting on any asset. In another embodiment, the at least one objective metric includes data regarding the entity, the data including data regarding at least one of: revenue; profitability; sales; total sales; foreign sales, domestic sales; net sales; gross sales; profit margin; operating margin; retained earnings; earnings per share; book value; book value adjusted for inflation; book value adjusted for replacement cost; book value adjusted for liquidation value; dividends; assets; tangible assets; intangible assets; fixed assets; property; plant; equipment; goodwill; replacement value of assets; liquidation value of assets; liabilities; long term liabilities; short term liabilities; net worth; research and development expense; accounts receivable; earnings before interest and tax (EBIT); earnings before interest, taxes, dividends, and amortization (EBITDA); accounts payable; cost of goods sold (CGS); debt ratio; budget; capital budget; cash budget; direct labor budget; factory overhead budget; operating budget; sales budget; inventory system; type of stock offered; liquidity; book income; tax income; capitalization of earnings; capitalization of goodwill; capitalization of interest; capitalization of revenue; capital spending; cash; compensation; employee turnover; overhead costs; credit rating; growth rate; tax rate; liquidation value of entity; capitalization of cash; capitalization of earnings; capitalization of revenue; cash flow; and/or future value of expected cash flow.

In another embodiment, the system further includes a trading host computer processing apparatus, coupled to the analysis host computer processing apparatus, and operative to construct a portfolio of assets including one or more trading assets, the trading host computer processing apparatus including: a data retrieval subsystem operative to retrieve the data; a trading accounts management subsystem operative to receive one or more data indicative of investment amounts from one or more investors; a purchasing subsystem operative to permit purchasing of one or more of the trading assets using the investment amounts based on the data.

In another embodiment, the system further includes a trading accounts database coupled to the trading accounts management subsystem, the trading accounts database operative to store the one or more data indicative of the investment amounts. In another embodiment, the system further includes an exchange host computer processing apparatus coupled to the purchasing subsystem, the exchange host computer processing apparatus operative to perform one or more functions of the purchasing subsystem.

In an embodiment, the system may also further include: a rebalancing computational subsystem operative to rebalance a pre-selected group of trading assets based on the data. In another embodiment, the rebalancing computational subsystem performs rebalancing on a periodic basis. In yet another embodiment, the rebalancing computational subsystem performs rebalancing based on the trading assets reaching a predetermined threshold.

Further features and advantages of, as well as the structure and operation of, various embodiments, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EXEMPLARY EMBODIMENTS

Figure 1:
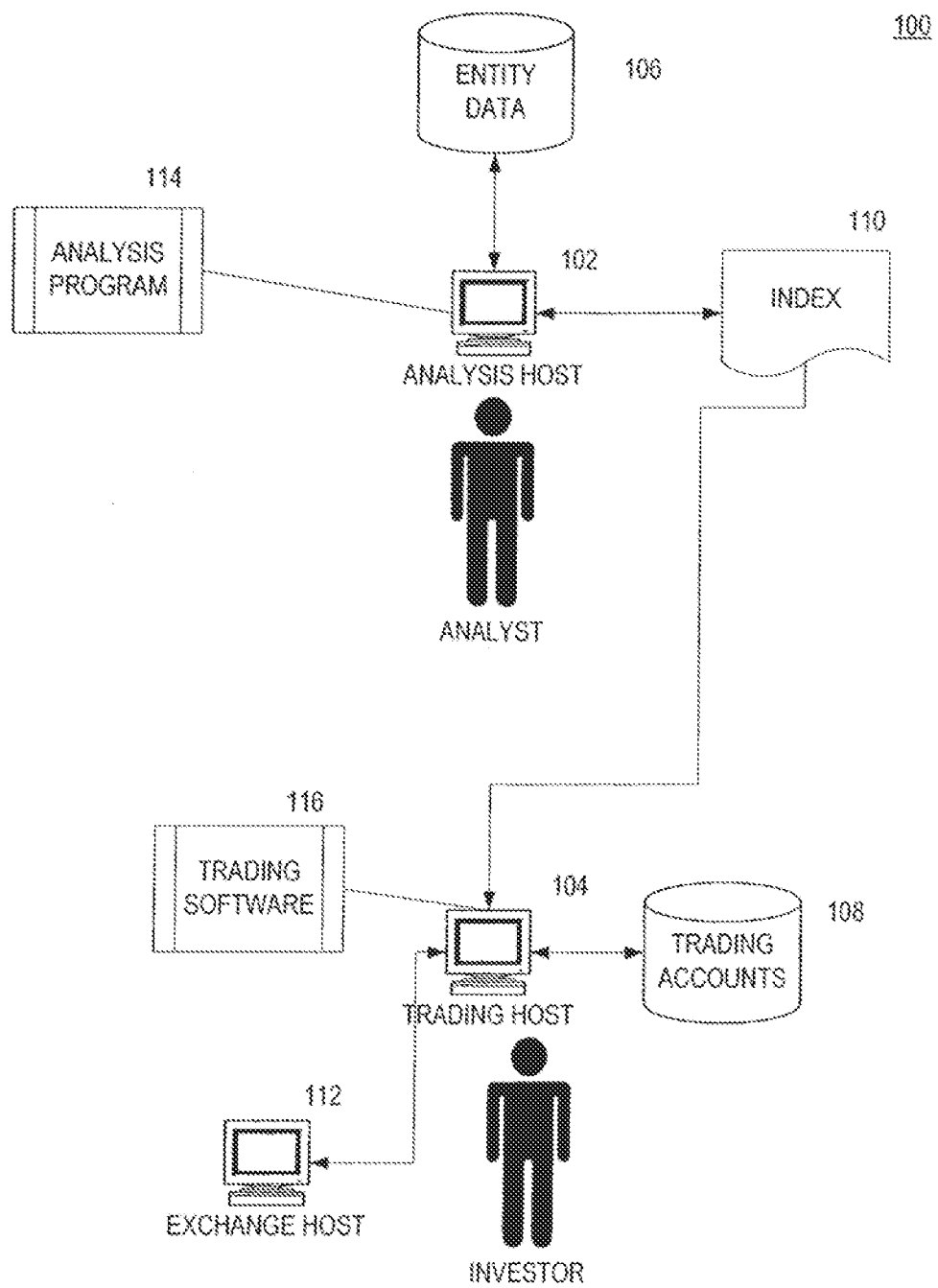
FIG. 1 is a deployment diagram of an index generation and use process in accordance with an exemplary embodiment of the present invention.

Various exemplary embodiments are discussed in detail below including a preferred embodiment. While specific implementations are discussed, it should be understood that this is done for illustration purposes only. A person skilled in the relevant art can recognize that other components, configurations, accounting data, and ratios may be used without parting from the spirit and scope of the invention.

Exemplary Conclusions

The inventors have arrived at numerous conclusions upon which the embodiments are established, including that cap-weighting is not mean-variance optimal. The latter conclusion holds because weighting schemes based on market price, including cap-weighting, overweight 100% of overvalued stocks and underweight 100% of undervalued stocks. Both mathematically and empirically, this over and under weighting problem inherent to cap-weighting leads to a return drag of 200 bps per year in the U.S. and more than 200 bps per year internationally.

One example of the phenomenon comes from the recent stock market bubble of 1997-2000, when, e.g., Internet network service provider Cisco comprised nearly 5% of the S&P 500. At its peak in 2000, Cisco traded at $70 per share. Since March 2000, Cisco has fallen to approximately 12% of its peak, dragging down S&P 500 performance of which it comprised 5%.

While it is difficult or impossible to know the true fair value of a company, what is known is that if an overvalued company's weight in an index is determined by market capitalization, then the company will be over-weighted in the index. Conversely, if a company's weight is determined by market capitalization and it is undervalued, it will be underweighted in a capitalization-weighted index.

Over the past 40 years, the largest stock by market capitalization in the S&P 500 has underperformed the average stock in the index over a 10-year time period by an average of 40%. The largest 10 stocks by market capitalization have underperformed the average stock over the subsequent 10-year time frame by an average of 26%. Yet, cap-weighted indexes continue to invest 20-30% of their value in the largest 10 stocks by market cap, despite the fact that they underperform the average stock in the index, because the stocks are selected and weighted using market capitalization, which by its nature over-weights over valued stocks and under-weights undervalued stocks. The various exemplary embodiments overcome the shortcomings of the investment community.

Various Exemplary Embodiments Further Described

As used herein, references to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other.

"Coupled" may mean that two or more elements are in direct physical or electrical contact. However, "coupled" may also mean that two or more elements are not in direct contact with each other, but yet still co-operate or interact with each other.

One or more exemplary embodiments of various exemplary embodiments, including but not limited to a trading system, a selecting system, a weighting system, an investment system, a portfolio management system, an index manager system, a database system, a metric storage and/or analysis system, to name a few, may be implemented on, with, or in relation to a computing device(s), processor(s), computer(s) and/or communications device(s).

The computer, in an exemplary embodiment, may comprise one or more central processing units (CPUs) or processors, which may be coupled to a bus. The processor may, e.g., access main memory via the bus. The computer may be coupled to an input/output (I/O) subsystem such as, e.g., but not limited to, a network interface card (NIC), or a modem for access to a network. The computer may also be coupled to a secondary memory directly via bus, or via a main memory, for example. Secondary memory may include, e.g., but not limited to, a disk storage unit or other storage medium. Exemplary disk storage units may include, but are not limited to, a magnetic storage device such as, e.g., a hard disk, an optical storage device such as, e.g., a write once read many (WORM) drive, or a compact disc (CD), a digital versatile disk (DVD), and/or a magneto optical device. Another type of secondary memory may include a removable disk storage device, which may be used in conjunction with a removable storage medium, such as, e.g. a CD-ROM, a floppy diskette or flash drive, etc. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to storage media such as, e.g., but not limited to, a removable storage drive, or a hard disk installed in hard disk drive, etc. These computer program products may provide software to the computer system. The invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device. The foregoing computer and/or communications related embodiments are described with greater specificity in the embodiments that follow.

Exemplary Process of Constructing Exemplary Accounting Data Based Indexes

A financial object, according to one exemplary embodiment, may include: at least one unit of interest in at least one of: an asset; a liability; a tracking portfolio; a financial instrument and/or a security, where the financial instrument and/or the security denotes a debt, an equity interest, and/or a hybrid; a financial position, a currency position, a trust, a real estate investment trust (REIT), a portfolio of trusts and/or REITS, a security instrument, an equitizing instrument, a commodity, a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments. In an exemplary embodiment, the financial object may include a debt instrument, including, according to one exemplary embodiment, any one or more of a bond, a debenture, a subordinated debenture, a mortgage bond, a collateral trust bond, a convertible bond, an income bond, a guaranteed bond, a serial bond, a deep discount bond, a zero coupon bond, a variable rate bond, a deferred interest bond, a commercial paper, a government security, a certificate of deposit, a Eurobond, a corporate bond, a government and/or institutional debt instrument, a municipal bond, a treasury-bill, a treasury bond, a foreign bond, an emerging market bond, a high yield bond, a junk bond, a collateralized instrument, an exchange traded note (ETN), and/or other agreements between a borrower and a lender. The foregoing list is non-exhaustive, and a financial object may include at least the types of objects listed throughout this document as qualifying as a financial object, respectively.

FIG. 1 depicts an exemplary deployment diagram 100 of an index generation and use process in accordance with an exemplary embodiment of the present invention. According to the exemplary embodiment, an analyst may use a computer system 102 to generate an index 110. The analyst may do so by using analysis software 114 to examine data 106 about entities offering different kinds of financial objects that may, for example, be traded by investors. An example of an entity that may be offering financial objects may be a publicly held company whose shares trade on an exchange. However, the present embodiments also apply to any entity that may have any type of financial object that may, for example, be traded, and where, for example, information about the entity and/or its financial objects may be available (or capable of being made available) for analysis.

In an exemplary embodiment, once index 110 has been generated by an analyst using the entity data 106, index 110 may be used to build one or more portfolios, for example, investment portfolios. An investor, advisor, manager or broker may then manage the purchased financial objects, for example, as a mutual fund, an electronic traded fund, a hedge fund or other portfolio or account of assets for one or for a plurality of, for example, individual and/or institutional investors. The investor, advisor, manager or broker may use a trading computer system 104 with trading software 116 to manage one or more trading accounts 108. Alternatively, the purchased financial objects may be managed for one or more investors. In the latter case, financial objects may be purchased based on the index for inclusion in an individual or an institutional investor's portfolio. One or more trades may be effected or closed in cooperation with and via communication with an exchange host system 112. The present embodiments are not limited to the foregoing technologies, and may include at a minimum, the various technologies, including computer and/or communications systems specified elsewhere herein.

Figure 2:
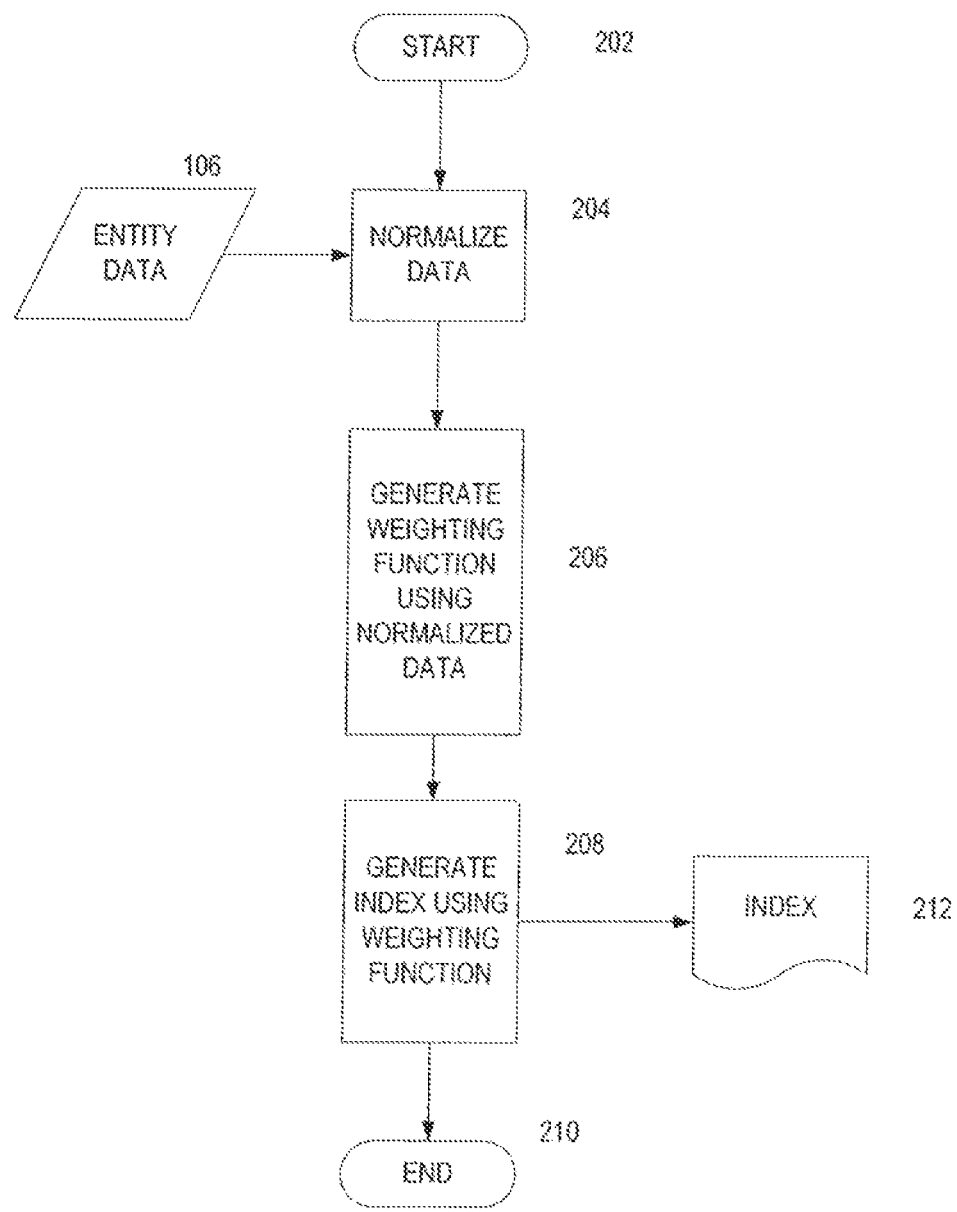
FIG. 2 is a process flow diagram of an index generation process in accordance with an exemplary embodiment of the present invention.

FIG. 2 depicts an exemplary process flow diagram 200 of an index generation process in accordance with an exemplary embodiment of the present invention. In an exemplary embodiment, starting at block 202, to generate index 110, an analyst using analysis software and/or hardware system 114 may access entity data 106 about various entities that have financial objects that are traded. For example, publicly traded companies must disclose information about certain financial aspects of their operations. This information may be aggregated for a plurality of entities. Market sectors and corresponding indices may then be identified and generated using the aggregate data.

In slightly more detail, an index 110 may be generated and/or stored by, for example, normalizing entity data for a particular non-market capitalization metric in block 204. The normalized entity data may be used to generate a weighting function, in block 206, describing the contribution of each entity to a business sector as defined by the metric, in an exemplary embodiment. Index 110 may be generated using the weighting function in block 208. The process may end at block 210. Once index 110 is generated, according to an exemplary embodiment, index 110 may be used to track the business sector defined by the metric or to create a portfolio of financial objects offered by the entities whose information was used to generate the index.

For example, in an exemplary embodiment a method of constructing a non-capitalization weighted portfolio of financial objects may include, e.g., gathering data about various financial objects; selecting a group of financial objects to create the index of financial objects; and/or weighting each of the group of financial objects selected in the index based on an objective measure of scale and/or size of each member of the group of financial objects, where the weighting may include weighting all or a subset of the group of financial objects, and weighting based on factors other than market capitalization, equal weighting, or share price weighting.

In one exemplary embodiment, the weighting of each member of the group of financial objects may include weighting financial objects of any of various types. Examples of various types of financial objects may include, for example, but not be limited to, a stock type; a commodity type; a futures contract type; a bond type; a currency type; a mutual fund type; a hedge fund type; a fund of funds type; an exchange traded fund (ETF) type; and/or a derivative type asset, and/or any other portfolio or account of financial objects, to name a few. In fact, any of the types of financial objects specified above and elsewhere herein may be weighted. The weighting may also include, e.g., but not limited to, a negative weighting on any of the various types of financial objects.

According to exemplary embodiments of the present invention, the index 110 may be weighted based on an objective measure of scale and/or size, where the objective measure of scale and/or size may include a measure relating to an underlying asset itself. The financial object may include, for example, a government and/or a municipality, a government and/or municipality issuing bonds, a government and/or municipality issuing currency, a government and/or municipality issuing a commodity, and/or a government and/or municipality issuing a commodity, to name a few. An objective measure of scale and/or size associated with the financial object may include, for example, any combination or ratios of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, dividends, dividends per share, dividend yields, tax rate, liquidation value of company, capitalization of cash, capitalization of earnings, capitalization of revenue, cash flow, and/or future value of expected cash flow. Further, if the financial object is associated with country or sovereign, such as, for example, emerging market debt instruments or currency and currency related debt instruments, an objective measure of scale and/or size associated with the financial object may include any combination or ratio of: economic factors, demographic factors, social factors political factors, the population, area, geographic area gross domestic product (GDP), GDP growth, natural resources, oil (or any other energy source) consumption, expenditures, government expenditures, gross national income (GNI), measures of freedom, democracy, and corruption, rate of inflation, rate of unemployment, reserves level, and/or total debt, nominal interest rates and the ratios of nominal interest rates between issuing sovereign entities; commercial paper yield metric; credit rating metric; consumer price index (CPI); purchasing power of local currency metric; metrics measuring relations between the purchasing power of local currency metric and nominal exchange rates and deviations from historical trends in such metrics; and/or government exchange rate regime; a per capita ratio of any of the foregoing or any other characteristic.

Ratios too may be used. In an exemplary embodiment, the weighting of financial objects in the index based on objective measures of scale and/or size may include a ratio of any combination of the objective measures of scale and/or size of the financial object other than ratios based on weighting the financial objects based on market capitalization, equal weighting, or share price weighting. For example, the ratio of any combination of the objective measures of scale and/or size may include, e.g., but not limited to, current ratio, debt ratio, overhead expense as a percent of sales, or debt service burden ratio.

In an exemplary embodiment, the portfolio of financial objects may include, e.g., but not limited to, one or more of, a fund; a mutual fund; a fund of funds; an asset account; an exchange traded fund (ETF); and/or a separate account, a pooled trust; a limited partnership and/or other legal entity, fund or account.

In an exemplary embodiment, a measure of company size may include one of, or a combination of one or more of, gross revenue, sales, income, earnings before interest and tax (EBIT), earnings before interest, taxes, depreciation and amortization (EBITDA), number of employees, book value, assets, liabilities, net worth, cash flow or dividends.

In one exemplary embodiment, the measure of company size may include a demographic measure of the financial object. The demographic measure of the financial object may include, e.g., one of, or any combination of one or more of a non-financial metric, a non-market related metric, a number of employees, floor space, office space, or other demographics of the financial object.

In an exemplary embodiment, weighting may be based on the objective measure of scale and/or size, where the measure may include a geographic metric. The geographic metric in an exemplary embodiment may include a geographic metric other than gross domestic product (GDP) weighting.

Figure 3:
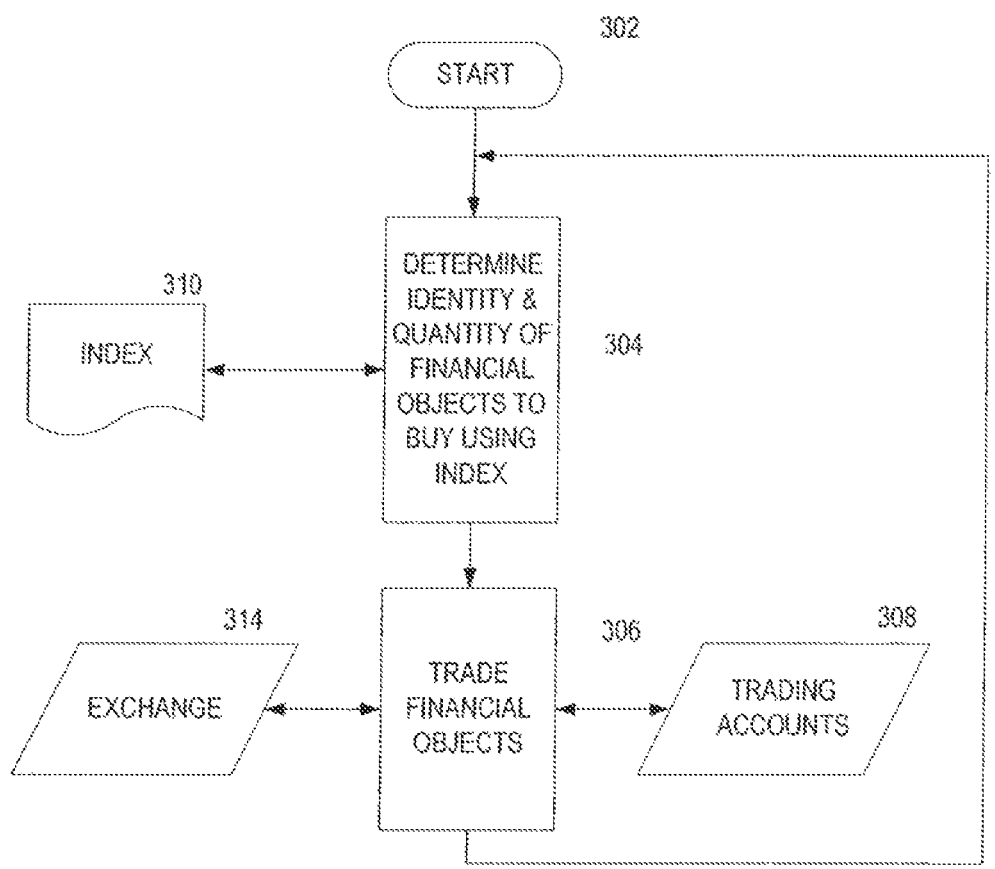
FIG. 3 is a process flow diagram of an index use process in accordance with an exemplary embodiment of the present invention.

FIG. 3 depicts an exemplary process flow diagram 300 of an index use process in accordance with an exemplary embodiment of the present invention. The process starts at block 302. An index 310 may be received from an index generation process and may be used to determine the identity and quantity of securities to purchase for a portfolio in block 304, according to an exemplary embodiment. The securities may be purchased, in block 306, from an exchange 314 or other market and may be held on account for an investor or group of investors in trading accounts 308. The index 310 may be updated on, e.g., but not limited to, a periodic basis and may be used as a basis to rebalance the portfolio, according to an exemplary embodiment. According to another exemplary embodiment, the portfolio can be rebalanced when, e.g., a pre-determined threshold is reached. In this way, a portfolio may be created and maintained based on a non-market capitalization index.

Rebalancing can be based on financial objects reaching a threshold condition or value. For example, but not limited to, rebalancing may occur upon reaching a threshold such as, e.g., 'when the portfolio of financial objects increases in market value by 20%,' or 'when the financial objects on a sub-category within the portfolio exceed 32% of the size of the portfolio,' or 'when a U.S. President is elected from a different party than the incumbent,' etc. Rebalancing may take place periodically, e.g., quarterly, or annually.

The present invention, in an exemplary embodiment, may be used for investment management, or investment portfolio benchmarking.

Another exemplary embodiment of the present invention may include an Accounting Data Based Index (ADBI) such as, e.g., but not limited to, a FUNDAMENTAL INDEXED and Index Fund or Funds.

This exemplary embodiment may utilize a new series of accounting data based stock market indices in which the index weightings may be determined by company accounting data such as, e.g., but not limited to, the relative size of a company's profits, or its pre-exceptional profits, or sales, or return on investment or any accounting data based accounting item, or ratio, may help to address some of the issues raised above. An index that is weighted based on company accounting data, rather than the share price, or market capitalization or equal weighting, may have a stabilizing element within it that can help to remove excess volatility generated by indices constructed on the basis of price or market capitalization alone. Over the medium to longer term, such accounting data based indices have the potential to outperform price or market capitalization-based indices, and may do so with less volatility.

The exemplary method may create a new class of stock market indices and index funds that may be implemented on, e.g., but not limited to, a computing device or a processor, or as a computer software or hardware, or as an algorithm. This new class of stock market indices may base its weightings on the accounting data of the companies that make up that index. One possible version of an accounting data based stock market index may be an index that is based on the relative size of a sample of the companies' pre-exceptional profits. If the chosen sample of companies was determined to be one hundred and the accounting data based criteria that the index manager decided to use was to be 'largest pre-exceptional profits,' then the index may contain, e.g., the one hundred largest companies as defined by the size of their pre-exceptional profits. As an example, if the total pre-exceptional profits of the largest one hundred companies, as measured by their pre-exceptional profits, was 100 dollars, pounds, or other currency, in a defined time period (such as a quarter or year) and in the same time period the pre-exceptional profits of theoretical company 'A' were $2, then theoretical company A would be allocated a 2% weighting in the accounting data based index, in an exemplary embodiment. If theoretical company B had pre-exceptional profits of $1.5 over the same time period then it would have a weighting of 1.5% in the accounting data based index according to an exemplary embodiment.

The index weightings may be managed based on how the "fundamentals" of the companies within, or outside, the chosen index sample may change. As an example, the index manager could choose to rebalance the weightings from time to time such as, e.g., but not limited to, periodically, aperiodically, quarterly, as company pre-exceptional profits change, and/or on an annual basis, etc., and enter their choice into, e.g., a computing device. If, for instance, by the time of the next rebalancing period the total pre-exceptional profits of the largest one hundred companies, as measured by their pre-exceptional profits, had grown to $120, and theoretical company A now had pre-exceptional profits of $1.2, the computing device may calculate the weighting of company in the accounting data based index such as, e.g., the accounting data based index down to 1% from 2% in the previous period. Creating such accounting data based indices may give an investor the opportunity to follow, or invest, passively in an index which may be anchored to the economic realities of the companies within it. This new accounting data based index construction technique by a computing device may produce an index and related index fund products with increased stability and with increased economically rational behavior as compared with known methods of investing.

The foregoing index weighting and rebalancing as performed on a computing device may also be applied to indices constructed of financial objects including emerging market debt instruments, or currency and related debt instruments, or commodities and related debt instruments, or Real Estate Investment Trusts. Each index may be based on the one or more accounting metrics relevant to the financial object of which the index is composed. For example, an index of currency and related debt instruments may be based on the GDP of the country or sovereign responsible for issuing the currency.

Accounting Data Based Indexation (ADBI)

In one exemplary embodiment, a computing device may create an accounting data based stock market index (ADBI) such as, for example, an accounting data based stock market index by using any of the accounting data based data points regarding a company or a group of companies that can be found in a company's annual report and accounts. In one exemplary embodiment, the computing device may create an index of companies based on the relative size of the companies' sales, assets, profits, cash flow or the shareholders equity. In addition, the computing device can also create the ADBI by using a ratio of any of the data concerning a company or group of companies that may be contained in a company report and accounts. In one exemplary embodiment, this could include the relative size of the return on financial objects of a selection of companies, their return on investment, or their return on capital compared to their cost of capital. In another exemplary embodiment, the computing device may create an index of objects, wherein the objects are associated, for example, with a country or soverign, where the index is created based on any of the foregoing metrics for countries and sovereigns.

Once the index manager system has decided and entered which accounting data based criteria to use and how many constituents the manager system may decide to include in the index, the computing device may create the index in the following way. If, for example, the index manager decides to construct an accounting data based stock market (or other securities or financial object) index of one hundred constituent members and decides to use pre-exceptional profit as the chosen accounting data based criteria, the computing device may create the index as follows. First, the computing device may perform a search to find which are the largest one hundred listed companies as defined by the size of their pre-exceptional profits. Once the computing device has identified this information, the computing device may be ready to construct the index. Companies may be accorded index weightings based on the relative size of their pre-exceptional profits. If the combined pre-exceptional profits of the one hundred companies is $100 and theoretical company A has pre-exceptional profits of $2, then it may have an index weighting of 2%. Once the one hundred companies may have been accorded their weightings, the computing device may begin to calculate future index performance as the share prices of the different companies in the index changes from day to day. This may be achieved by assuming a starting value for the index, or index portfolio, and then calculating how each of the index constituents may perform going forward.

The computing device may then rebalance the index weightings as the accounting data based data points change over time as desired by the investor. For instance, if at the end of the next company reporting season the combined pre-exceptional profits of the one hundred largest companies had grown from $100 to $120 and the pre-exceptional profits of theoretical company A had declined from $2 to $1.2, the computing device may determine its weighting in the index would decline from 2% in the prior period to 1% in the current period. Also, some of the original companies in the first one hundred may be eliminated from the index if their pre-exceptional profits fall below a certain level while new companies that were not in the original sample may be included. The computing device, under the direction of an investor, may choose to rebalance the weightings in the index, e.g., but not limited to, as individual companies report their pre-exceptional profits on a quarterly basis, and/or waiting until the majority of companies have reported their pre-exceptional profits and then adjusting them all at once. Also, the computing device, under the direction of an investor, could choose to determine the weightings based on, e.g., but not limited to, either the total nominal amount of pre-exceptional profit each quarter or on a cumulative rolling basis.

Constructing a stock market (or other security or financial object) index according to an exemplary embodiment using accounting data based company accounts data or a ratio, or manipulation of that data may provide a series of genuine alternatives for investors who want to invest in a passive style while focusing on fundamentals that they believe are important. For instance, according to an exemplary embodiment an investor may always want to own an index of U.S. or foreign equities that are, e.g., the largest five hundred companies as measured by sales, or by profits, or by growth in sales, or by return on investment, or any accounting data based company accounts data or ratio of that data.

In accordance with certain embodiments, a portfolio generated based on an ADBI index may be passively managed, actively managed, and/or may be managed partially passively and/or or actively. In an exemplary embodiment, a passively managed portfolio may be categorized as objective, rules-based, transparent, and/or replicable.

Exemplary Long-Short Equity Strategies

An exemplary embodiment of the present invention may take long and short positions based on an extent to which accounting data based indexation suggests that equities are under or over valued.

Figure 4:
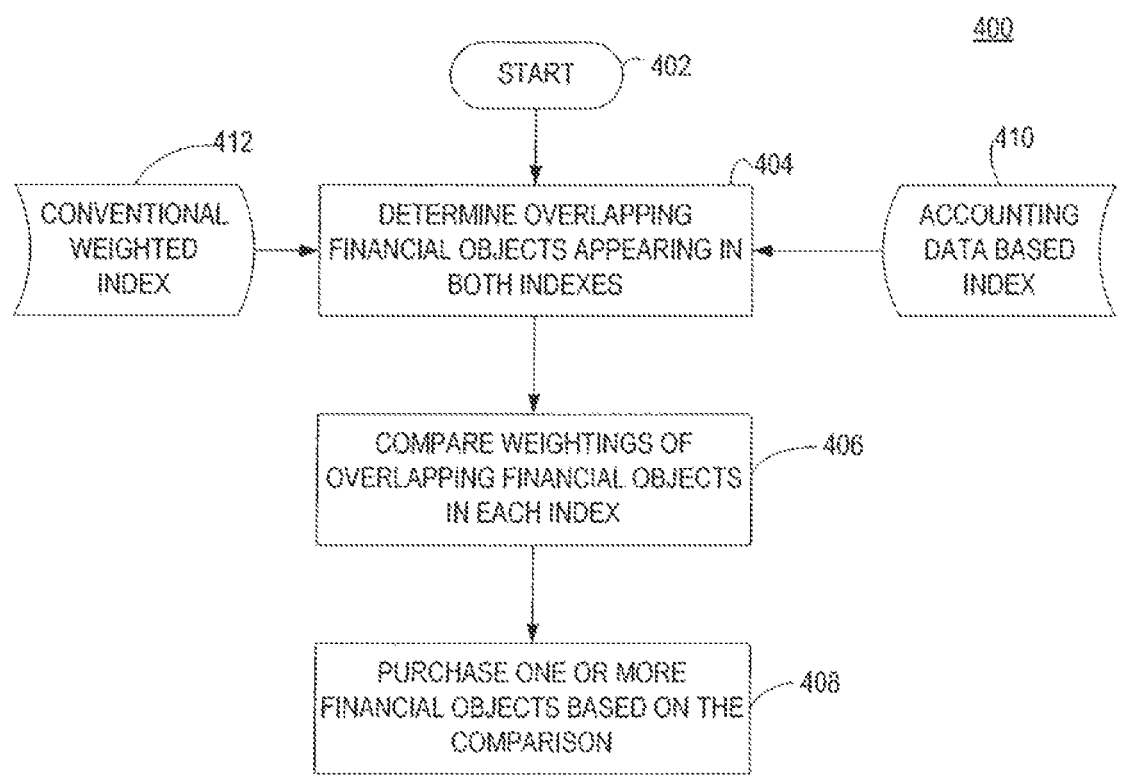
FIG. 4 is a process flow diagram of a method of creating a portfolio of financial objects.

FIG. 4 illustrates an exemplary process flow diagram 400 of a method of creating a portfolio of financial objects according to an embodiment of the present invention. In block 402 the process starts. In block 404, a determination is made of overlapping financial objects that appear in both an accounting data based index (ADBI) 410 and a conventional weighted index 412. In block 406, the weightings of the overlapping financial objects in the ADBI are compared with the weightings of the overlapping financial objects in the conventionally weighted index. Then, in block 408, one or more of the overlapping financial object may be purchased based on the result of the comparison.

In the alternative, exemplary embodiments of the present invention may determine non-overlapping financial objects appearing in only one of either an accounting data based index (ADBI) or a conventional weighted index by comparing financial objects in an ADBI with financial objects in a conventionally weighted index. Non-overlapping financial objects appearing only in the ADBI may be weighted by accounting data based weighting. Non-overlapping financial objects appearing only in the conventionally weighted index may be weighted by the conventional weighting. Financial objects may then be purchased based on the resulting weightings.

In an exemplary embodiment, an index of the largest 1,000 U.S. equities, weighted by accounting data, may overlap an index of the largest 1,000 U.S. capitalization-weighted companies by approximately 80%. The 20% of non-overlapping companies may drive the 2.0% increase in return of an accounting data based index such as, e.g., but not limited to, RESEARCH AFFILIATES Fundamental Index® (RAFI®) available from Research Affiliates, LLC of Pasadena, Calif., versus a cap-weighted index. A long-short strategy according to an exemplary embodiment is designed to leverage this 20% of companies that do not overlap, and may capture the expected alpha from the accounting data based indexation. An exemplary long-short U.S. equity strategy may be approximately beta and dollar neutral and can replace or complement market neutral or long-short strategies, or as part of a portfolio's alternative strategies bucket.

Accounting data based indexation may use economic measures of company size in constructing indexes. Using accounting data based economic measures of firm size may create an index that is indifferent to price. Accounting data based indexes may avoid flaws inherent in capitalization (price)-weighted indexes. Capitalization-weighted indexes naturally overweight overvalued stocks and underweight undervalued stocks. Accounting data based indexes may more accurately estimate a true fair value of a company, allowing the weight of a company's stock in the index to rise or fall only to the extent that the underlying economic value of the issuing company may rise or fall.

ADBI Portfolio Construction

Figure 5:
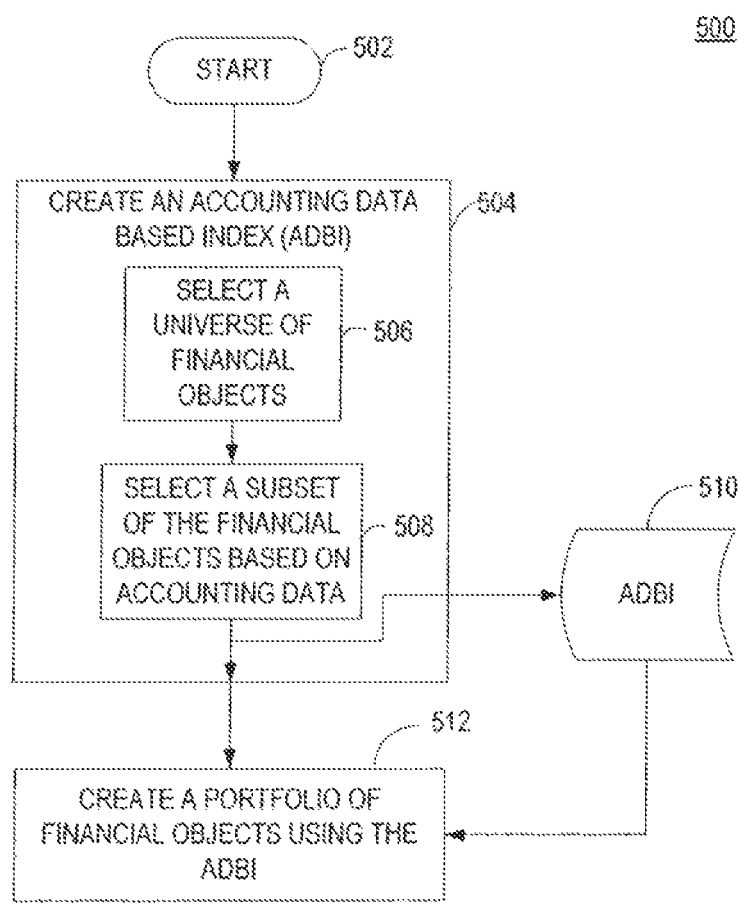
FIG. 5 is a process flow diagram of a method of constructing an ADBI and a portfolio of financial objects using the ADBI.

FIG. 5 illustrates an exemplary flow process diagram 500 of a method of constructing an ADBI and a portfolio of financial objects using the ADBI, starting at block 502. In block 504, the ADBI 510 may be created. Creating the ADBI may include, in block 506, selecting a universe of financial objects, and, in block 508, selecting a subset of the universe based on the accounting data to obtain the ADBI 510. Step 504 (not shown) may include weighting the selected financial objects according to a measure of value of an entity (for example, a company and/or government) associated with each financial object. (Refer to step 206.) Then, in block 512, a portfolio of financial objects may be created using the ADBI 510, including using the weighting of the financial objects in the portfolio according to a measure of value of a company and/or issuer of the financial object associated with each financial object in the portfolio.

In one or more embodiments, stratified sampling may be used. For example, the portfolio may not purchase all of the financial objects in the ADBI, and instead utilize a sampling methodology in order to obtain a portfolio correlation objective. An exemplary sampling may use quantitative analysis to select securities from the ADBI universe to obtain a representative sample of financial objects, that, for example, resemble the ADBI with respect to a number of factors, including for example, key risk factors, performance attributes, and other characteristics. Exemplary additional characteristics may include industry weightings (see Table 1); market capitalization; and/or other financial characteristics of the financial objects. The quantity of holdings in the portfolio may be based, for example, on a number of factors, including asset size of the portfolio, and other factors. The portfolio may be managed to hold less than or equal to the total number of financial objects in the ADBI. In an exemplary embodiment, in purchasing a portfolio based on the ADBI a correlation goal between the portfolio's performance and the performance of the ADBI may be set, such as, for example, 0.95 or better. A figure of 1.00 would represent perfect correlation between the portfolio's performance and ADBI.

According to an exemplary embodiment, a factor may be used to divide up the universe of financial objects of the ADBI into sub-universes (groups/strata) and one may expect the measurement of interest to vary among the different sub-universes. This variance may have to be accounted for when selecting the sample from the universe in order that the sample obtained is representative of the universe. This may be achieved by stratified sampling. A stratified sample may be obtained by taking samples from each of a plurality of stratum or sub-groups of a universe. When one samples a universe with several strata, generally the proportion of each stratum in the sample should be the same as in the universe. Stratified sampling techniques may be used when the population of the universe is heterogeneous, or dissimilar, where certain homogeneous, or similar, sub-populations (i.e., sub-universes) can be isolated (strata). Simple random sampling is most appropriate when the entire population from which the sample is taken is homogeneous. Some reasons for using stratified sampling over simple random sampling may include: (i) the cost per observation in the survey may be reduced; (ii) estimates of the population parameters may be wanted for each sub-population; and/or (iii) increased accuracy at given cost.

To construct an exemplary accounting data based index (ADBI), such as, e.g., but not limited to, the RESEARCH AFFILIATES FUNDAMENTAL INDEXED (RAFI®), some number of financial objects, e.g., 1000 US equities, may be selected and/or weighted based on the following four accounting data based measures of company size: book equity value, free cash flow, sales, and actual gross dividends paid, if any. In an exemplary embodiment, when calculating the variable for dividends, actual dividends paid plus stock buybacks minus new issues of stock are calculated. According to another exemplary embodiment, additional factors, including but not limited to, country factors, industry metrics, accounting data metrics, non-financial metrics, etc., may be used. In an exemplary embodiment, weighting may include weighting by current and/or trailing historical accounting data, and in a related embodiment, a five year weighted average and equal weighting for each of objective metrics (for example, book value, revenue, cash flow and dividends) may be used. In another related embodiment, such metrics may be weighted to include any one of current fundamental accounting measures, past fundamental accounting measures, and/or a mathematical blend of the two.

In an exemplary embodiment for debt instruments, weighting by metrics relating to governmental and/or institutional debt instruments may include, but not be limited to, duration, credit rating, convexity, credit risk, spread, optionality factors, yields, collateralization, priority, interest rate, financing restrictions, maturity date, limitations on dividends and/or market interest rates, the latter which may be inversely related to debt instrument prices.

An exemplary embodiment of an accounting data based index such as, for example, but not limited to, the RAFI® index may weight all the securities (financial objects) by each of the at least four accounting data based measures of scale and/or size detailed above. According to an exemplary embodiment, an optimal relative weighting between the four factors may differ by geography of the market from which the financial objects are selected such as, e.g., an equal weighting may be optimal in one country or industry sector, while a different relative weighting between the factors may make sense in another country or industry sector. The index may then compute an overall weight for each holding by equally-weighting each of the four accounting data based measure of firm size according to an exemplary embodiment. For example, assume that a company has the following weights: 2.8% of total US book values, 2% of total US cash flow, 3% of total US sales, and 2.2% of total US dividends. Relative weightings of each factor or metric may be varied, in one exemplary embodiment, such as, e.g., but not limited to, increased weighting for one of the selected variables, Equally-weighting any of these at least four accounting data based measures of firm size (i.e., book value, cashflow, sales and dividends) may produce a weight of 2.5%. According to an exemplary embodiment, for companies that have never paid dividends, one may exclude dividends from the calculation of the company's accounting data based weight and may weight the remaining variables equally. Finally, in an exemplary embodiment, the 1000 equities with the highest accounting data based weights may be selected and may be assigned a weight in the RAFI® portfolio equal to its accounting data based weight.

According to another exemplary embodiment, an accounting data based index such as, e.g., but not limited to, RAFI® maybe constructed using aggregate (not per-share) measures of firm size. For example, RAFI® may use total firm cash flow instead of cash flow per share and total book value instead of book value per share in its construction.

In an exemplary embodiment, the accounting data may include at least the following four factors, book value, sales/revenue, cash flow and dividends. In another exemplary embodiment, only one or more of these factors may be used. In another exemplary embodiment, additional factors may be used, such as, e.g., any other accounting data. In one exemplary embodiment, the weightings of each of these factors may be equal relative to one another, i.e., 25% of each of book value, sales/revenue, cash flow and actual paid dividends, if any. In another exemplary embodiment the weightings of each of these factors may be based on either current fundamental accounting measures, past fundamental accounting measures, or a mathematical blend of the two In one exemplary embodiment, if there are no dividends, then the other three factors may be weighted in equal parts, i.e., 33% each to book value, sales/revenue, and cash flow. In another exemplary embodiment, dividends may be weighted in a greater part such as, e.g., but not limited to, weighting dividends at 50% and book value, sales/revenue, and cash flow at ⅙th each, etc. In one exemplary embodiment, weightings may be the same, depending on the country or sovereign of origin or the industry sector of the stock or other financial object. In another exemplary embodiment, weightings may vary depending on the country or sovereign of origin or the industry sector of the stock or other financial object. In another exemplary embodiment, weightings may vary based on other factors, such as, e.g., but not limited to, types of assets, industry sectors, geographic sectors, countries, sizes of companies, profitability of companies, amount of revenue generated by the company, etc.

An accounting data based index may be available in several varieties to meet the unique needs of different classes of retail and institutional investors, including, e.g., but not limited to, as enhanced portfolios, Exchange Traded Funds (ETFs), passively managed funds, enhanced funds, active funds, collective investment trusts, open-end mutual funds, tax managed portfolios, a collection of financial objects managed collectively but tracked separately, separately managed accounts, other commingled funds/accounts and/or closed-end mutual funds. Various US and international investment managers may offer, e.g., but not limited to, a suite of products.

A commingled account or other fund or separately managed account investing in assets based on an Accounting Data Based Index, such as, e.g., Research Affiliates Fundamental Index®, L.P. (RAFI® LP) may increase the alpha generated by accounting data based indexation in the US through improvements or enhancements, including, e.g., but not limited to, monthly cash rebalancing and quality of earnings and corporate governance screens. The additional enhancements may be expected to add additional performance above what may be achieved through the use of accounting data based indexing in portfolio construction.

A commingled account or other fund or separately managed account investing in assets based on an ADBI international LP such as, RAFI® International LP (RAFI®-I may apply accounting data based indexation to the international equity space in an exemplary embodiment to create an enhanced portfolio of, e.g., but not limited to 1000 international (ex-US) equities. RAFI®-I may be expected to outperform capitalization weighted indexes. RAFI®-I is an enhanced portfolio that may use monthly cash rebalancing and quality of earnings and corporate governance screens to improve upon the performance of the RAFI® International index.

Open-end mutual funds may manage financial objects employing a fixed income strategy and portable alpha using the Accounting Data Based Index (ADBI) according to an exemplary embodiment.

An Exchange Traded Fund (ETF) of the ADBI such as, e.g., but limited to, POWERSHARES FTSE RAFI® US 1000 Portfolio ETF (ticker symbol: PRF) may meet needs of retail and institutional investors interested in a low-cost means of accessing the power of accounting data based indexing in another exemplary embodiment.

Another exemplary embodiment includes a closed-end fund implementing accounting data based indexing such as, e.g., Canadian Fundamental Income 100, a closed-end mutual fund of the largest 100 accounting data based equities in Canada which attracted investments from retail and institutional investors in 2005, one of the most difficult closed end markets in recent history, demonstrating the strength of the accounting data based indexation strategy.

Exemplary Sector ADBI Indexes

According to one exemplary embodiment, a universe may be selected where the universe includes one or more sectors, and the weightings may be based on one or more sector metrics or measures. A non-exclusive list of exemplary sectors is shown in Table 1, which is based on North American Industry Classification System (NAICS) sectors. A non-exclusive list of industry sector metrics that be used in selecting and/or weighting, for example, financial objects, is shown in Table 2.

TABLE 1

Exemplary List of Sectors (based on NAICS sectors)

Agriculture, Forestry, Fishing and Hunting
Mining
Utilities
Construction
Manufacturing
Wholesale Trade
Retail Trade
Transportation and Warehousing
Information
Finance and Insurance
Real Estate and Rental and Leasing
Professional, Scientific, and Technical Services
Management of Companies and Enterprises
Administrative and Support and Waste Management and Remediation Services
Education Services
Health Care and Social Assistance
Arts, Entertainment, and Recreation
Accommodation and Food Services
Other Services (except Public Administration)
Public Administration

TABLE 2

Exemplary List of Sector Metrics

| Industry growth rate | Total capital expenditures | Inventories total - end of year |
|---|---|---|
| Average industry dividends | Supplemental labor costs | Inventories finished products - end of year |
| New orders for manufactured goods | Fuel costs | Inventories work in process - end of year |
| Shipments | Electric energy used | Inventories materials supplies fuels, etc - end of year |
| Unfilled orders | Inventories by stage of fabrication | Value of manufacturers inventories by stage of fabrication - beginning of year |
| Inventories | Number of production workers | Inventories total - beginning of year |
| Inventories-to-shipments ratio | Payroll of production workers | Inventories finished products - beginning of year |
| Value of product shipments | Hours of production workers | Inventories work in process - beginning of year |
| Statistics from department of commerce, industry associations, for industry groups and industries | Cost of purchased fuels and electric energy | Inventories materials supplies fuels, etc - beginning of year |
| Geographic area statistics | Electric energy quantity purchased | Value of shipments - total |
| Annual survey of manufacturers (ASM) | Electric energy cost | Value of shipments - products |
| Employment | Electric energy generated | Value of shipments - total miscellaneous receipts |
| All employees payroll | Electric energy sold or transferred | total miscellaneous receipts - Value of resales |
| All employees hours | Cost of purchased fuels | total miscellaneous receipts - contract receipts |
| All employees total compensation | Capital expenditure for plant and equipment total | Other total miscellaneous receipts |

TABLE 2-continued

Exemplary List of Sector Metrics

| Industry growth rate | Total capital expenditures | Inventories total - end of year |
|---|---|---|
| All employees total fringe benefit costs | Capital expenditure for plant and equipment - buildings and other structures | Interplant transfers |
| Total cost of materials | Capital expenditure for plant and equipment - machinery and equipment total | Costs of materials - total |
| Payroll | Capital expenditure for plant and equipment - autos, trucks, etc for highway use | Costs of materials - materials, parts, containers, packaging, etc |
| Value added by manufacture | Capital expenditure for plant and equipment - computers, peripheral data processing equipment | Costs of materials - resales |
| Cost of materials consumed | Capital expenditure for plant and equipment - all other expenditures | Costs of materials - purchased fuels |
| Value of shipments | Value of manufacturers inventories by stage of fabrication - end of year | Costs of materials - purchased electricity |
| Costs of materials - contract work | Industry cost of capital | Average industry dividend |

As set forth herein, the universe may refer to a complete set of a group of financial objects, for example. Within the group, there may be sub-groups, termed sectors. Each sector may include additional sub-portions, termed sub-sectors. This process may be reiterated for finer degrees of granularity as well.

As one example, the universe may comprise all publicly traded stocks. A sector within the universe may comprise all publicly traded stocks for the developed world except the United States. An exemplary ADBI using the foregoing sector is the FTSE® RAFI® Developed ex US Mid Small 1500 Index, available from PowerShares Global Exchange Traded Fund Trust of Houston, Tex. A brief, non-exhaustive list of exemplary sectors is provided in Table 3.

An exemplary process for construction of the aforementioned FTSE® RAFI® Developed ex US Mid Small 1500 Index comprises the following. First, the securities universe of companies of the index may be calculated, based on any exemplary objective metrics. The exemplary objective metrics may include, for example: (i) the percentage representation of each security using only sales figures; (ii) the percentage representation of each security using cash flow figures; (iii) the percentage representation of each security using book value; and/or (iv) the percentage representation of each security using dividends. (A security that has not paid a dividend in the past five years will have a percentage representation of zero.)

Next, the securities may be ranked, for example in order based on the fundamental value. For example, the securities may be ordered in descending order of their fundamental value, and the fundamental value of each company may be divided, for example, by its free-float adjusted market capitalization. The largest small and medium capitalization securities may then be selected. The latter will be the FTSE RAFI® Developed ex US Mid Small 1500 Index constituents. The weights of the constituents in the underlying index may be set proportional to their fundamental value, for example.

Exemplary industry metrics that may be used in weighting financial objects may be found in Table 3.

TABLE 3

Exemplary Industry Metrics

FTSE RAFI ® Utilities Sector Portfolio
FTSE RAFI ® Basic Materials Sector Portfolio
FTSE RAFI ® Consumer Goods Sector Portfolio
FTSE RAFI ® Consumer Services Sector Portfolio
FTSE RAFI ® Energy Sector Portfolio
FTSE RAFI ® Financials Sector Portfolio
FTSE RAFI ® Industrials Sector Portfolio
FTSE RAFI ® Health Care Sector Portfolio
FTSE RAFI ® Telecom & Technology Sector Portfolio Exemplary ADBI Index Computation Processes According to an exemplary embodiment, the ADBI index may be created by a selection subsystem and a weighting function generating subsystem.

According to an exemplary embodiment, the selection subsystem may be operative to: (i) for each entity, assign a percentage factor to each of a plurality of the at least one non-market capitalization objective measure of scale and/or size metric, each of the percentage factors corresponding to the importance of the at least one non-market capitalization objective measure of scale and/or size metric to the selection; (ii) for each entity, multiply each of the percentage factors with the corresponding non-market capitalization objective measure of scale and/or size metric thereof, to compute a selection relevance factor for the entity; and/or (iii) determine the selected group of entities by: (a) comparing the selection relevance factors for the entities; (b) ranking the entities based on the comparison; and/or (c) selecting a predetermined number of the entities having highest rankings to be the selected group of entities.

According to an exemplary embodiment, the weighting function generating subsystem may be operative to: (i) for each entity including the selected group of entities, assign a percentage factor to each of a plurality of the at least one non-market capitalization objective measure of scale and/or size metric, each percentage factor corresponding to the importance of the at least one non-market capitalization objective measure of scale and/or size metric to the weighting; (ii) for each entity including the selected group of entities, multiply each of the percentage factors with the corresponding non-market capitalization objective measure of scale and/or size metric thereof, the corresponding non-market capitalization objective measure of scale and/or size metric being a member of the plurality, to compute an entity function; and/or (iii) set the weighting function as a combination of the totality of the entity functions.

According to an exemplary embodiment, the selection subsystem may be operative to: (i) for each entity, assigning a percentage factor to each of a plurality of the at least one objective metric, each percentage factor corresponding to the importance of the at least one objective metric to the selection; (ii) for each entity, multiplying each of the percentage factors with the corresponding objective metric thereof, to compute a selection relevance factor for the entity; and/or (iii) determining the selected group of entities by: (a) comparing the selection relevance factors for the entities; (b) ranking the entities based on the comparison; and/or (c) selecting a predetermined number of the entities having highest rankings to be the selected group of entities.

According to an exemplary embodiment, the object weighting function generating subsystem may be operative to: (i) for each entity including the selected group of entities, assigning a percentage factor to each of a plurality of the at least one objective metric, each percentage factor corresponding to the importance of the at least one objective metric to the weighting; (ii) for each entity including the selected group of entities, multiplying each of the percentage factors with the corresponding objective metric thereof, the corresponding objective metric being a member of the plurality, to compute an entity function; and/or (iii) setting the weighting function as a combination of the totality of the entity functions.

Exemplary Accounting Data Based Indexation Long-Short (ADBI-LS)

Accounting data based indexation long-short (ADBI-LS) such as, e.g., but not limited to, RAFI®-LS, is a long-short U.S. equity strategy that leverages ADBI such as RAFTED innovation. The RAFI® U.S. 1000 portfolio is designed to outperform traditional capitalization-based indexes By going long in stocks that have greater weight in the RAFI® U.S. 1000 portfolio relative to a traditional index, such as the Russell 1000 and short in the stocks that are underweight in the RAFI® U.S. 1000 relative to the Russell 1000, the RAFI®-LS strategy captures the RAFI® alpha process and enhances that alpha source.

ADBI-LS such as, e.g., RAFI®-LS according to an exemplary embodiment, is designed to be roughly dollar and beta neutral, but not sector neutral. The sector bet can be significant if the ADBI strategy determines that a sector is substantially overvalued.

In general the overlap between ADBI RAFI® U.S. 1000 and a traditional capitalization based index, such as the Russell 1000 may be about 75%. This may give 25% weights for the long portfolio and 25% weights for the short portfolio. The portfolio may be applied to 300% long and 300% short, which may magnify the RAFI® alpha and the portfolio volatility. Leverage may be applied tactically, and can range from about 200% long/short to about 400% long/short according to exemplary embodiments.

ADBI-LS such as, e.g., RAFI®-LS according to an exemplary embodiment may be designed to achieve an annual volatility of 15-25%. Volatility of the exemplary RAFI®-LS, since inception, has been about 15%.

According to an exemplary embodiment, ADBI-LS, such as, e.g., RAFI®-LS may use leverage in both its short and long positions. On average, $100 invested in RAFI®-LS may result in a $300 notional long position and a $300 notional short position.

Exemplary Implementation of an Exemplary ADBI-LS's Long and Short Positions

According to an exemplary embodiment, one does not necessarily directly need to hold long or short positions in the underlying stocks, nor does it need to access a direct line of credit for the portfolio leverage. Instead, according to an exemplary embodiment, derivatives, such as a total return swaps may be used to implement the long and short positions. It may be possible to achieve minimal counterparty default risk exposure by entering into swaps with large Wall Street firms in an exemplary embodiment. Investors in an ADBI-LS may not be physically shorting any U.S. equities; rather, investors may merely hold OTC derivative contracts. This may provide both tax benefits and efficiency in investment logistics.

ADBI-LP such as, e.g., RAFI®-LP, may be a full-market ADBI. ADBI-LS such as, e.g., RAFI®-LS, may be a fund that uses the differences between company weights in ADBI such as, e.g., RAFI® and in a capitalization-weighted index to establish long and short positions according to an exemplary embodiment.

ADBI-LS may be designed to be dollar neutral and equity beta neutral in an exemplary embodiment. Therefore, one may expect ADBI-LS returns to be largely uncorrelated with the equity market return in an exemplary embodiment. However, ADBI may not be market neutral in the traditional sense as it is not industry sector neutral in an exemplary embodiment.

ADBI-LS does not pair positions, and thus is different from traditional equity long-short strategies whereby, e.g., but not limited to, a short General Motors (GM) position is paired with a long Ford position. Instead, ADBI-LS may acquire both long and short positions based on the relative difference between the ADB Index such as, e.g., FUNDAMENTAL INDEX® weights and those of a cap-weighted index, such as, e.g., but not limited to the Russell 1000.

An exemplary embodiment of ADBI-LS may rebalance periodically and/or aperiodically. For example, on average, the ADBI-LS, such as, e.g., RAFI®-LS portfolio may hold its long-short bets for about one year. The cash flow from new capital contributed to the strategy may be used to rebalance the portfolio to create new or alter existing long-short bets according to an exemplary embodiment.

In an exemplary embodiment, the present invention may be a method of constructing a portfolio of financial objects, comprising: purchasing a portfolio of a plurality of mimicking financial objects to obtain and/or create a mimicking or resampled portfolio, wherein performance of the portfolio of mimicking financial objects substantially mirrors the performance of the accounting data based index based portfolio without substantially replicating the accounting data based index based portfolio. The method may further obtain and/or use a risk model for the portfolio where the risk model mirrors a risk model of the accounting data based index. The risk model may be substantially similar to the Fama-French factors, wherein the Fama-French factors may comprise at least one of size effect (e.g., where small cap beats large cap), value effect (e.g., where high B/P beats low B/P), and/or momentum effect (e.g. where strong momentum beats weak momentum in very long run, e.g. 10 or more years). The performance of the portfolio of mimicking financial objects may substantially mirror the performance of the accounting data based index based portfolio without substantially replicating financial objects and/or weightings in the accounting data based index based portfolio.

In another exemplary embodiment, the present invention may include purchasing a plurality of financial objects according to weightings substantially similar to the weightings of an accounting data based index (ADBI), where performance of the financial objects substantially mirrors the performance of the ADBI without using substantially the same financial objects in the ADBI.

Exemplary Embodiment of High Yield Debt Instrument Index

In one or more exemplary embodiments, the index of financial objects may include an index of debt instruments. In one exemplary embodiment, the index of debt instruments may include a bond index, and an exemplary bond index may include a high yield bond index.

An exemplary debt instrument may include any debt instruments issued by any type of entity or organization. Exemplary issuing organizations may include, for example, a company, a state, a sovereign, a municipality, and/or a country, to name a few. A bond may entitle a holder of the bond to receive, for example, interest payments on the purchase price of the bond for as long as the holder holds the bond. Further, a bond may have a maturity date, at which the issuer of the bond may be required to repay the purchase price of the bond to the current holder of the bond. A bond may be bought, sold, and/or swapped as any other security or debt instrument.

High-yield bonds may include debt instruments, such as, for example, bonds, rated below investment grade by bond rating organizations, such as, for example, Moody's or Standard and Poor's. High-yield bonds may consequently carry a higher interest rate than investment grade bonds. For example, according to one exemplary embodiment, a bond rated at BBB or below may be considered to be a high-yield bond, and may carry a higher interest rate than a bond rated above BBB. Debt instruments receiving below investment grade ratings may be, for example, debt instruments issued by companies with poor credit ratings due to, for example, negative cash flow, excessive debt, and/or poor market conditions, etc., as they pertain to the company.

In an exemplary embodiment, a construction technique for creating a bond index may include selecting high yield bonds from a universe of bonds using a selective metric related to the issuer of the bond, and weighting the selected high yield bond constituents according to at least one objective metric related to the issuer. The constituents may be weighted in relative proportion to, the objective metric, which may include, e.g., but not be limited to, an accounting data metric, such as, e.g., but not limited to, sales and/or dividends associated with the issuer of the bonds, i.e., accounting data associated with the debt issuer. In one exemplary embodiment, a weighted combination such as, e.g., an equally weighted combination of sales, book value, any dividends, cash flow (how much cash is going in and out, ignoring capital expenditures), and/or collateral may used to weight. Other metrics such as, e.g., EBITDA, may also be used in an exemplary embodiment. A composite measure may also be created as a combination of a group of such factors.

According to another exemplary embodiment, other accounting data metrics may be used, however in no case will a metric be used which is materially influenced by price, such as, e.g., but not limited to, market capitalization. Further, weighting is not to be based on the product of the total number of bonds and face value. In an exemplary embodiment, the universe of bonds may be partially, or all, below investment grade bonds, such as, e.g., but not limited to, BBB or less. An exemplary investment grade bond may include bonds contained in or associated with the Merrill Lynch Master High Yield Bond Index. In one exemplary embodiment, high yield bonds may include bonds with at most a BBB bond rating. In another exemplary embodiment, high yield bonds may include, e.g., but are not limited to, bonds with a BB or less rating, etc.

In an exemplary embodiment, the index weight for each issuer may be based on, e.g., but not limited to, a composite company accounting data measure created from a weighting, such as, e.g., equal weighting of one or a plurality of data metrics. In one such exemplary embodiment, the factor may be any one or more of: (i) normalized, (ii) for a 5-year span, (iii) an average value, and/or (iv) non-zero. Exemplary factors may include, without limitation, factors based at least partially on any one or more of: sales, book value, cash-flow, any dividends, and/or collateral, etc.

In an exemplary embodiment, for each debt issue associated with each issuer, the issuer weight may be assigned to each corresponding debt issue and, according to an exemplary embodiment, may be pro-rated for the face value of the debt issue relative to the firm's total debt outstanding. For example, in the entire Merrill Lynch bond universe, bonds that cannot be matched to underlying company accounting data may be omitted from the RAFI® High Yield Index.

Table 4 depicts a summary correlation matrix for an exemplary embodiment of an high yield bond index. In this embodiment, gains may be somewhat concentrated during times when high yield-bonds may have been weak, but, the statistical significance in so short a span was remarkable for these embodiments.

TABLE 4

Correlation Matrix (1997-June 2006)

| Index | Ann. TR | Std Dev | H0A0 | G5O2 | Sales | Div | Book | CF |
|---|---|---|---|---|---|---|---|---|
| ML HY | 6.23% | 7.33% | 1.00 | | | | | |
| ML Gov 1-10 | 5.17% | 2.96% | −0.11 | 1.00 | | | | |
| Sales | 8.03% | 7.05% | 0.90 | −0.11 | 1.00 | | | |
| Dividend | 9.22% | 6.15% | 0.80 | 0.00 | 0.89 | 1.00 | | |
| Book | 6.97% | 8.74% | 0.95 | −0.14 | 0.95 | 0.82 | 1.00 | |
| Cash Flow | 7.54% | 7.05% | 0.94 | −0.08 | 0.95 | 0.87 | 0.97 | 1.00 |
| Collateral | 7.21% | 8.47% | 0.94 | −0.13 | 0.95 | 0.81 | 0.98 | 0.96 |
| Composite | 7.68% | 7.57% | 0.93 | −0.12 | 0.98 | 0.87 | 0.98 | 0.98 |
| Par | 6.18% | 9.07% | 0.99 | −0.15 | 0.90 | 0.79 | 0.96 | 0.93 |
| Equal | 7.09% | 7.08% | 0.96 | −0.14 | 0.93 | 0.82 | 0.93 | 0.92 |
| Equity Market* | 8.99% | 16.23% | 0.54 | −0.26 | 0.42 | 0.31 | 0.49 | 0.46 |

*Market - monthly cap-weighted returns from NYSE, AMEX, and NASDAQ (not excess return)

Table 5 depicts exemplary regression results for an exemplary embodiment of a high yield bond index.

TABLE 5

Regression Results (1997-June 2006)

| LHS | α (bp) | ML Gov 1-10 yr | ML HY* | Mkt | SMB | HML | UMD | $R^2$ |
|---|---|---|---|---|---|---|---|---|
| RAFI ® HY Sales | 26.95 | −0.08 | 0.87 | | | | | 0.84 |
| | 3.01 | −0.88 | 23.73 | | | | | |
| | 28.67 | −0.13 | 0.91 | −0.04 | | | | 0.84 |
| | 3.24 | −1.41 | 21.58 | −2.12 | | | | |
| | 24.64 | −0.11 | 0.89 | −0.02 | 0.02 | 0.05 | 0.00 | 0.85 |
| | 2.70 | −1.18 | 19.78 | −0.70 | 0.73 | 1.75 | 0.00 | |
| | 26.18 | −0.07 | 0.87 | −0.02 | 0.03 | 0.05 | −0.03 | 0.85 |
| | 2.89 | −0.74 | 18.92 | −0.84 | 1.21 | 1.72 | −1.87 | |
| RAFI ® HY Dividend | 21.38 | 0.01 | 0.87 | | | | | 0.84 |
| | 2.70 | 0.07 | 23.92 | | | | | |
| | 22.59 | −0.04 | 0.90 | −0.03 | | | | 0.84 |
| | 2.87 | −0.44 | 22.60 | −1.76 | | | | |
| | 21.11 | −0.05 | 0.91 | −0.01 | −0.04 | 0.03 | 0.00 | 0.86 |
| | 2.77 | −0.65 | 21.31 | −0.32 | −2.28 | 1.42 | 0.00 | |
| | 20.44 | −0.07 | 0.92 | 0.00 | −0.05 | 0.03 | 0.01 | 0.86 |
| | 2.67 | −0.84 | 20.83 | −0.25 | −2.43 | 1.41 | 0.87 | |
| RAFI ® HY Book | 8.14 | −0.17 | 1.13 | | | | | 0.93 |
| | 1.10 | −2.30 | 37.36 | | | | | |
| | 8.87 | −0.19 | 1.15 | −0.02 | | | | 0.93 |
| | 1.19 | −2.50 | 32.42 | −1.09 | | | | |
| | 11.49 | −0.22 | 1.18 | −0.03 | −0.03 | −0.02 | 0.00 | 0.93 |
| | 1.50 | −2.76 | 30.87 | −1.41 | −1.68 | −1.04 | 0.00 | |
| | 12.06 | −0.20 | 1.17 | −0.03 | −0.03 | −0.02 | −0.01 | 0.93 |
| | 1.56 | −2.50 | 29.63 | −1.46 | −1.39 | −1.05 | −0.81 | |
| RAFI ® HY Cash flow | 7.71 | −0.01 | 1.00 | | | | | 0.95 |
| | 1.53 | −0.22 | 45.41 | | | | | |
| | 8.09 | −0.02 | 1.01 | −0.01 | | | | 0.95 |
| | 1.60 | −0.46 | 40.11 | −0.94 | | | | |
| | 9.87 | −0.04 | 1.03 | −0.02 | −0.02 | −0.02 | 0.00 | 0.95 |
| | 1.89 | −0.74 | 36.97 | −1.43 | −1.52 | −1.23 | 0.00 | |
| | 10.20 | −0.03 | 1.03 | −0.02 | −0.02 | −0.02 | −0.01 | 0.95 |
| | 1.94 | −0.57 | 35.41 | −1.46 | −1.27 | −1.22 | −0.64 | |
| RAFI ® HY Collateral | 10.85 | −0.14 | 1.08 | | | | | 0.91 |
| | 1.39 | −1.73 | 34.19 | | | | | |
| | 12.13 | −0.17 | 1.11 | −0.03 | | | | 0.92 |
| | 1.57 | −2.15 | 30.45 | −1.8 | | | | |
| | 13.20 | −0.19 | 1.13 | −0.03 | −0.02 | −0.01 | 0.00 | 0.92 |
| | 1.64 | −2.26 | 28.71 | −1.56 | −1.05 | −0.29 | 0.00 | |
| | 13.41 | −0.18 | 1.12 | −0.03 | −0.02 | −0.01 | 0 | 0.92 |
| | 1.65 | −2.13 | 27.58 | −1.57 | −0.93 | −0.29 | −0.28 | |
| RAFI ® HY Composite | 8.67 | −0.11 | 1.07 | | | | | 0.94 |
| | 1.51 | −1.95 | 42.55 | | | | | |
| | 9.22 | −0.13 | 1.09 | −0.01 | | | | 0.94 |
| | 1.60 | −2.20 | 38.04 | −1.20 | | | | |
| | 11.72 | −0.15 | 1.11 | −0.03 | −0.03 | −0.03 | 0.00 | 0.95 |
| | 2.00 | −2.55 | 35.73 | −1.79 | −1.98 | −1.53 | 0.00 | |
| | 12.03 | −0.15 | 1.11 | −0.03 | −0.03 | −0.03 | 0 | 0.95 |
| | 2.03 | −2.35 | 34.12 | −1.81 | −1.74 | −1.52 | −0.51 | |

TABLE 5-continued

Regression Results (1997-June 2006)

| LHS | α (bp) | ML Gov 1-10 yr | ML HY* | Mkt | SMB | HML | UMD | R² |
|---|---|---|---|---|---|---|---|---|
| RAFI ® HY Par weighted | −7.05 | −0.11 | 1.22 | | | | | 0.98 |
| | −1.83 | −2.82 | 77.06 | | | | | 0 |
| | −6.55 | −0.13 | 1.24 | −0.01 | | | | 0.98 |
| | −1.71 | −3.17 | 66.59 | −1.68 | | | | |
| | −6.94 | −0.13 | 1.23 | −0.01 | 0.00 | 0.00 | 0.00 | 0.98 |
| | −1.74 | −3.06 | 61.93 | −1.12 | 0.11 | 0.40 | 0.00 | |
| | −6.37 | −0.11 | 1.23 | −0.01 | 0.00 | 0.00 | −0.01 | 0.98 |
| | −1.59 | −2.68 | 59.87 | −1.22 | 0.50 | 0.37 | −1.46 | |
| RAFI ® HY Equal weighted | 14.43 | −0.08 | 0.93 | | | | | 0.93 |
| | 2.45 | −1.35 | 38.27 | | | | | 0 |
| | 15.33 | −0.11 | 0.96 | −0.03 | | | | 0.93 |
| | 2.63 | −1.81 | 33.86 | −1.99 | | | | |
| | 10.77 | −0.08 | 0.92 | −0.01 | 0.05 | 0.04 | 0.00 | 0.94 |
| | 1.87 | −1.29 | 32.12 | −0.34 | 3.47 | 2.61 | 0.00 | |
| | 11.77 | −0.05 | 0.91 | −0.01 | 0.05 | 0.04 | −0.02 | 0.94 |
| | 2.06 | −0.87 | 30.94 | −0.47 | 3.85 | 2.59 | −1.78 | |

ML 1-10 yr Government bond index
ML HY*—Modified Merrill Lynch High Yield Master II Index (only includes bonds considered in LHS)

In an exemplary embodiment, one aspect of index construction may include data acquisition, i.e., for example, collecting, compiling, normalizing, and/or associating data regarding a debt issuer and a given debt instrument. Here, according to an exemplary embodiment, a comprehensive database may be built, i.e. constructed, of high-yield bonds and accounting data metrics related to the companies issuing the debt instruments. This database may be linked to an existing database of related fundamental metrics, such as accounting data that may include accounting data indicative of relative company size, other than market capitalization and price, with all the normal complications of ticker and Committee on Uniform Security Identification Procedures (CUSIP) differences.

In exemplary embodiments, the high yield bond universe may include all bonds, and/or all issues within a particular bond space. An exemplary bond space according to one exemplary embodiment may include the Merrill High Yield Bond space. Then, a selection of bonds having ratings below a predefined threshold may be selected. For example, bonds rated BBB or less by a bonds rating organization may be selected. Then, according to one exemplary embodiment, a further selection may be made using at least one accounting data metric associated with the issuer company, wherein the metric is not materially influenced by price. In an exemplary embodiment, the full below-investment-grade universe may be used, subject to the investability constraints imposed by a company, such as, for example, but not limited to, Merrill Lynch. In an exemplary embodiment, such constraints and/or others may be lifted, and further improved results may be gained. In one such exemplary embodiment, the liquidity thereof may be degraded, for example.

Table 6 depicts a correlation matrix for an exemplary embodiment of a high yield bond index. Table 6 illustrates statistical significance witnessed by the various exemplary weighting metrics. The following parameters are included: (i) Mean refers to a mean monthly return; (ii) Std Dev refers to a standard deviation from the mean; (iii) H0A0 refers to Merrill Lynch High Yield Master II Index; (iv) G5O2 refers to Merrill Lynch U.S. Treasuries 1-10YR; (v) Sales, Dividend, Book (value), Cash Flow refer to exemplary objective metrics of scale and/or size in relation to the entity; (vi) Collateral refers to assets used to pay debt holders, e.g., for secured debt instruments; (vii) Composite refers to a composite of two or more other metrics, which in the particular case, refers to Sales, Dividend, Book, Cash Flow and Collateral; (viii) Par refers to Face Value of the security; (ix) Equal refers to an equal weighting of all the qualified securities in the universe; and (x) Market refers to a proxy for the market, where data may be used as a benchmark capitalization weighted universe provided by the Center for Research in Securities (CRS), available from the University of Chicago and Standard & Poor's.

TABLE 6

Correlation Matrix (1997-June 2006)

| Index | Mean | Std Dev | H0A0 | G5O2 | Sales | Div | Book | CF | Colltrl | Cpsit | Par | Equal | Mkt |
|---|---|---|---|---|---|---|---|---|---|---|---|---|---|
| H0A0 | 0.52% | 2.12% | 1.00 | −0.11 | 0.90 | 0.80 | 0.95 | 0.94 | 0.94 | 0.93 | 0.99 | 0.96 | 0.54 |
| G5O2 | 0.43% | 0.86% | −0.11 | 1.00 | −0.11 | 0.00 | −0.14 | −0.08 | −0.13 | −0.12 | −0.15 | −0.14 | −0.26 |
| Sales | 0.67% | 2.03% | 0.90 | −0.11 | 1.00 | 0.89 | 0.95 | 0.95 | 0.95 | 0.98 | 0.90 | 0.93 | 0.42 |
| Dividend | 0.77% | 1.77% | 0.80 | 0.00 | 0.89 | 1.00 | 0.82 | 0.87 | 0.81 | 0.87 | 0.79 | 0.82 | 0.31 |
| Book | 0.58% | 2.52% | 0.95 | −0.14 | 0.95 | 0.82 | 1.00 | 0.97 | 0.98 | 0.98 | 0.96 | 0.93 | 0.49 |
| Cash Flow | 0.63% | 2.03% | 0.94 | −0.08 | 0.95 | 0.87 | 0.97 | 1.00 | 0.96 | 0.98 | 0.93 | 0.92 | 0.46 |
| Collateral | 0.60% | 2.44% | 0.94 | −0.13 | 0.95 | 0.81 | 0.98 | 0.96 | 1.00 | 0.98 | 0.95 | 0.93 | 0.46 |
| Composite | 0.64% | 2.19% | 0.93 | −0.12 | 0.98 | 0.87 | 0.98 | 0.98 | 0.98 | 1.00 | 0.93 | 0.93 | 0.45 |
| Par | 0.51% | 2.62% | 0.99 | −0.15 | 0.90 | 0.79 | 0.96 | 0.93 | 0.95 | 0.93 | 1.00 | 0.97 | 0.52 |
| Equal | 0.59% | 2.04% | 0.96 | −0.14 | 0.93 | 0.82 | 0.93 | 0.92 | 0.93 | 0.93 | 0.97 | 1.00 | 0.48 |
| Market* | 0.75% | 4.69% | 0.54 | −0.26 | 0.42 | 0.31 | 0.49 | 0.46 | 0.46 | 0.45 | 0.52 | 0.48 | 1.00 |

*Market - monthly cap-weighted returns from NYSE, AMEX, and NASDAQ (not excess return)

In an exemplary embodiment, the index may be reconstituted/rebalanced on a periodic and/or aperiodic basis such as, e.g., but not limited to, every month as bonds mature, and may fall out of the index, and as new issues are listed and/or issued.

Exemplary Embodiment of Emerging Markets Financial Objects Index

In one or more exemplary embodiments, an index may be created by selecting and weighting emerging market debt instruments, such as, for example, but not limited to, bonds, using metrics not materially influenced by price, e.g., face value for the debt instrument. In an exemplary embodiment, a developed market debt and/or a developed market except the US debt instrument, for example, may be provided. An exemplary embodiment of an emerging market bond index may include an Emerging Market Bond Fundamental Index® available from Research Affiliates, LLC of Pasadena, Calif. USA. In addition to the written description and figures hereof, Tables 7, 8 and 9, below, provide detailed support for exemplary embodiments. Various metrics may be used to select and/or weight financial objects, where the objects may include debt instruments. In an exemplary embodiment, if an issuer of the bond is, e.g., a country, country-based metrics may be used.

In some cases, particular numerical metrics may first need to be derived from publicly accessible data sources (see, e.g., Table 8). For example, a rating universe may be converted, according to an exemplary embodiment, into a numeric value as shown in an exemplary embodiment, see Table 8. For example, BBB debt may be given a value of, e.g., but not limited to, 1, BB debt may be assigned a value of, e.g., but not limited to, 2, CCC debt may be assigned a value of, e.g., but not limited to, 4, etc. Once debt has been assigned to at least one debt rating, by at least one rating agency, then debt may be segmented according to rating, for example.

Weighting according to an exemplary embodiment may include averaging over a given time period, such as, e.g., but not limited to 1 year, 2 years, 5 years, or any other suitable time period. In certain cases, if a bond has been recently issued, some data may not yet be available, thus data using a time lag may be used to provide more complete data, such as, e.g. but not limited to, a 1 year, 2 year, 3 year or more lag, or one or more days, weeks, and/or months of time lag may be used.

The issuing governments of debt instruments from regions considered to be emerging markets may issue emerging market debt instruments, such as, for example, emerging market bonds. Emerging market debt instruments may be purchased, held, and traded just as any debt instruments from any other market. An emerging market debt instrument may be different from any other debt instrument only in that the issuer of the emerging market debt instrument may be the government of a region considered to be an emerging market and/or may be issued from a company from an emerging market and/or developing country, for example.

In exemplary embodiments, emerging market debt instrument data from one or more countries and/or sovereigns which issue bonds may be used. For example, in certain exemplary embodiments, JP Morgan and/or Merrill Lynch emerging market data may be used, though any type of market data relating to debt instruments issued in all markets may be used, and a selection of these debt instruments may be made from the universe of debt instrument data using a predefined threshold for example, for any entity, any issuer, any organization, region, individual, country, sovereign municipality, geographic region or the like.

In an exemplary embodiment, a first entity's emerging market data may be correlated with a second company's emerging market data. For example, in an exemplary embodiment, a Merrill Lynch emerging market debt instrument data may be used, and a correlation (for example, 99.6% in certain exemplary embodiments) may be established with the data of JP Morgan.

In an exemplary embodiment, unlike with stocks, there may not be traditional accounting data metrics associated with, e.g., a country which issues a debt instrument. Accordingly, no "sales," "book values," and the like may be associated with or related to, for example, the emerging market (EM) debt for a region, such as a sovereign entity. In one or more exemplary embodiments, a broad range of data may be used to measure characteristics or factors. According to one exemplary embodiment, data associated with the issuing entity may be used as a data metric according to which a selection of debt instruments may be selected, and according to which weighting may be calculated for selected constituents of the index. According to an exemplary embodiment, data regarding an entity such as, e.g., a geographic region such as a country may be used. A data source may be created and maintained, or may be used if available from a third party. For example, a CIA database about country data may be used as a data source from which debt instruments associated with countries may be selected and weighted according to data values of fields of a country record in the database. In certain exemplary embodiments, such characteristics or factors may be referred to as fundamentals, data metrics, measures, or elements available from one or more sources (for example, databases such as the CIA World Factbook, a Farmer's Almanac, State Department statistics, Population: US Census Bureau (2005), Area: CIA World Factbook (2006), GDP: World Bank Statistics (2004), Oil Consumption: CIA World Factbook (2005), Corruption: Transparency International, Democracy: Freedom House, Freedom in the World (2001), Expenditures: CIA World Factbook (2006), GNI: World Bank Statistics (2004), Debt: CIA World Factbook (2005), Merrill Lynch Emerging Markets Data: IGOV from Bloomberg (Foreign Sovereign debt BBB+ and lower) and any other publicly available data pertaining to countries or sovereigns) from which information retrieval may be performed.

Table 7 depicts an exemplary summary of metrics and observed results for exemplary emerging market bonds. The following parameters are included: (i) Mean refers to a mean monthly return; (ii) Min refers to a minimum monthly return; (iii) Max refers to a maximum monthly return; (iv) Std Dev refers to a standard deviation from the mean; (v) RMSE is the root mean squared error, i.e., a tracking error; (vi) Rating 1 and Rating 2 are numerical ratings, as defined in Table 8; (vii) OAS (option adjusted spread, or optionality factor) is an adjusted measure of the spread of the yield of a given bond over the treasury yield; (viii) Modified Dur (duration) represents the time-weighted average of cash payments scaled by the bond yield, providing a measure of sensitivity of the bond price to interest rate movements; and/or (ix) Observations are the number of data points based on an exemplary 9 years of data (with an exemplary monthly frequency). In an exemplary embodiment, modified duration is an adjustment of a Macaulay duration, which is a discounted cash flow weighted duration.

TABLE 7

Merrill Lynch Emerging Markets Data (Foreign Sovereign debt BBB+ and lower)

| | Mean | Min | Max | Stderr | RMSE | rating1 | rating2 | OAS | Modified Dur | Observations |
|---|---|---|---|---|---|---|---|---|---|---|
| Sample: January 1998-January 2007 | | | | | | | | | | |
| Reported Benchmark | 0.950 | −29.17 | 8.60 | 0.394 | | | | | | |
| Cap Weighted (Constructed) | 0.950 | −29.26 | 8.61 | 0.395 | 0.078 | 1.17 | 1.99 | 498.4 | 5.53 | 108 |
| Equal Weighted (constructed) | 0.999 | −23.93 | 7.94 | 0.333 | 0.858 | 1.17 | 2.38 | 506.9 | 4.96 | 108 |
| 1-yr Lagged | 1.070 | −24.95 | 10.82 | 0.379 | 0.808 | 1.15 | 1.83 | 542.2 | 5.23 | 108 |
| 2-yr Lagged | 1.053 | −23.35 | 10.79 | 0.380 | 1.001 | 1.17 | 1.64 | 496.1 | 5.13 | 108 |
| 3-yr Lagged | 0.942 | −22.50 | 9.89 | 0.362 | 1.019 | 1.20 | 1.46 | 470.2 | 5.10 | 108 |
| Fundamental Measures (1) | | | | | | | | | | |
| Population | 1.029 | −15.51 | 8.40 | 0.262 | | 0.86 | 2.03 | 401.4 | 4.73 | 108 |
| Area | 1.355 | −38.16 | 16.64 | 0.541 | | 1.34 | 3.23 | 714.5 | 4.58 | 108 |
| GDP | 1.059 | −18.65 | 9.79 | 0.303 | | 0.91 | 2.15 | 434.9 | 4.78 | 108 |
| Oil Consumption | 1.143 | −24.92 | 11.67 | 0.377 | | 1.08 | 2.54 | 514.3 | 4.85 | 108 |
| Corruption Index | 0.986 | −21.83 | 7.59 | 0.316 | | 1.11 | 2.56 | 471.3 | 5.07 | 108 |
| Democracy Index | 0.955 | −21.99 | 8.16 | 0.329 | | 1.12 | 2.53 | 477.0 | 5.28 | 108 |
| Expenditures | 1.076 | −20.93 | 10.79 | 0.335 | | 1.00 | 2.36 | 457.3 | 4.92 | 108 |
| GNI | 1.026 | −20.27 | 12.01 | 0.346 | | 0.98 | 2.30 | 450.9 | 5.05 | 108 |
| Debt | 1.197 | −26.83 | 13.06 | 0.413 | | 1.11 | 2.60 | 544.8 | 4.97 | 108 |
| EW Each Factor | 1.177 | −25.12 | 11.77 | 0.385 | | 1.03 | 2.40 | 520.6 | 4.86 | 108 |
| GDP/Population | 0.996 | −22.69 | 8.15 | 0.328 | | 1.10 | 2.55 | 479.6 | 5.06 | 108 |
| Oil Consumption/Population | 1.032 | −24.59 | 8.02 | 0.333 | | 1.25 | 2.98 | 508.4 | 4.92 | 108 |
| Expenditures/Population | 1.103 | −18.20 | 6.84 | 0.271 | | 1.04 | 2.42 | 427.2 | 4.93 | 108 |
| GNI/Population | 0.876 | −19.66 | 8.02 | 0.312 | | 1.08 | 2.54 | 453.9 | 5.20 | 108 |
| Debt/GDP | 0.936 | −21.86 | 8.65 | 0.295 | | 1.23 | 2.92 | 510.8 | 4.76 | 108 |
| Fundamental Measures (2) | | | | | | | | | | |
| Population | 0.934 | −14.37 | 6.39 | 0.209 | | 0.82 | 1.93 | 366.0 | 4.49 | 108 |
| Area | 1.232 | −34.59 | 15.00 | 0.452 | | 1.11 | 2.62 | 614.0 | 4.44 | 108 |
| GDP | 0.957 | −16.12 | 6.36 | 0.231 | | 0.78 | 1.81 | 360.4 | 4.56 | 108 |
| Oil Consumption | 1.039 | −21.35 | 7.71 | 0.288 | | 0.93 | 2.16 | 428.2 | 4.64 | 108 |
| Corruption Index | 0.933 | −18.34 | 7.19 | 0.251 | | 0.90 | 2.06 | 403.9 | 5.06 | 108 |
| Democracy Index | 0.951 | −18.37 | 7.01 | 0.264 | | 0.98 | 2.20 | 430.1 | 5.13 | 108 |
| Expenditures | 0.984 | −17.45 | 6.50 | 0.250 | | 0.82 | 1.89 | 372.6 | 4.71 | 108 |
| GNI | 0.968 | −17.29 | 6.64 | 0.259 | | 0.84 | 1.97 | 382.5 | 4.93 | 108 |
| Debt | 1.061 | −22.70 | 8.51 | 0.308 | | 0.96 | 2.23 | 458.9 | 4.80 | 108 |
| EW Combination | 1.035 | −21.46 | 8.08 | 0.293 | | 0.87 | 2.00 | 439.2 | 4.67 | 108 |
| GDP/Population | 0.949 | −17.55 | 6.34 | 0.243 | | 0.87 | 2.00 | 391.4 | 4.86 | 108 |
| Oil Consumption/Population | 0.967 | −18.37 | 6.89 | 0.244 | | 1.01 | 2.35 | 414.5 | 4.87 | 108 |
| Expenditures/Population | 0.915 | −12.59 | 4.93 | 0.187 | | 0.71 | 1.62 | 332.1 | 4.69 | 108 |
| GNI/Population | 0.867 | −14.08 | 5.33 | 0.222 | | 0.89 | 2.07 | 386.1 | 5.10 | 108 |
| Debt/GDP | 0.877 | −17.53 | 7.73 | 0.244 | | 1.00 | 2.36 | 476.3 | 4.80 | 108 |

Fundamental measures (1) applies the country weight directly to each security issued by the country
Fundamental measures (2) splits the country weight equally amongst all securities issued by that country in a given month (all returns in percent per month)

Table 8 depicts an exemplary numerical identification for bond ratings.

TABLE 8

Exemplary Numerical Key for Bond Ratings credit rating 1:

| 1 | BBB |
| 2 | BB |
| 3 | B |
| 4 | CCC |
| 5 | CC |
| 6 | C |
| 7 | D | credit rating 2:

| 1 | BBB1 |
| 2 | BBB2 |
| 3 | BBB3 |
| 4 | BB1 |
| 5 | BB2 |
| 6 | BB3 |
| 7 | B1 |
| 8 | B2 |
| 9 | B3 |
| 10 | CCC1 |
| 11 | CCC2 |
| 12 | CCC3 |
| 13 | CC |
| 14 | C |
| 15 | D |

Table 9 depicts exemplary country metrics as may be used for weighting emerging market and/or currency financial objects.

TABLE 9

Exemplary Country Metrics

| Country | Code | Population | Area sq M | GDP | Oil Consumption | Corruption | Democracy | Expenditures | GNI | Debt |
|---|---|---|---|---|---|---|---|---|---|---|
| Algeria | 1 | 32531853 | 919590 | 212300000000 | 209000 | 2.8 | 1.5 | 30750000000 | 51028000000 | 22710000000 |
| Argentina | 3 | 39537943 | 1068296 | 483500000000 | 486000 | 2.8 | 5.5 | 39980000000 | 260000000000 | |
| Bahrain | 5 | 688345 | 257 | 13010000000 | 40000 | 5.8 | | 3447000000 | 7246280000 | 4682000000 |
| Barbados | 7 | 279254 | 166 | 4569000000 | 10900 | 6.9 | | 886000000 | 2613990000 | 668000000 |
| Brazil | 10 | 186112794 | 3286470 | 1492000000000 | 2199000 | 3.7 | 4.0 | 172400000000 | 529000000000 | 214900000000 |
| Bulgaria | 8 | 7450349 | 42822 | 61630000000 | 94000 | 4.0 | 4.5 | 10900000000 | 13240800000 | 12050000000 |
| Chile | 11 | 15980912 | 292258 | 169100000000 | 240000 | 7.3 | 5.0 | 24750000000 | 70619200000 | 43150000000 |
| China | 12 | 1306313812 | 3705386 | 7262000000000 | 4956000 | 3.2 | 0.5 | 424300000000 | 1130000000000 | 197800000000 |
| Colombia | 13 | 42954279 | 439733 | 281100000000 | 252000 | 4.0 | 3.0 | 48770000000 | 81551500000 | 38260000000 |
| Costa Rica | 14 | 4016173 | 19730 | 37970000000 | 37000 | 4.2 | 5.5 | 3195000000 | 15715300000 | 5366000000 |
| Cote d'Ivoire | 22 | 17298040 | 124502 | 24780000000 | 32000 | 1.9 | 1.5 | 2830000000 | 10258500000 | 11850000000 |
| Croatia | 15 | 4495904 | 21831 | 50330000000 | 89000 | 3.4 | 4.5 | 19350000000 | 19916700000 | 23560000000 |
| Dominican Republic | 16 | 8950034 | 18815 | 55680000000 | 129000 | 3.0 | | 5485000000 | 18954900000 | 6567000000 |
| Ecuador | 17 | 13363593 | 109483 | 49510000000 | 129000 | 2.5 | 4.0 | | 13957900000 | 15690000000 |
| Egypt | 2 | 77505756 | 386660 | 316300000000 | 562000 | 3.4 | 1.5 | 27680000000 | | 30340000000 |
| El Salvador | 18 | 6704932 | 8124 | 32350000000 | 39000 | 4.2 | 4.5 | 3167000000 | 13030700000 | 6575000000 |
| Greece | 19 | 10668354 | 50942 | 226400000000 | 405700 | 4.3 | 5.0 | 103400000000 | 121000000000 | 65510000000 |
| Guatemala | 36 | 14655189 | 42042 | 59470000000 | 61000 | 2.5 | 3.5 | 4041000000 | 19569100000 | 4957000000 |
| Hungary | 20 | 10006835 | 35919 | 149300000000 | 140700 | 5.0 | 5.5 | 58340000000 | 49161600000 | 42380000000 |
| Indonesia | 21 | 241973879 | 741096 | 827400000000 | 1183000 | 2.2 | 3.5 | 57700000000 | 145000000000 | 135700000000 |
| Iraq | 39 | 26074906 | 168753 | 89800000000 | 383000 | 2.2 | 0.0 | 24000000000 | 0 | 93950000000 |
| Jamaica | 23 | 2731832 | 4244 | 11130000000 | 66000 | 3.6 | 5.0 | 3210000000 | 7256730000 | 4962000000 |
| Jordan | 24 | 5759732 | 35637 | 25500000000 | 103000 | 5.7 | 3.0 | 4688000000 | 8784960000 | 7683000000 |
| Kazakhstan | 25 | 15185844 | 1049150 | 118400000000 | 189400 | 2.6 | 1.5 | 12440000000 | 20078200000 | 24450000000 |
| Lebanon | 26 | 3826018 | 4015 | 18830000000 | 107000 | 3.1 | 1.5 | 6595000000 | 17585000000 | 20790000000 |
| Malaysia | 27 | 42909464 | 261969 | 74300000000 | 60950 | 5.1 | 2.0 | 34620000000 | 79326600000 | 48840000000 |
| Mexico | 28 | 106202903 | 761602 | 1006000000000 | 1752000 | 3.5 | 4.5 | 184000000000 | 550000000000 | 159800000000 |
| Morocco | 29 | 32725847 | 172413 | 134600000000 | 167000 | 3.2 | 2.5 | 16770000000 | 34681400000 | 17320000000 |
| Nigeria | 30 | 128771988 | 356667 | 125700000000 | 275000 | 1.9 | 3.0 | 13540000000 | 37132000000 | 31070000000 |
| Pakistan | 38 | 162419946 | 310401 | 347300000000 | 365000 | 2.1 | 1.5 | 20070000000 | 60047300000 | 33540000000 |
| Panama | 31 | 3039150 | 30193 | 20570000000 | 40520 | 3.5 | 5.5 | 3959000000 | 9455180000 | 8834000000 |
| Peru | 32 | 27925628 | 496223 | 155300000000 | 161000 | 3.5 | 3.5 | 22470000000 | 52209300000 | 29950000000 |
| Philippines | 33 | 87857473 | 115830 | 430600000000 | 338000 | 2.5 | 4.5 | 15770000000 | 80844900000 | 57960000000 |
| Poland | 34 | 38635144 | 120728 | 463000000000 | 424100 | 3.4 | 5.5 | 63220000000 | 164000000000 | 86820000000 |
| Qatar | 35 | 863051 | 4416 | 19490000000 | 30000 | 5.9 | | 11310000000 | | 17500000000 |
| Russia | 41 | 143420309 | 6592735 | 1408000000000 | 2310000 | 2.4 | 2.0 | 125600000000 | 253000000000 | 175900000000 |
| Serbia and Montenegro | 42 | 10829175 | 39517 | 26270000000 | 64000 | 2.8 | | 11120000000 | | |
| Slovakia | 43 | 5431363 | 18859 | 78890000000 | 82000 | 4.3 | 5.5 | 23200000000 | 20307200000 | |
| South Africa | 44 | 44344136 | 471008 | 491400000000 | 460000 | 4.5 | 5.5 | 70620000000 | 122000000000 | |
| South Korea | 37 | 48422644 | 38023 | 925100000000 | 2070000 | 5.0 | 5.0 | 189000000000 | | 130300000000 |
| Thailand | 45 | 65444371 | 198455 | 524800000000 | 785000 | 3.8 | 4.5 | 31760000000 | 118000000000 | |
| Trinidad and Tobago | 46 | 1088644 | 1980 | 11480000000 | 24000 | 3.8 | 5.0 | 4060000000 | 7808790000 | |
| Tunisia | 9 | 10074951 | 63170 | 70880000000 | 87000 | 4.9 | 1.5 | 8304000000 | 19984500000 | |
| Turkey | 47 | 69660559 | 301382 | 508700000000 | 619500 | 3.5 | 2.5 | 115300000000 | 167000000000 | |
| Ukraine | 48 | 47425336 | 233089 | 299100000000 | 303000 | 2.6 | 3.0 | 22980000000 | 35185000000 | |
| Uruguay | 49 | 3415920 | 68039 | 49270000000 | 41500 | 5.9 | 6.0 | 4845000000 | 19189400000 | |
| Venezuela | 50 | 25375281 | 352143 | 145200000000 | 500000 | 2.3 | 3.0 | 41270000000 | | |
| Vietnam | 51 | 83535576 | 127243 | 227200000000 | 185000 | 2.6 | 0.5 | 12950000000 | 32761600000 | |

In accordance with one or more exemplary embodiments, such data elements or fundamentals may comprise any one of: an economic metric; a population or demographic based measure; a population level; an area; a geographic area; an economic factor; a gross domestic product (GDP); GDP growth; a natural resource characteristic; a petroleum characteristic; a resource consumption metric; a petroleum consumption amount; a liquid natural gas (LNG) characteristic; a liquefied petroleum gas (LPG) characteristic; an expenditures characteristic; gross national income (GNI); a debt characteristic; a rate of inflation; a rate of unemployment; a reserves level; a population characteristic; a corruption characteristic; a democracy characteristic; a social metric; a political metric; a religious metric; a per capita ratio of any of the foregoing or any other characteristic; a rate change in any of the foregoing metrics; a derivative of any foregoing or any other characteristic and/or a ratio of two of the foregoing or any other characteristics. Examples of the foregoing, not to be interpreted by way of limitation, are provided in the following table. In certain exemplary embodiments, certain of the foregoing may not be proper measures of the relative size (and/or other characteristics) pertaining to an entity, region, country, or the like but may be indicative of useful measures for selecting and weighting constituents of a index according to an exemplary embodiment.

In an exemplary embodiment, one or more such factors, data metrics, measures, characteristics and/or fundamentals may be applied to select and to weight constituents to construct a bond index in one of a number of ways. A fundamental weight into, for example, a sovereign debt, may be a first such way. One or more metrics may be used to select debt instruments and one or more metrics may be used to weight the constituent selected debt instruments to construct the index. However, the data metric does not use a price-based metric, i.e., the metric will not be the selection and weighting according to products of total debt and market price. An exemplary first way is in a way that applies, for example, to a weight associated with (i) an issuer; (ii) an entity (including a region or country) associated with such issuer; (iii) where such issuer and such entity are the same; and/or (iv) where a combination of the foregoing, may be applied directly (or indirectly in an alternative embodiment) to each financial object (including, for example, a bond, or a security) issued by such foregoing entity(ies). As one example, a fundamental metric may be used to select weight, and may be applied to determine or calculate a constituent weighting for a given debt instrument issued by a sovereign in a first way, wherein in such first way, the country weight is directly applied to each financial object (for example, a security and/or a bond) issued by the country. According to an exemplary embodiment, a plurality of data measures may be used. A weighted average such as, for example, an equally weighted average of data factors, may be used. In one exemplary embodiment, if a given data metric is believed to be suspect, such as, e.g., geographic area, so that use of the data factor may result in taking on too much risk, a particular rules based threshold such as a predetermined maximum or minimum weighting ceiling or floor may be used to prevent overexposure to a suspected excess risk factor.

An exemplary second way of weighting debt instruments may apply, for example, to a weight associated with (i) an issuer; (ii) an entity (including a region or country) associated with such issuer; (iii) where such issuer and such entity may be the same; and/or (iv) where a combination of the foregoing, is applied in an apportioned manner among either all (or in an alternative embodiment, a portion of) the foregoing, in relation to one or more additional parameters. As one example, a fundamental weight may be applied to the debt instruments issued by of a sovereign in a second way, wherein in such a second way, the country weight may be split such as, e.g., but not limited to equally amongst all the debt instruments (for example, a security and/or a bond) issued by a country in a given month.

In certain exemplary embodiments, a number of methods may be employed so as to select, weight, or to measure certain characteristics and/or factors associated with one of the foregoing entities (i)-(iv). In an exemplary such embodiment, a factor, data metric, and/or characteristic associated with a geographic region (such as a country, in an exemplary embodiment thereof) may be measured. In order to select emerging market data, a predetermined data element value may be used, such as, e.g., countries with per capita oil consumption of less then or equal to a given value, for example, or per capita GDP of a given amount or less. For example, there may be many ways to measure a country's scale and/or size as compared to the rest of the world. Examples include, without limitation, any factors and/or characteristics associated with or related to, without limitation, any one or combination of the foregoing: economic factors, demographic factors, social factors political factors, the population, area, geographic area gross domestic product (GDP), GDP growth, natural resources, oil (or any other energy source) consumption, expenditures, government expenditures, gross national income (GNI), measures of freedom, democracy, and corruption, rate of inflation, rate of unemployment, reserves level, and/or total debt, etc. Additional examples may include any ratio of the foregoing or other factors and/or characteristics, as derived solely from one or more of the foregoing or other factors and/or characteristics, and/or as derived in combination with one or more additional factors and/or characteristics.

In one or more exemplary embodiments, the foregoing methods and/or systems employing such methods exhibited positive results. For example, in an exemplary embodiment, a RAFI® emerging markets measure may outperform a value weighting measure. For example, in one such exemplary embodiment, such emerging markets measure may outperform value weighting to add a certain amount (in one embodiment, 3.3% or the like) per annum above a cap-weighted emerging markets index.

In certain exemplary embodiments, not by way of limitation, the foregoing exemplary geographic area metric may provide superior results as a fundamental metric. In an exemplary embodiment, a RAFI® equal weighted measure using an exemplary equal weighting of 9 exemplary data metrics, namely population, area, etc (see table 10) outperforms all (or in alternative embodiments, one or more of) other single metrics of a factor and/or characteristic for one of the foregoing categories (i)-(iv), such as for example the size of a country. In an exemplary embodiment, results are not quite statistically significant, but t-statistics of approximately 1.8 on a multi-year (for example, 9 year or the like) sampling of data are found.

In varying exemplary embodiments, factors and/or characteristics either not associated with, not related to, or alternatively, not the same as a given measure may be used. As one example thereof, a measure that is either not or not associated with size may be used. As one such example, such non-size measures as one or more indices associated with or related to the corruption (for example, a corruption index) and/or the relative amount of democracy (for example, a democracy index) may be used. As noted, in one or more exemplary embodiments, a ratio of any and/or all of the foregoing factors and/or characteristics may be used, in combination with one another and/or with other factors. As one example, ratios of such items such as, e.g., but not limited to population adjusted per capita measures of GDP, oil consumption, expenditures, GNI, debt, in any combination thereof, may be used. Similarly, ratios of a measure to geographic area may be calculated and may be added to a weighted average, such as, e.g., but not limited to, an equal, and/or non-equal weighting of a plurality of factors. In exemplary embodiments, the market may efficiently factor the foregoing into pricing, such that the foregoing do not add value to the weighting. In exemplary embodiments, size measures may relatively add value because over- or under-valuation of a country's debt may be more-or-less independent of such measures. In some cases if a given measure may skew to a limited diversification, a proportional weighting factor may be used to avoid undue risk. In certain embodiments, the foregoing applies to the description hereof with respect to equities.

Once an index is created by selecting and weighting debt instruments from emerging markets in proportion to weighting factors, then a portfolio of debt instruments may be purchased as selected by the index in proportion to the weightings as indicated by the index In such exemplary embodiments, the RAFT® debt instrument portfolio system may perform strongest in weak equity markets, though in alternative embodiments, the RAFT® debt instrument portfolio system may perform strongest in strong equity markets. In exemplary embodiments, the former embodiments apply to embodiments incorporating emerging markets.

Table 10 depicts exemplary alpha (risk adjusted return) and t-stats (point estimation coefficient divided by standard error) for exemplary country related objective metrics.

TABLE 10

| Measure | Alpha | t-Stat |
| --- | --- | --- |
| Population | 2.1% | 0.8 |
| Area | 4.7% | 1.5 |
| GDP | 2.2% | 1.0 |
| Oil Consumption | 2.8% | 1.8 |
| Expenditures | 2.2% | 1.2 |
| GNI | 1.5% | 0.8 |
| Total Debt | 3.3% | 1.9 |
| RAFI ® EM | 3.3% | 1.8 |
| Equal Wgt Countries | 1.1% | 0.9 |
| Corruption | 1.0% | 0.7 |
| Democracy | 0.5% | 0.4 |
| GDP per capita | 1.1% | 0.8 |
| Oil per capita | 1.5% | 1.3 |
| Exp per capita | 1.7% | 0.8 |
| GNI per capita | −0.3% | −0.2 |
| Debt/GDP | 0.6% | 0.3 |

Exemplary Embodiments of Currency

In one or more exemplary embodiments, an index may be created by selecting and/or weighting currency, including hard currencies and/or related currency instruments, such as, for example, but not limited to, bonds or currency derivatives, using metrics not materially influenced by currency value. Weighting according to an exemplary embodiment may include averaging over a given time period, such as, e.g., but not limited to 1 year, 2 years, 5 years, or any other suitable time period.

Currency may be a primary economic unit of exchange. All items that may be purchased, such as, for example, but not limited to, goods, services, raw materials, land, financial objects, etc. may be valued in terms of currency, and currency may be exchanged for any of the foregoing and vice versa. Organizations such as, for example, but not limited to, countries, states, provinces, municipalities, sovereigns, and/or organizations composed of any number of the foregoing, may issue and/or control their own forms of currency. For example, the United States of America issues the United States Dollar. The European Union, composed of various countries, issues the Euro-dollar. Japan uses the Yen. Britain uses the Pound Sterling. The currency of an issuer may generally, but not always, be the only currency accepted in most day-to-day economic transactions, such as, for example, but not limited to, the purchase of goods and services, within the boundaries of the issuer's authority. For example, in the area in which the US government has governing authority, US dollars are generally the only acceptable currency for the purchase of items from stores or for the purchase of services. Currencies from different issuers may be exchanged for each other according to prevailing exchange rates. The exchange rates may indicate the value of currencies relative to other currencies.

One may invest in currency through the purchase of one or more currencies by a purchaser, using one or more other currencies. For example, a purchaser may use US dollars to purchase Euros, according to the prevailing exchange rates, if the purchaser believes the Euro will appreciate against the US dollar. There may also be a number of financial objects, or foreign exchange (currency or FX) instruments associated with currencies. For example, there may a number of currency derivatives including, for example, but not limited to, currency options such as currency puts and currency calls, currency futures, etc.

In exemplary embodiments, currency data from one or more countries and/or sovereigns which issue currency may be used. Any type of market data relating to currency related instruments issued in any and/or all markets may be used, and a selection of the currency related instruments may be made from the universe of currency related instrument data using a predefined threshold such as, for example, but not limited to, for any entity, any issuer, any organization, region, individual, country, sovereign municipality, geographic region and/or the like. Exemplary currency data for the spot exchange rate may be obtained from, e.g. the Board of Governors of the Federal Reserve System, and may be downloaded, for example, from Bloomberg of New York, N.Y., among other services. Exemplary pricing and returns data for currency futures and/or other derivatives may be obtained from, e.g., but not limited to, Commodity Research Bureau (CRB), and/or from Bloomberg, etc. Exemplary data for government fixed income instruments may be obtained from, e.g., Bloomberg. Information on a country's characteristics and economic variables may be obtained from, for example, the U.S. Central Intelligence Agency (CIA) World Factbook, Global Financial Data, Bloomberg, and/or Center for International Comparisons at the University of Pennsylvania, etc.

In an exemplary embodiment, a first entity's currency related instrument data may be correlated with a second country's currency and related instruments.

Unlike with stocks, a currency instrument may not have traditional accounting data metrics associated with the instrument, or with the country that issues the currency. Accordingly, no "sales", "book value" or the like may be associated with or related to, for example, the currency for a region, or a sovereign entity. In an exemplary embodiment, a broad range of data may be used to measure characteristics or factors. According to one exemplary embodiment, data associated with the currency-issuing entity may be used for selecting and/or weighting currency or currency-related instruments to construct the index. According to an exemplary embodiment, data regarding an entity such as, e.g., a geographic region such as, e.g., but not limited to, a country may be used. A data source may be created and maintained, and/or may be used if available from a third party. For example, a CIA factbook and/or other databases about country data may be used as a data source from which currency instruments associated with countries may be selected and weighted according to data values of fields of a country record in the database. In certain exemplary embodiments, such characteristics, metrics, measures and/or factors may be referred to as data metrics, measures, parameters and/or elements available from one or more sources (for example, databases such as, e.g., but not limited to, the CIA World Factbook, etc.) from which information may be retrieved.

In accordance with one or more exemplary embodiments, such data elements, measures, and/or metrics may comprise any one or more of, e.g., but not limited to: a demographic measure; a population level; an area; a geographic area; an economic factor; a gross domestic product (GDP); GDP growth; a natural resource characteristic; a petroleum characteristic; a resource consumption metric; a petroleum consumption amount; a liquid natural gas (LNG) characteristic; a liquefied petroleum gas (LPG) characteristic; an expenditures characteristic; gross national income (GNI); a debt characteristic; a rate of inflation; a rate of unemployment; a reserves level; a population characteristic; a corruption characteristic; a democracy characteristic; a social metric; a political metric;

nominal interest rates and the ratios of nominal interest rates between issuing sovereign entities; commercial paper yield metric; credit rating metric; consumer price index (CPI); purchasing power of local currency metric; country current account flow; metrics measuring relations between the purchasing power of local currency metric and nominal exchange rates and deviations from historical trends in such metrics; government exchange rate regime; a per capita ratio of any of the foregoing or any other characteristic; and/or a derivative of any foregoing or any other characteristic and/or a ratio of two of the foregoing or any other characteristics. In certain exemplary embodiments, certain of the foregoing may not be proper measures of the relative size (and/or other characteristics) pertaining to an entity, region, country, or the like but may be useful measures for selecting and weighting constituents of a index according to an exemplary embodiment.

In an exemplary embodiment, one or more such metrics and/or measures, parameters and/or characteristics may be applied to select and/or to weight constituents to construct a currency and/or currency related instrument index in any of a number of ways. A currency may be selected and/or weighted using a combination of one or more metrics. One or more metrics may be used to select currency and/or related currency instruments and one or more metrics may be used to weight the selected constituent selected instruments to construct the index. An exemplary method of selecting or waiting may include applying, for example, a weight associated with (i) an issuer; (ii) an entity (including a region or country) associated with such issuer; (iii) where such issuer and such entity are the same; and/or (iv) where a combination of the foregoing, may be applied directly (or indirectly in an alternative embodiment) to each currency related instrument (including, for example, a currency derivative) issued by such foregoing entity(ies). As one example, a fundamental metric may be used to select weight, and may be applied to determine, compute, and/or calculate a constituent weighting for a given currency issued by a sovereign or related currency instrument in a given way, wherein in such way, the country weight may be directly applied to each currency and/or related currency instrument (such as, for example, but not limited to, a currency derivative) issued by a country or other entity. According to an exemplary embodiment, a plurality of data measures and/or metrics may be used. A weighted average such as, for example, an equally weighted average of data factors, may be used. In one exemplary embodiment, if a given data metric is believed to be suspect, such as, e.g., geographic area, so that use of the data factor may result in taking on too much risk, a particular rules based threshold such as, e.g., but not limited to, a predetermined maximum and/or minimum weighting ceiling and/or floor may be used to prevent overexposure to a suspected excess risk factor.

Another exemplary embodiment of selecting and/or weighting currency and/or currency related instruments may apply, for example, to a weight a metric associated with (i) an issuer; (ii) an entity (including a region and/or country) associated with such issuer; (iii) where such issuer and such entity may be the same; and/or (iv) where a combination of the foregoing, may be applied in an apportioned manner among either all (or in an alternative embodiment, a portion of) the foregoing, in relation to one or more additional parameters.

Various exemplary embodiments, or combinations of others noted herein, may also be used.

In certain exemplary embodiments, a number of methods may be employed so as to select, weight, and/or to measure certain characteristics, metrics, measures, parameters and/or factors associated with one of the foregoing entities (i)-(iv). In an exemplary such embodiment, a factor, data metric, measure, parameter, and/or characteristic associated with, e.g., but not limited to, a geographic region (such as a country, in an exemplary embodiment thereof) may be measured. In order to select currency data, a predetermined data element value may be used, such as, e.g., but not limited to, countries with an inflation rate of, e.g., but not limited to, less than or equal to a given value, for example, or, e.g., but not limited to, per capita GDP of a given amount or less. For example, there may be many ways to measure a country's scale or size relative to the rest of the world, or a relevant portion of the world, for example. Exemplary embodiments may include, without limitation, any metrics, measures, parameters, factors and/or characteristics associated with and/or related to, without limitation, any one or combination of the foregoing: economic factors, demographic factors, social factors political factors, the population, area, geographic area gross domestic product (GDP), GDP growth, natural resources, oil (or any other energy source) consumption, expenditures, government expenditures, gross national income (GNI), measures of freedom, democracy, and corruption, rate of inflation, rate of unemployment, reserves level, and/or total debt, etc. Additional examples may include, e.g., but not limited to, any ratio of the foregoing or other factors and/or characteristics, as derived solely from one or more of the foregoing or other factors and/or characteristics, and/or as derived in combination with one or more additional factors and/or characteristics.

In one or more exemplary embodiments, the foregoing methods and/or systems employing such methods to select or weight a currency instrument index may exhibit positive results as compared to conventional weighting measures.

In certain exemplary embodiments, not by way of limitation, the foregoing exemplary geographic area metric may provide superior results as an accounting data and/or country-data based metric.

In varying exemplary embodiments, factors and/or characteristics either not associated with, not related to, or alternatively, not the same as, a given measure may be used. As one example thereof, a measure that is not size, or not associated with size, may be used. As one such example, such non-size related measures may include, e.g., but not limited to, a metric related to corruption (e.g., but not limited to, a corruption index) and/or the relative amount of democracy (e.g., but not limited to, a democracy index) may be used. As noted, in one or more exemplary embodiments, a ratio of any one or more, and/or all of the foregoing metrics, measures, parameters, factors and/or characteristics may be used, in combination with one another and/or with other factors. As one example, ratios of such items such as, e.g., but not limited to, population adjusted per capita measures of GDP, oil consumption, expenditures, GNI, debt, in any combination thereof, may be used. Similarly, ratios of a measure to, e.g., but not limited to, geographic area, may be calculated and may be added to a weighted average, such as, e.g., but not limited to, an equal, and/or non-equal weighting of a plurality of factors. In exemplary embodiments, the market may efficiently factor the foregoing into pricing, such that the foregoing does not add value to the weighting. In exemplary embodiments, size measures may relatively add value because over- or under-valuation of a country's debt may be more-or-less independent of such measures. In some cases if a given measure may skew to a limited diversification, a proportional weighting factor may be used to avoid undue risk. In certain exemplary embodiments, the foregoing may apply to the description hereof with respect to other financial objects.

Once an index is created by selecting and/or weighting currency and/or currency related instruments in proportion to weighting factors, then a portfolio of currency and/or related instruments may be purchased as selected by the index in proportion to the weightings as indicated by the index. In such exemplary embodiments, the currency portfolio system may form part of a diversified portfolio of portfolios to help take advantage of positive currency market impacts.

Exemplary Embodiments of Commodities

In one or more exemplary embodiments, the index may be a commodities index.

Commodities may be raw materials such as, e.g., but not limited to, wheat, corn sugar, soybeans, soybean oil, oats, rough rice, cocoa, coffee, cotton, lean hogs, pork bellies, live cattle, feeder cattle, WTI crude oil, light sweet crude oil, brent crude, natural gas, heating oil, gasoline, Gulf Coast gasoline, propane, uranium, iron, gold, platinum, palladium, silver, copper, lead, zinc, tin, aluminum, aluminum alloy, nickel, recycled steel, ethanol, rubber, palm oil, wool, coal, and/or polypropylene coal etc. Industries may use commodities, e.g., but not limited to, in the production of goods. For example, cereal makers may use wheat in the production of, e.g., but not limited to, cereal, and gasoline companies may use light sweet crude oil in the production of, e.g., but not limited to, automotive gasoline. Treasury bills may also be considered to be related to commodities. Although treasury bills are a fixed income instrument, in the context of investment in commodity treasury bills may be collateral for the derivative investment.

One may invest in commodities through the purchase of quantities of the commodities themselves, or through the purchase of derivative instruments, or other financial objects related to the commodities, such as, e.g., but not limited to, commodities futures, commodities options such as, e.g., but not limited to, commodities puts and/or commodity calls, and/or commodity forwards. Further, investments may be made in the producer of a commodity, such as, e.g., but not limited to, mining companies with respect to a mined product commodity.

The following is an exemplary summary of a construction method for creating an exemplary commodities index, including selecting commodities (including commodities, such as, e.g., but not limited to, oil, corn, and/or gold, etc. and related derivative instruments, such as, e.g., but not limited to, commodities futures), and from a universe of commodities using a selective metric related to the companies and/or industries responsible for the production and/or consumption of the commodity, and/or weighting the commodity according to at least one objective metric related to the size of the companies and/or industries (including, e.g., but not limited to, industry metrics as noted in Table 2) responsible for the production and/or consumption of the commodity. In an exemplary embodiment the constituents may be selected and/or weighted in relative proportion to, e.g., but not limited to, sales and/or dividends, if any, associated with companies and/or industries responsible for the production and/or consumption of the commodity. According to another exemplary embodiment, other accounting data metrics may be used, however in no case will a metric be used which is materially influenced by share price, such as, e.g., but not limited to, the measure of the market value of the total amount of commodities produced and/or traded; the measure of total value of the related financial instruments traded; and/or the market capitalization of the companies and/or industries responsible for the production and/or consumption of the commodities.

In an exemplary embodiment, the metric used for selection and/or weighting for each group of companies and/or industries responsible for the production and/or consumption of a commodity may be based on a composite company accounting data measure created from, e.g., but not limited to, a weighting, such as, e.g., but not limited to, equal weighting, of one or a plurality of data metrics. In one such exemplary embodiment, the metrics may be any one, or more of in combination, (i) normalized, (ii) for a 5-year span, and/or (iii) an average value. Exemplary factors, measures, parameters, metrics and/or characteristics, may include, e.g., but not limited to, factors based at least partially on any one or more of: sales, book value, cash-flow, dividends if any, total assets, revenue, number of employees, profit margins, and/or collateral, etc.

Further, in an exemplary embodiment, the metric used for selection and/or weighting for each commodity may be a combination of the foregoing the metric for selection or weighting for each group of companies or industries responsible for the production and/or consumption of a commodity, and an index weight based on the total per unit cost of production of a commodity, commodity reserves value, term structure of a future and/or commodity, momentum in price, any seasonal factors that may affect the valuation of the commodity, such as, for example, but not limited to, effect on oil usage and/or crop yields, and/or interest rate, etc.

In an exemplary embodiment, data acquisition may be time consuming. Here, according to an exemplary embodiment, a comprehensive database may be assembled, compiled, and/or built, i.e. constructed, of companies and/or industries responsible for the production and/or consumption of commodities, and the data may be linked to an existing database of metrics, such as, e.g., but not limited to, accounting data which may include non-market capitalization and non-price related accounting data indicative of relative company size, with all the normal complications of ticker and Committee on Uniform Security Identification Procedures (cuisp) differences. In alternative exemplary embodiments, expansion of the data through 2006, or other time period, and beyond may be performed.

In exemplary embodiments, the commodities universe may include, e.g., but not limited to, all issues within a particular commodities space. An exemplary commodities space according to one exemplary embodiment may include, e.g., but not limited to, the Merrill Lynch Global Commodities space. According to one exemplary embodiment, one may begin with a universe of, e.g., but not limited to, all commodities and/or related derivative instruments. Then, a selection of commodities and/or related derivative instruments may be made using at least one accounting data metric associated with the companies and/or industries responsible for the production and/or consumption of the commodity, wherein the metric is not materially influenced by share price.

In an exemplary embodiment, the index may be reconstituted, and/or rebalanced on a periodic and/or an aperiodic basis such as, e.g., but not limited to, every, e.g., but not limited to, month, etc., as futures expire and may fall out of the index.

Exemplary Embodiments of Real Estate Investment Trust (REIT) Indexes

According to an exemplary embodiment of the invention, an exemplary financial object may include, e.g., but not limited to, a Real Estate Investment Trust (REIT), and/or a Real Estate Holding and Development Company (including, e.g., but not limited to, Real Estate Operating Companies (REOC)). An accounting data based index (ADBI) may be provided, according to one exemplary embodiment, including one or more Real Estate Investment Trusts (REITs), in which the REITs may be selected based on one or more objective metrics and/or measures. In accordance with an exemplary embodiment, REITs may include, e.g., but not limited to, a special tax designation for a corporation that may invest, own, and/or manage real estate. As used herein, REITs may be publicly traded and may be listed on national stock exchanges, including, e.g., but not limited to, the New York Stock Exchange (NYSE), National Association of Securities Dealers Automated Quotations system (NASDAQ), and/or American Stock Exchange (AMEX), (and comparable instruments, to the extent available, on foreign exchanges), etc. A REIT may be publicly traded, or may also be privately held. The Real Estate Holding & Development subsector may include, e.g., but not limited to, companies that may invest directly, and/or indirectly in real estate through development, management and/or ownership, including, e.g., but not limited to, property agencies. A Real Estate Operating Company (REOC) is similar to a real estate investment trust (REIT), except that an REOC may reinvest its earnings into the business, rather than distributing them to unit holders as REITs do. Also, REOCs may be more flexible than REITs in terms of what types of real estate investments they may be able to make.

In accordance with one or more exemplary embodiments, ownership of REIT instruments may be similar to ownership in any other instrument, but in order to qualify for the tax benefits of a REIT, a real-estate company may be required, according to an exemplary embodiment, to distribute a percentage of the income of the REIT, for example, 90%, to its investors, which may be in form of dividends, for example. The REIT status may allow the entity to avoid income tax altogether, or may receive a reduction in taxes, as a result.

In accordance with various exemplary embodiments, a REIT may include, e.g., but not limited to, an equity REIT and/or a mortgage REIT. An equity REIT, e.g., may own and operate real estate such as, e.g., but not limited to, apartment buildings, regional malls, office buildings, and/or lodging facilities, etc. A mortgage REIT, in an exemplary embodiment, may issue loans secured by real estate, though mortgage REITs usually do not own or operate real estate. As used herein, the REIT may be a hybrid REIT, which may be involved in both real estate operations as well as mortgage transactions, in one exemplary embodiment.

According to an exemplary embodiment of the invention, an index such as, e.g., but not limited to, RAFI® REIT available from Research Affiliates, LLC of Pasadena, Calif. USA, may be constructed by selecting and/or weighting REITs using one or more objective metrics that, in an exemplary embodiment, may not be materially influenced by share price of the REIT company itself. In one exemplary embodiment, an ADBI composite index may include REITs exclusively, and/or a combination of REITs and other financial objects.

In an exemplary embodiment of the invention, a REIT index may be constructed by selecting and/or weighting REITs based one or more accounting data based metrics and/or measures including, e.g., but not limited to, total assets, adjusted funds from operations (AFFO), revenues, and/or distributions, where distributions may include, e.g., but may not be limited to, dividends.

In an exemplary embodiment, the total assets for a REIT, as with any other type of entity, may include, for example, but may not be limited to, the gross assets (e.g., real estate assets) minus the accumulated depreciation in real estate value and/or amortization, as may be required by accounting principles such as the generally accepted accounting principles (GAAP). However, in an exemplary embodiment, funds from operations (FFO) may include, for example, but may not be limited to, the net income (e.g., revenue minus expenses) plus depreciation and/or amortization. Thus, the AFFO, in an exemplary embodiment, may represent the cash performance of the REIT, which, in an exemplary embodiment, may be a better indicator of the company's performance than earnings, which may include, e.g., but not limited to, non-cash items. In an exemplary embodiment, the AFFO may be subject to varying methods of computation, and may be generally equal to the AFFO of the REIT, with adjustments made for recurring capital expenditures used to maintain the quality of the underlying assets of the REIT, which may include, e.g., but may not be limited to, adjustments to straight-line depreciation of, e.g., but not limited to, rent, leasing costs and/or other material factors.

In an exemplary embodiment, one or more financial object metric selection and/or weighting metrics may be determined for each REIT for a predetermined period of time, which may be, e.g., but not be limited to, five years, etc. For example, each of one or more of the metrics, and/or any combination thereof, including the revenues of a REIT, AFFO, the total assets, and/or the total dividend distribution, may be averaged for the prior predetermined (e.g., but not limited to, five (5)) years, etc.

In an exemplary embodiment, an overall weight may be calculated for each REIT in the index by, for example, but not limited to, equally and/or otherwise weighting each selection and/or weighting metric. Alternatively, each selection and/or weighting metric may be given a different weight. In an exemplary embodiment, once weights have been determined for each REIT based on the selection and/or weighting metrics, the REITs may then be sorted in, e.g., but not limited to, descending order of the composite selection and/or weighting metrics and may be assigned weights equal to their previously determined weights, as previously described in greater detail.

Exemplary Modeled Economy Embodiment

In this exemplary embodiment, a continuous time one factor economy is modeled where stock prices are noisy proxies of informationally efficient stock values. The pricing error process is modeled as a mean-reverting process, which provides a well-defined notion of over-pricing (positive pricing error) and under-pricing (negative pricing error) in the market. In this modeled economy embodiment, cap-weighting may be a sub-optimal portfolio strategy. This is because, in a cap-weighting scheme, portfolio weights are driven by market prices. Accordingly, more weights may be allocated to overvalued stocks and less weight to undervalued stocks. It is also shown that the capital asset pricing model (CAPM) may be rejected in this one factor economy with noise. Additionally, a value tilted or size tilted portfolio may be predicted to outperform (risk-adjusted). By construction, value and size may not be risk factors in this one factor economy embodiment. However, in the cross-section, large cap stocks and high price-to-book stocks (growth stocks) may tend to underperform. This is because higher capitalization stocks and higher price-to-books stocks may be more likely to be stocks with positive pricing errors. Prices may be explicitly inefficient in this economy embodiment. However, the inefficiency may not lead to arbitrage opportunities. Mean-reversion in stock returns and the Fama-French size and value effects may be driven by the same market defect—pricing noise. This may suggest that models, such as disposition effect and information herding, which can generate stock price over-reaction and therefore mean-reversion in stock prices, can also explain the value and size question.

In an embodiment, Fama-French value and size factors can be explained quite simply if informational inefficiency in stock prices may be assumed. A simple one factor economy with price noise, where pricing errors are mean-reverting, can generate the Fama-French return anomalies as well as mean-reversion in stock returns. Given the strong support in the empirical and the behavioral literature that point to excess price volatility (price overshooting) and contrarian profits, the explanation of the Fama-French size and value anomalies may be considered more authentic than explanations based on rational models with hidden risk factors. In one or more embodiments, the model is able to simultaneously explain stock price mean-reversion and the size and value effects and is able to offer reasonable explanation for the empirical findings from existing literature regarding CAPM, including: (i) the value and size factors may arise empirically (even in a one factor economy) if the market portfolio is a poor proxy for the one hidden risk factor; (ii) the value and size question and the stock price mean-reversion may be anomalies driven by the same market imperfection and may arise quite naturally when stock prices are noisy; and/or (iii) behavioral and rational models which may generate stock price overreactions resulting in contrarian strategy profits, may also explain the value and size effect. The aforementioned one factor modeled economy embodiment is described with greater specificity below.

In this embodiment, the risk premium for a stock may depend singularly on its exposure to one unobserved source of aggregate risk (F). Furthermore, it may be assumed that the mark-to-market prices, $P_t$ (market prices), deviate from the informationally efficient stock values, $V_t$. For example, $P_t = V_t + e_t$—that is, market prices are noisy proxies for the informationally efficient values, which are assumed unobservable. In addition, idiosyncratic pricing errors ($e_t$) may be assumed to mean-revert to zero at the speed p. Consequently, a stock, with a market price greater than its efficient value, may be over-valued and deliver less than its risk-adjusted fair return and vice versa as $e_t$ mean-reverts. Since $e_t$ may be mean zero, on the average, this price inefficiency may have no impact on expected stock returns. Additionally, since $e_t$ may be idiosyncratic, a broad based portfolio equally weighted would have almost no aggregate mispricing relative to the efficient valuation. By assumption, in an embodiment the market may not be informationally efficient, so alpha strategies exist; though there may be no arbitrage opportunities. In an embodiment, it may therefore, be tacitly assumed that investors are not aware of the alpha opportunity (or do not take advantage of it sufficiently) and thus allow such opportunity to persist. Both the pricing error process and the efficient stock value process may be given exogenously. It may be assumed that the exemplary economy has one aggregate source of risk and a finite number of securities. However, many of the key results may not depend on the pricing model nor the one fact assumption. The true stock value may not be unobservable. The dynamics may be described by $$\frac{dV_i}{V_i} = \mu_i dt + \beta_i \sigma_F dW_F + \sigma_{vi} dW_{vi}, \quad (1)$$

where, (1) is the drift term and is the instantaneous return for the true value process and is described by $$\mu_i = r_f + \beta_i \lambda_F, \quad (2)$$

where $r_f$ is the instantaneous risk free rate and $\lambda$, is the risk premium for holding one unit of the factor risk exposure. It may be noted that the risk premium formula may be assumed. If the true stock price were observable and tradable, then the above equation (2) may arise naturally in equilibrium in the limit following the APT argument. The latter explicit relationship between factor exposure and expected returns may not be needed to drive most of the provided results. However, this relationship between factor loading and return may be considered intuitively appealing and may be necessary for analyzing the cross-section return variance and time series analysis in a CAPM context.

(2) $\beta_i$ is stock i's factor loading.

(3) $dW_F$ is an increment to a standard Wiener process and represents the common factor to all stocks.

(4) $dW_{ui}$ is an increment to a standard Wiener process and represent idiosyncratic shocks to the true stock value. Additionally, it may be assumed that $E[dW_{ui}dW_{uj}]=0$ for $i \neq j$ and $E[dW_{ui}dW_F]=0$.

It may be noted that in an embodiment, there is only one risk factor in the exemplary modeled economy and risk premium may only be earned from holding exposure to this one factor risk.

It may further be assumed that the observed market price may be a noisy proxy for the true stock value. The market price may be defined by $$P_i = V_i U_i, \quad (3)$$

where U is defined by $$U_i = 1 + \tilde{U}_i, \quad (4)$$

where $\tilde{U}_i$ is a mean-reverting process defined by $$d\tilde{U}_i = (1+\tilde{U}_i)(-\rho_i \tilde{U}_i dt + \sigma_{\tilde{U}i} dW_{\tilde{U}i}), \quad (5)$$

where $0 \leq \rho_i < 1$ and $dW_{\tilde{U}i}$ is an increment to a standard Wiener process. It may be noted that when $\tilde{U}_i > 0$, the market price may be overvalued relative to the fair price. Additionally, it may be assumed that $E[dW_{\tilde{U}i}dW_{\tilde{U}j}] = 0$ for $i \neq j$, $E[dW_{\tilde{U}i}dW_{uj}] = 0$ for all i and j, and $E[dW_{\tilde{U}i}dW_F] = 0$.

The market price dynamics can then be written as $$dP_i = V_i dU_i + U_i dV_i. \quad (6)$$

Substituting, the following may be obtained $$dP_i = V_i U_i(-\rho_i \tilde{U}_i dt + \sigma_{\tilde{U}i} dW_{\tilde{U}i}) + U_i V_i(\mu_i dt + \beta_i \sigma_F dW_F + \sigma_{ui} dW_{ui}). \quad (7)$$

Rearranging, the mark-to-market return process is given by $$dr_i = \frac{dP_i}{P_i} = (\mu_i - \rho_i \tilde{U}_i)dt + \beta_i \sigma_F dW_F + \sigma_{ri} dW_{ri}, \quad (8)$$

where $$\sigma_{ri} dW_{ri} = \sigma_{\tilde{U}i} dW_{\tilde{U}i} + \sigma_{ui} dW_{ui}, \quad (9)$$

and where $$\sigma_{ri} = \sqrt{\sigma_{\tilde{U}i}^2 \sigma_{ui}^2}. \quad (10)$$

It may be noted from equation (8), that the mean-reverting pricing error process does not have an impact on the equity premium, though the cumulative return does suffer from the increased volatility. From equation (8), the mark-to-market return process may be mean-reverting, suggesting that observed stock returns are negatively autocorrelated. While empirical evidences may support negative autocorrelation, the literature may also conclude that the magnitude may be too small or the effect too unreliable to be profitably exploited given the volatility in stock returns. However, in an embodiment, it may be conceded that the mean-reversion in returns can be an uncomfortable prediction, especially in a partial equilibrium model. The 1986 teaching of Summers may be used to argue that standard statistical tests cannot reject the random walk hypothesis even when the true process is strongly mean-reverting; as such investors may not take large positions to trade on any perceived mean-reversion in stock returns.

The return on a portfolio $\Omega$ defined by a vector of weights $\{\omega_1, \omega_2, \ldots \omega_N\}$ can be written as $$dr_\Omega = \sum_{i=1}^{N} \omega_i dr_i = (\mu_\Omega - \rho \tilde{U}_\Omega) dt + \beta_\Omega \sigma_F dF + \sigma_\Omega dW_\Omega, \quad (11)$$

where $$\mu_\Omega = \sum_{i=1}^{N} \omega_i \mu_i = r_f + \beta_\Omega \lambda, \quad (12)$$

$$\rho \tilde{U}_\Omega = \sum_{i=1}^{N} \omega_i \rho_i \tilde{U}_i, \quad (13)$$

$$\beta_\Omega = \sum_{i=1}^{N} \omega_i \beta_i, \quad (14)$$

$$\sigma_\Omega dW_\Omega = \sum_{i=1}^{N} \omega_i \sigma_{ri} dW_{ri}, \quad (15)$$

where $$\sigma_\Omega = \sqrt{\sum_{i=1}^{N} \omega_i^2 \sigma_{ri}^2}, \quad (16)$$

and where in the limiting case $\sigma_\Omega dW_\Omega \to 0$ as $N \to \infty$.

To derive additional portfolio implications it may be needed to make explicit the portfolio weighting scheme. In the following two sections, the portfolio return dynamics for a cap-weighted portfolio and a non-cap-weighted portfolio are considered.

For simplicity and without loss of generality, it may be assumed each company issues only 1 share of stock (therefore market price and market cap are the same). The cap-weighted portfolio may be the defined by the following vector of weights $$CW = \left\{ \frac{P_1}{P_\Sigma}, \frac{P_2}{P_\Sigma}, \ldots \frac{P_N}{P_\Sigma} \right\}, \quad (17)$$

where $$P_\Sigma = \sum_{i=1}^{N} P_i, \quad (18)$$

The return on the cap-weighted portfolio may then be $$dr_{CW} = (\mu_{CW} - \rho \tilde{U}_{CW}) dt + \beta_{CW} \sigma_F dF + \sigma_{CW} dW_{CW}, \quad (19)$$

where $$\mu_{CW} = \sum_{i=1}^{N} \frac{P_i}{P_\Sigma} \mu_i = r_f + \beta_{CW} \lambda, \quad (20)$$

$$\rho \tilde{U}_{CW} = \sum_{i=1}^{N} \frac{P_i}{P_\Sigma} \rho_i \tilde{U}_i = \sum \frac{V_i}{P_\Sigma} \rho_i (1 + \tilde{U}_i) \tilde{U}_i, \quad (21)$$

$$\beta_{CW} = \sum_{i=1}^{N} \frac{P_i}{P_\Sigma} \beta_i, \quad (22)$$

$$\sigma_{CW} dW_{CW} = \sum_{i=1}^{N} \frac{P_i}{P_\Sigma} \sigma_{ri} dW_{ri}, \quad (23)$$

and where $\sigma_{CW} dW_{CW} \to 0$ as $N \to \infty$.

Rewriting the drift term for the portfolio dynamics in (19), the following may be obtained $$\left( \mu_{CW} - \sum_{i=1}^{N} \frac{V_i}{P_\Sigma} \rho_i \tilde{U}_i^2 \right) - \sum_{i=1}^{N} \frac{V_i}{P_\Sigma} \rho_i \tilde{U}_i, \quad (24)$$

where $$-\sum_{i=1}^{N} \frac{1}{P_\Sigma} \rho_i V_i \tilde{U}_i^2$$

is strictly negative except when $\rho_i = 0$ for all i (when pricing errors are not mean-reverting but random walks). The latter may be used to assert that cap-weighting leads to a drag in portfolio expected return.

While there may be only a finite number of stocks (this is both realistic and necessary to prevent arbitrage in our economy), the exposition may be more clear when the limiting case expression is examined. Though not necessary for the results provided here, the latter format may be used throughout the explanation hereof for improvement of intuition.

In the limiting case, $$\sum_{i=1}^{N} \frac{V_i}{P_\Sigma} \rho_i \tilde{U}_i \to 0 \text{ as } N \to \infty \text{ and } \sum_{i=1}^{N} \frac{V_i}{P_\Sigma} \rho_i \tilde{U}_i^2 \to \delta_{CW}.$$

Note $\delta_{CW}$ is monotone increasing in the average variance of the pricing noise in the stock cross-section. Equation (19) then reduces to $$dr_{CW} = (\mu_{CW} - \delta_{CW}) dt + \beta_{CW} \sigma_F dF. \quad (25)$$

And the holding period return is $$E_t[r_{t,t+T}] = E_t e^{\int_t^{t+T} dr_{CW}} = e^{(r_f + \beta_{CW} \lambda - \delta_{CW} - 0.5 \beta_{CW}^2 \sigma_F^2) T}. \quad (26)$$

Equation (25) may suggest that in a well diversified portfolio constructed from cap-weighting, the portfolio expected return may be the cap-weighted expected returns of the constituent stocks less a drag term $\delta_{CW}$. This return drag may occur because portfolio weights are positively correlated with prices. Stocks that are overvalued may receive added weights in the portfolio and stocks that are undervalued may receive lesser weights. The greater the mispricing in the market, the more severe may be this problem and the larger the resulting drag ($\delta_{CW}$) to the cap-weighted portfolio.

Portfolio weights which do not depend on market capitalizations (or market prices) may be considered. The weights could be as arbitrary as random weights or as simple as equal weights.

The vector of weights may be denoted as $$NC = \{w_1, w_2, \ldots w_N\}, \quad (27)$$

The return on the non-cap-weighted portfolio may then be $$dr_{NC} = (\mu_{NC} - \rho\tilde{U}_{NC})dt + \beta_{NC}\sigma_F dF + \sigma_{NC}dW_{NC}, \quad (28)$$

where $$\mu_{NC} = \sum_{i=1}^{N} w_i \mu_i = r_f + \beta_{NC}\lambda, \quad (29)$$

$$\rho\tilde{U}_{NC} = \sum_{i=1}^{N} w_i \rho_i \tilde{U}_i, \quad (30)$$

$$\beta_{NC} = \sum_{i=1}^{N} w_i \beta_i, \quad (31)$$

$$\sigma_{NC}dW_{NC} = \sum_{i=1}^{N} w_i \sigma_{ri} dW \quad (32)$$

The non-cap-weighted portfolio drift term may be $$\mu_{NC} - \sum_{i=1}^{N} w_i \rho_i \tilde{U}_i. \quad (33)$$

Comparing equation (33) to (24), it may be found that a non-cap-weighted portfolio does not suffer a drag in expected return.

In the limit, $\sigma_{NC}dW_{NC} \to 0$ and $\rho\tilde{U} \to 0$ as $N \to \infty$. Equation (28) may then reduce to $$dr_{NC} = \mu_{NC}dt + \beta + \beta_{NC}\sigma_F dF. \quad (34)$$

And the holding period return may be $$E_t[r_{t,t+T}] = E_t e^{\int_t^{t+T} dr_{NC}} = e^{(r_f + \beta_{NC}\lambda - 0.5\beta_{NC}^2\sigma_F^2)T}. \quad (35)$$

Comparing the expected cumulative holding period return for a cap-weighted portfolio and a non-cap-weighted portfolio of the same factor exposure or same β (the limiting case shown in (26) and (35)), it may be found that the non-cap-weighted portfolio has a higher return. In fact, in the limit, there is arbitrage as indicated by (34) and (25). Therefore, in an embodiment it may be considered important that in the economy, N is sufficiently different from infinity and/or that the factor loading β cannot be measured with perfect precision.

In the following embodiment, return dynamics for stocks and portfolios are expressed relative to the observed cap-weighted "market" portfolio instead of the unobserved factor F. This shift in measure may lead naturally to the CAPM regression formula and predict that in the stock cross-section, the average stock will show a CAPM alpha.

Rewriting equation (19), $$\sigma_F dF = \frac{1}{\beta_{CW}} dr_{CW} - \frac{(\mu_{CW} - \rho\tilde{U}_{CW})}{\beta_{CW}} dt - \frac{\sigma_{CW}}{\beta_{CW}} dW_{CW}. \quad (36)$$

For individual stocks, substituting into (8), $$dr_i = \left(\mu_i - \rho_i\tilde{U}_i - \frac{\beta_i}{\beta_{CW}}(\mu_{CW} - \rho\tilde{U}_{CW})\right)dt + \frac{\beta_i}{\beta_{CW}}dr_{CW} - \frac{\beta_i}{\beta_{CW}}\sigma_{CW}dW_{CW} + \sigma_{ri}dW_{ri}. \quad (37)$$

Additionally, a new process may be defined, the excess market return process $$dR_M = dr_{CW} - r_f dt, \quad (38)$$

and a new variable $$\gamma_i = \frac{\beta_i}{\beta_{CW}}.$$

Substituting into (37), the following is obtained $$dr_i = (\mu_i - \rho_i\tilde{U}_i - \gamma_i(\mu_{CM} - r_f - \rho\tilde{U}_{CM}))dt + \gamma_i dR_M - \gamma_i\sigma_{CW}dW_{CW} + \sigma_{ri}dW_{ri}. \quad (39)$$

Recalling equation (2), where $\mu_i = r_f + \beta_i \lambda_F$, equation (39) can be rewritten as $$dr_i = (r_f - \rho_i\tilde{U}_i + \gamma_i\rho_i - \rho\tilde{U}_{CM})dt + \gamma_i dR_M - \gamma_i\sigma_{CW}dW_{CW} + \sigma_{ri}dW_{ri}. \quad (40)$$

In the limiting case as $N \to \infty$, the following may be obtained $$dr_i = (r_f - \rho_i\tilde{U}_i + \gamma_i\delta_{CM})dt + \gamma_i dR_M + \sigma_{ri}dW_{ri}. \quad (41)$$

It may be noted that the average stock may be expected to show an "alpha" equal to $\gamma_1\delta_{CW}$ when its excess stock return is regressed against the excess market return. For a non-cap-weighted portfolio, equation (28) can be expressed as $$dr_{NC} = (r_f - \rho\tilde{U}_{NC} + \gamma_{NC}\rho\tilde{U}_{CM})dt + \gamma_{NC}dR_M - \gamma_{NC}\sigma_{CW}dW_{CW} + \sigma_{NC}dW_{NC}. \quad (42)$$

In the limiting case as $N \to \infty$, $$dr_{NC} = (r_f + \gamma_{NC}\delta_{CW})dt + \gamma_{NC}dR_M. \quad (43)$$

A non-cap-weighted portfolio may be expected to show an "alpha" in a CAPM regression.

In the following embodiment, it may be shown that, in this economy, size and value exposure in a stock or portfolio can be used to predict future returns. Specifically, small size exposure and value exposure may lead to superior stock or portfolio returns, adjusting for "market" beta. By assumption, we may be in a one risk factor economy, and size and value may not be risk factors. The observed alpha in a CAPM regression may be driven purely by the return drag in the cap-weighted market portfolio.

Recalling from (40) that the individual stock return dynamics can be written as $$dr_i = (r_f - \rho_i\tilde{U}_i + \gamma_i\rho\tilde{U}_{CM})dt + \gamma_i dR_M - \gamma_i\sigma_{CW}dW_{CW} + \sigma_{ri}dW_{ri}. \quad (44)$$

Examining equation (44), it may be seen that a larger stock would on average have a negative drift term in excess of the risk free $r_f$. It may be straightforward to show that a larger stock, denoted by $p_i > \bar{p}$, where $\bar{p}$ denote the capitalization of the average company, will have a greater chance of receiving a positive pricing error $\tilde{U}$ in the last period and therefore be more likely to underperform going forward as the positive pricing error reverts to zero.

More formally, since $\tilde{U}_i$ is a mean zero random variable, $E[\tilde{U}_i|P_i>\overline{P}]>0$ if the conditional probability $Pr\{\tilde{U}_i>0|P_i>\overline{P}\}>Pr\{\tilde{U}_i>0\}$.

Using Bayes rule of conditional probability:

$$Pr\{\tilde{U}_i > 0 \mid P_i > \overline{P}\} = \frac{Pr\{P_i > \overline{P} \mid \tilde{U}_i > 0\} \cdot Pr\{\tilde{U}_i > 0\}}{Pr\{P_i > \overline{P}\}}. \tag{45}$$

It is clear that:

$$Pr\{P_i > \overline{P} | \tilde{U}_i > 0\} > Pr\{P_i > \overline{P}\}. \tag{46}$$

Substituting (46) into (45):

$$Pr\{\tilde{U}_i > 0 \mid P_i > \overline{P}\} = \frac{Pr\{P_i > \overline{P} \mid \tilde{U}_i > 0\} \cdot Pr\{\tilde{U}_i > 0\}}{Pr\{P_i > \overline{P}\}} > Pr\{\tilde{U}_i > 0\}, \tag{47}$$

which completes the proof that $E[\tilde{U}_i|P_i>\overline{P}]>0$. This in turn may prove that size predicts next period return, $$E\left[\int_t^{t+\Delta} dr_i \mid P_{i,t} > \overline{P}_t\right] < E\left[\int_t^{t+\Delta} dr_i\right].$$

Similarly, it may be shown that, under some fairly general and reasonable assumptions on the book value process, a growth stock (as defined by above average price-to-book ratio or $$\frac{P_i}{B_i} > \frac{\overline{P}}{\overline{B}}\bigg)$$

may DC more nicely to nave received a positive pricing error and therefore have a negative drift term in excess of the risk free $r_f$.

It may now be shown that $$E\left[\tilde{U}_i \mid \frac{P_i}{B_i} < \frac{\overline{P}}{\overline{B}}\right] < 0 \text{ and } E\left[\tilde{U}_i \mid \frac{P_i}{B_i} > \frac{\overline{P}}{\overline{B}}\right] > 0.$$

Again, it is shown that $$Pr\left\{\tilde{U}_i > 0 \mid \frac{P_i}{B_i} > \frac{\overline{P}}{\overline{B}}\right\} > Pr\{\tilde{U}_i > 0\}$$

to prove that $$E\left[\tilde{U}_i \mid \frac{P_i}{B_i} > \frac{\overline{P}}{\overline{B}}\right] > 0.$$

First, Bayes rule gives:

$$Pr\{\tilde{U}_i > 0 \mid P_i > \overline{P}\} = \frac{Pr\left\{\frac{P_i}{B_i} > \frac{\overline{P}}{\overline{B}} \mid \tilde{U}_i > 0\right\} \cdot Pr\{\tilde{U}_i > 0\}}{Pr\left\{\frac{P_i}{B_i} > \frac{\overline{P}}{\overline{B}}\right\}}. \tag{48}$$

The following would need to be shown:

$$Pr\left\{\frac{P_i}{B_i} > \frac{\overline{P}}{\overline{B}} \mid \tilde{U}_i > 0\right\} > Pr\left\{\frac{P_i}{B_i} > \frac{\overline{P}}{\overline{B}}\right\}. \tag{49}$$

A sufficient condition for this inequality to hold may be that the book value process B is not influenced by market mispricing $\tilde{U}_i$ as strongly as the price process $P_i$. More specifically, as long as the process for $$\frac{P_i}{B_i}$$

has a arm term that is negative in $\tilde{U}_i$, the inequality may bear true.

Hence, in an embodiment, if the book values of companies are not subjected to the effects of mispricings in stock prices, then $$E\left[\tilde{U}_i \mid \frac{P_i}{B_i} > \frac{\overline{P}}{\overline{B}}\right] > 0,$$

which indicates that price-to-book ratio can predict next period return, $$E\left[\int_t^{t+\Delta} dr_i \mid \frac{P_{i,t}}{B_{i,t}} > \frac{\overline{P}_t}{\overline{B}_t}\right] < E\left[\int_t^{t+\Delta} dr_i\right].$$

The inequality in equation (49) can be extended to include more than just price-to-book ration but also price-to-dividend and price-to-earnings ratios. This further explains the empirical observations that low yielding stocks and high P/E stocks tend to underperform.

Since conditional expectation may be considered linearly additive, based on the above, in another embodiment it may be straight forwardly shown that any portfolio which has smaller weighted average cap than the "market" portfolio would have a positive excess drift and would show a positive CAPM alpha in a time series regression. Similarly, any portfolio which has a lower price-to-book ratio (lower P/E or higher yield) than the "market" portfolio, would have a positive excess drift and show a positive CAPM alpha.

Exemplary Computer System Embodiments

Figure 6:
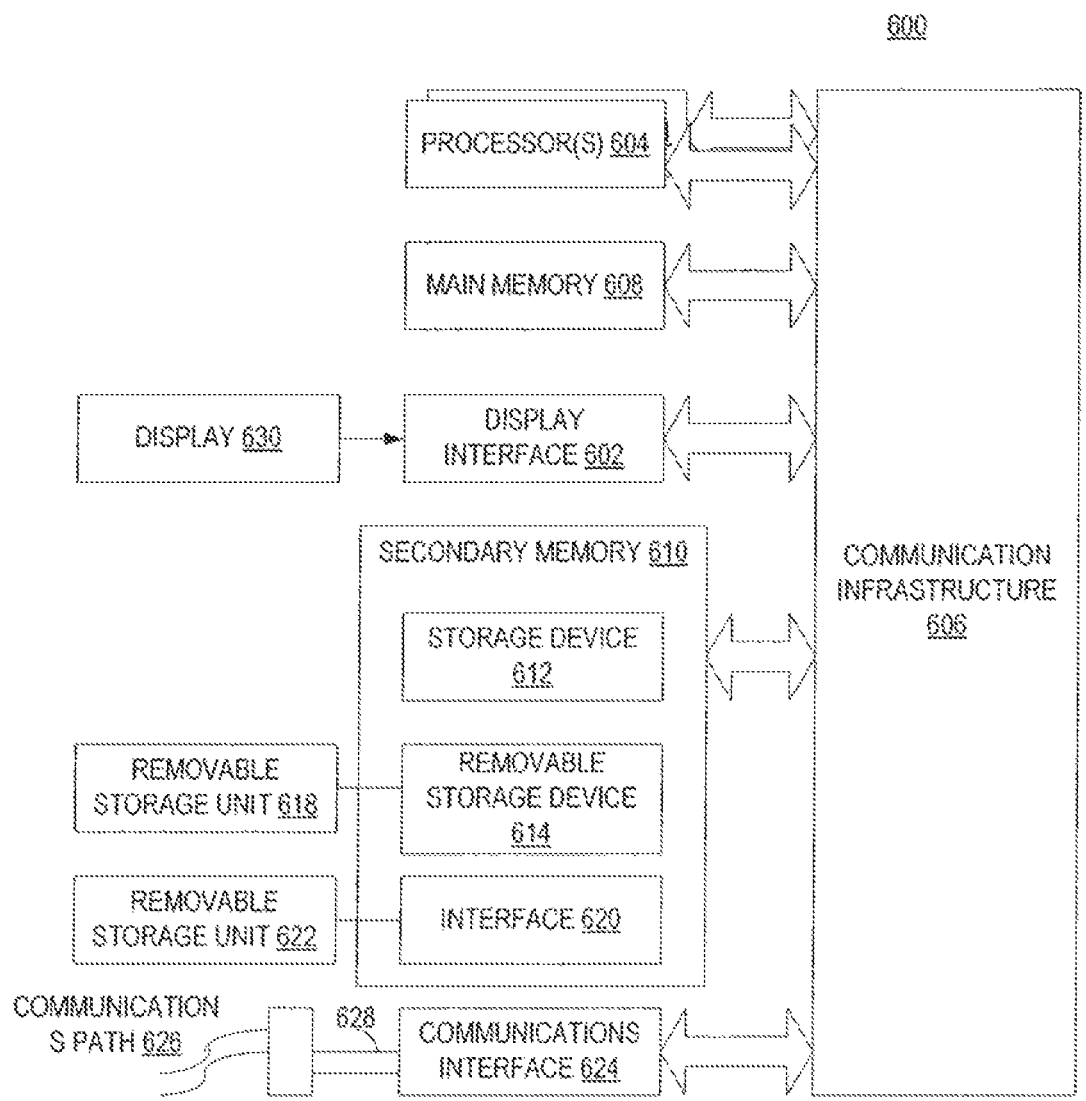
FIG. 6 depicts an exemplary embodiment of a computer system as may be used in the analysis host, trading host, or exchange host, according to an exemplary embodiment.

FIG. 6 depicts an exemplary computer system that may be used in implementing an exemplary embodiment of the present invention. Specifically, FIG. 6 depicts an exemplary embodiment of a computer system 600 that may be used in computing devices such as, e.g., but not limited to, a client and/or a server, etc., according to an exemplary embodiment of the present invention. FIG. 6 depicts an exemplary embodiment of a computer system that may be used as client device

600, or a server device 600, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 600 may be shown in FIG. 6, depicting an exemplary embodiment of a block diagram of an exemplary computer system useful for implementing the present invention. Specifically, FIG. 6 illustrates an example computer 600, which in an exemplary embodiment may be, e.g., (but not limited to) a personal computer (PC) system running an operating system such as, e.g., (but not limited to) MICROSOFT® WINDOWS° NT/98/2000/XP/CE/ME/VISTA, etc. available from MICROSOFT® Corporation of Redmond, Wash., U.S.A. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 600 may be shown in FIG. 6. Other components of the invention, such as, e.g., (but not limited to) a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 6. Services may be provided on demand using, e.g., but not limited to, an interactive television (iTV), a video on demand system (VOD), and via a digital video recorder (DVR), or other on demand viewing system.

The computer system 600 may include one or more processors, such as, e.g., but not limited to, processor(s) 604. The processor(s) 604 may be connected to a communication infrastructure 606 (e.g., but not limited to, a communications bus, cross-over bar, or network, etc.). Various exemplary software embodiments may be described in terms of this exemplary computer system. After reading this description, it may become apparent to a person skilled in the relevant art(s) how to implement the invention using other computer systems and/or architectures.

Computer system 600 may include a display interface 602 that may forward, e.g., but not limited to, graphics, text, and other data, etc., from the communication infrastructure 606 (or from a frame buffer, etc., not shown) for display on the display unit 630.

The computer system 600 may also include, e.g., but may not be limited to, a main memory 608, random access memory (RAM), and a secondary memory 610, etc. The secondary memory 610 may include, for example, (but not limited to) a hard disk drive 612 and/or a removable storage drive 614, representing a floppy diskette drive, a magnetic tape drive, an optical disk drive, a compact disk drive CD-ROM, etc. The removable storage drive 614 may, e.g., but not limited to, read from and/or write to a removable storage unit 618 in a well known manner. Removable storage unit 618, also called a program storage device or a computer program product, may represent, e.g., but not limited to, a floppy disk, magnetic tape, optical disk, compact disk, etc. which may be read from and written to by removable storage drive 614. As may be appreciated, the removable storage unit 618 may include a computer usable storage medium having stored therein computer software and/or data. In some embodiments, a "machine-accessible medium" may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

In alternative exemplary embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 622 and interfaces 620, which may allow software and data to be transferred from the removable storage unit 622 to computer system 600.

Computer 600 may also include an input device 616 such as, e.g., (but not limited to) a mouse or other pointing device such as a digitizer, and a keyboard or other data entry device (not shown).

Computer 600 may also include output devices, such as, e.g., (but not limited to) display 630, and display interface 602. Computer 600 may include input/output (I/O) devices such as, e.g., (but not limited to) communications interface 624, cable 628 and communications path 626, etc. These devices may include, e.g., but not limited to, a network interface card, and modems (neither are labeled). Communications interface 624 may allow software and data to be transferred between computer system 600 and external devices.

In this document, the terms "computer program medium" and "computer readable medium" may be used to generally refer to media such as, e.g., but not limited to removable storage drive 614, a hard disk installed in hard disk drive 612, and signals 628, etc. These computer program products may provide software to computer system 600. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

In yet another exemplary embodiment, the invention may be implemented using a combination of any of, e.g., but not limited to, hardware, firmware and software, etc.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

Exemplary Communications Embodiments

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them called interprocess communication pathways.

On these pathways, appropriate communications protocols are used. The distinction between hardware and software may not be easily defined, with the same or similar functions capable of being preformed with use of either, or alternatives.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

In an exemplary embodiment, the processes may communicate with one another through interprocess communication pathways (not labeled) supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless e-mail devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The embodiments may be employed across different generations of wireless devices. This includes 1G-5G according to present paradigms. 1G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3 G. 3G refers to third generation communications systems recently coming into existence, characterized, for example, by data rates of 144 Kbps to over 2 Mbps (high speed), being packet-switched, and permitting multimedia content, including GPRS, 1xRTT, EDGE, HDR, W-CDMA. 4G refers to fourth generation and provides an end-to-end IP solution where voice, data and streamed multimedia can be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agileness and flexible modulation are required to optimize ad-hoc wireless networks.

As noted, each node 102-108 includes one or more processes 112, 114, executable by processors 110 incorporated into the nodes. In a number of embodiments, the set of processes 112, 114, separately or individually, can represent entities in the real world, defined by the purpose for which the invention is used.

Furthermore, the processes and processors need not be located at the same physical locations. In other words, each processor can be executed at one or more geographically distant processor, over for example, a LAN or WAN connection. A great range of possibilities for practicing the embodiments may be employed, using different networking hardware and software configurations from the ones above mentioned.

Figure 7:
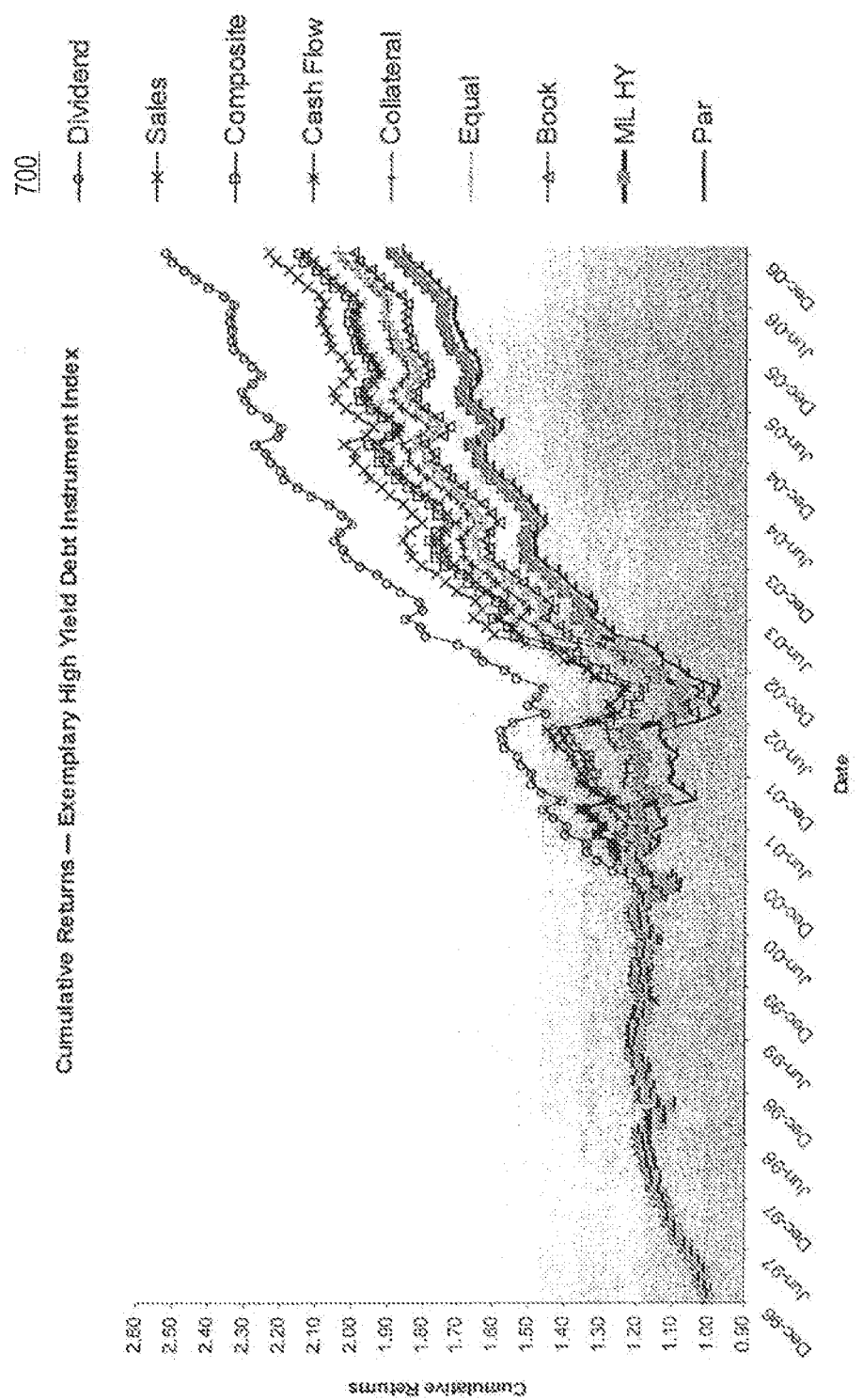
FIG. 7 depicts an exemplary embodiment of a chart graphing cumulative returns by date for exemplary high yield debt instrument metrics according to an exemplary embodiment.
Figure 8:
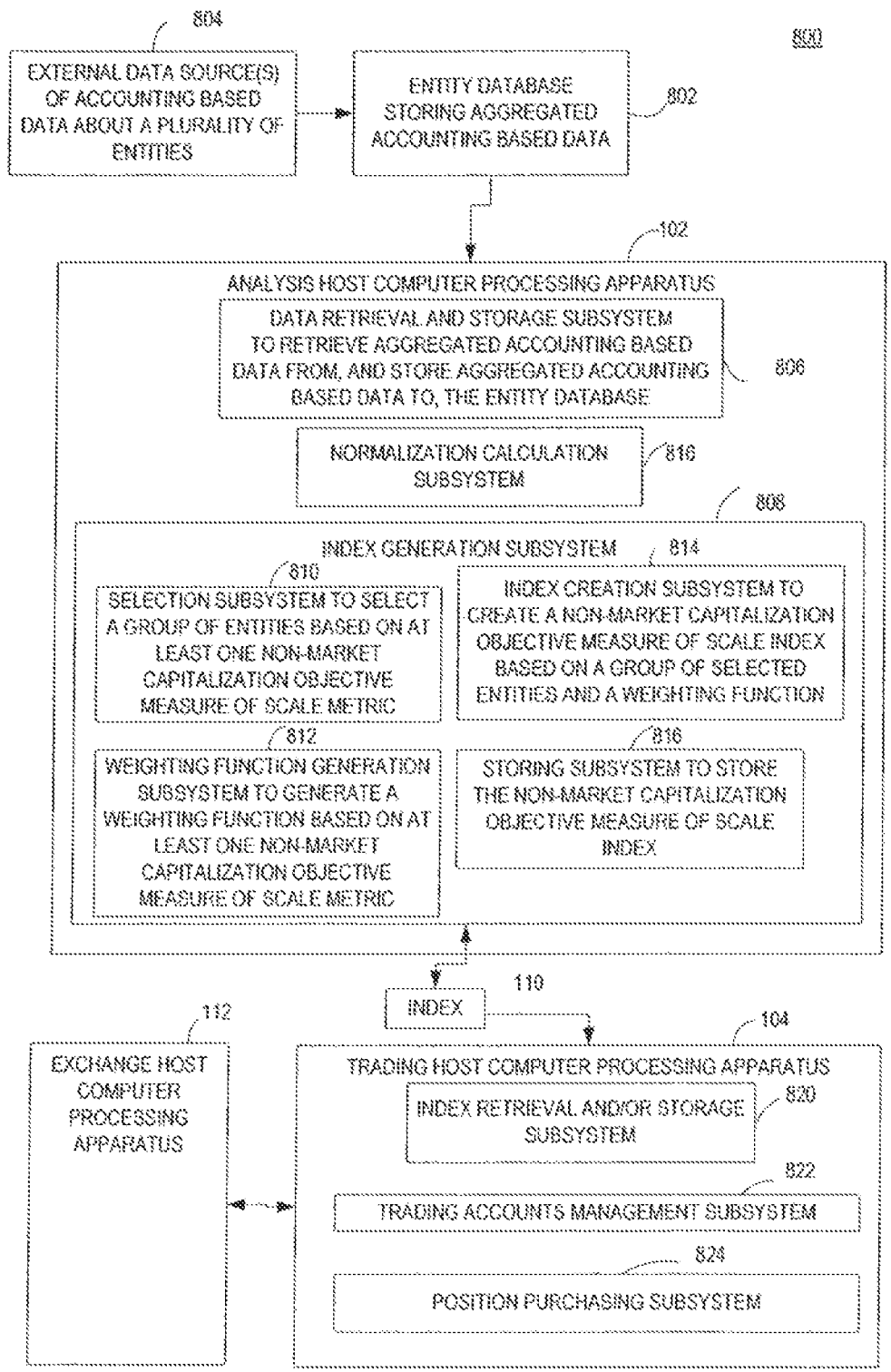
FIG. 8 depicts a block diagram of an exemplary embodiment of a system according to an exemplary embodiment.

FIG. 7 depicts an exemplary embodiment of a chart 700 graphing cumulative returns by date for exemplary high yield debt instrument metrics according to an exemplary embodiment. FIG. 8 depicts block diagram 800 of an exemplary system according to an exemplary embodiment. The system may include an entity database 802 that, according to an exemplary embodiment, may store aggregated accounting based data and/or other data, metrics, measures, parameters, technical parameters, characteristics and/or factors about a plurality of entities, obtained from an external data source 804. Each database 802 entity may have at least one object type associated with the entity. The aggregated accounting based data may include, according to an exemplary embodiment, at least one non-market capitalization, non-price related objective measure of scale and/or size metric associated with each entity. The system may include an analysis host computer processing apparatus 102 coupled to the entity database 802. The analysis host computer processing apparatus 102 may include a data retrieval and storage subsystem 806, according to an exemplary embodiment, which may retrieve the aggregated accounting based data from the entity database and may store the aggregated accounting based data to the entity database 802. The analysis host computer processing apparatus 102 may include, according to an exemplary embodiment, an index generation subsystem 808, which may include, according to an exemplary embodiment, a selection subsystem 810 operative to select a group of the entities based on at least one non-market capitalization objective measure of scale or size metric including one or more technical parameters and/or metrics; a weighting function generation subsystem 812, according to an exemplary embodiment, may be operative to generate a weighting function based on at least one non-market capitalization, non-price related objective measure of scale and/or size metric; an exemplary index creation subsystem 814, according to an exemplary embodiment, may be operative to create a non-market capitalization non-price objective measure of scale and/or size index based on the group of selected entities and/or the weighting function; and/or a storing subsystem 816, according to an exemplary embodiment, operative to store the non-market capitalization, non-price related objective measure of scale and/or size based index, and/or multi-dimensional array of data objects. The index or array of data objects may be stored on a storage device, in one exemplary embodiment.

According to one exemplary embodiment, the system 800 may further include a normalization calculation and/or computation subsystem 818, operative to normalize entity object data to be stored in the entity database 802.

According to another exemplary embodiment, the system 800 may further include a trading host computer system 104 which may include, according to an exemplary embodiment, an index retrieval subsystem 820 operative to retrieve and/or store an instance of the non-market capitalization, non-price related objective measure of scale and/or size based index, and/or multi-dimensional array of data objects from a storage device; a trading accounts management subsystem 822 operative to manage accounts data relating to a plurality of accounts including positions data, position owner data, and position size data, any data of which may be stored in trading accounts database 108; and/or a purchasing subsystem 824 operative to purchase from an exchange host system 112 one or more positions for the position owner, according to the index and/or array of data objects.

Exemplary Process Control System

According to an exemplary embodiment, the system 800 may be used to compute using data objects input via an input/output subsystem, a multi-dimensional array storing database system for storage of a multi-dimensional array computed via a multi-dimensional object array creation subsystem comprising a selection subsystem operative to select one or more objects based on one or more technical parameters, and a weighting subsystem operative to weight the selected one or more objects based on one or more technical parameters, wherein the technical parameters are chosen such that the technical parameters avoid influence of an undesirable predetermined technical criterion and/or criteria, so as to avoid influence of the undesirable predetermined technical criterion and/or criteria. As a result of elimination of the undesirable predetermined technical criterion and/or criteria, the multi-dimensional array selected and/or weighted to avoid influence of the undesirable predetermined technical criterion and/or criteria may as a result perform processing from negative effects from the undesirable predetermined technical criterion and/or criteria. An exemplary embodiment of the selection subsystem may be operative to select objects from a predetermined universe of objects to obtain a subset of the universe, where the selection is based on a technical parameter that is not influenced by the undesirable technical criterion and/or criteria. Following execution of the selection subsystem, according to an exemplary embodiment, an exemplary weighting subsystem may operative to weight the resulting selected objects by a weighted combination of two or more technical weighting criteria, which are not influenced by the undesirable technical criterion and/or criteria. The process may be used for such technical processes as may include, e.g. but are not limited to, industrial automation, production process automation, a manufacturing process, and/or a chemical processing system, among others as described elsewhere, herein.

According to one exemplary embodiment, the weighting subsystem may further compute an algorithmically computed summation of a plurality of weighting factors, the plurality of weighting factors including a first of the plurality of weighting factors, where the first includes a first given computational product of a first object value and a first technical parameter value associated with the first object value, and a second of the plurality of weighting factors, where the second includes a second given computational product of a second object value and a second technical parameter value associated with the second object value, and/or any additional of the plurality of weighting factors, where the any additional includes an additional given computational product of an additional object value and an additional technical parameter value associated with the additional object value.

Figure 9:
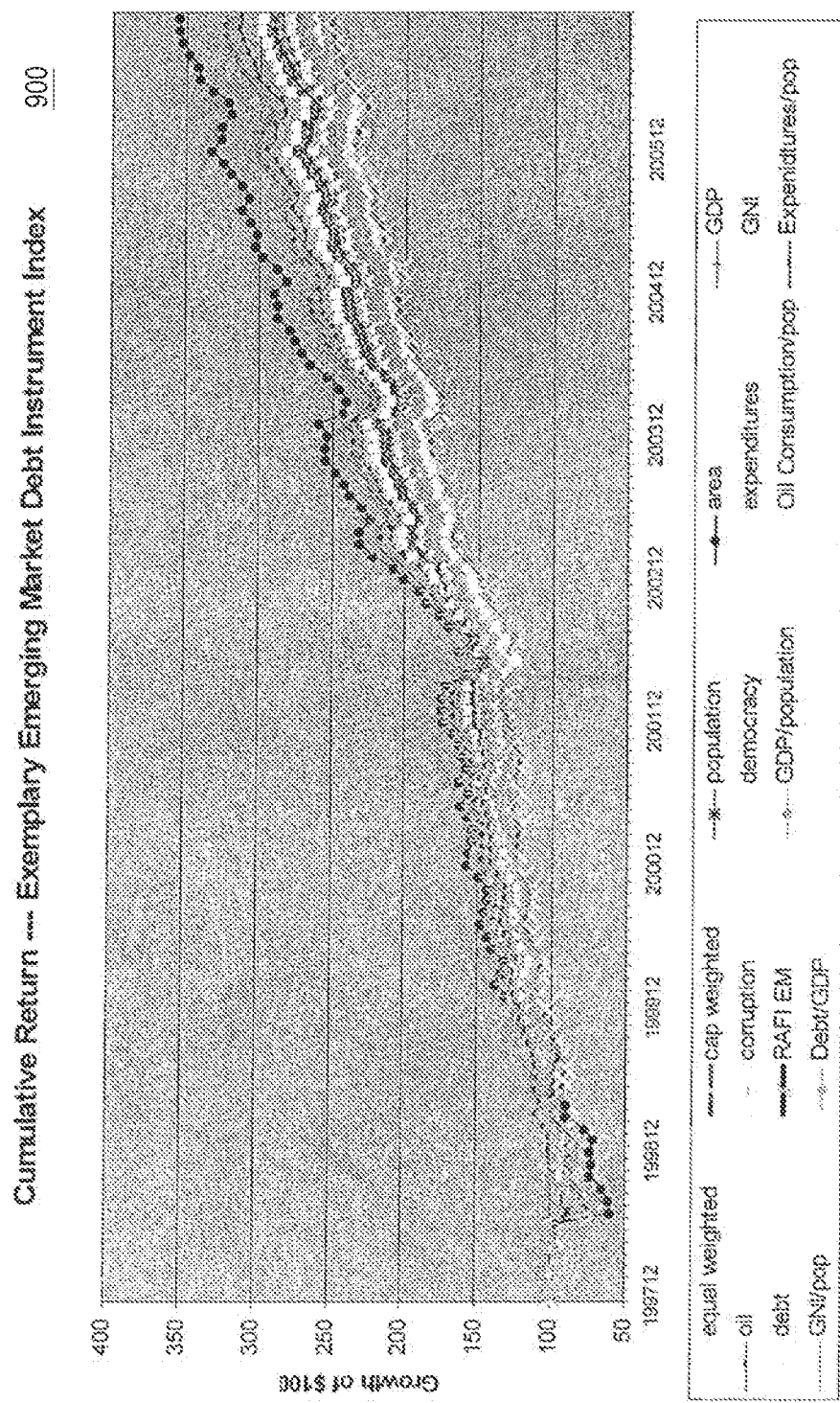
FIG. 9 depicts an exemplary embodiment of a chart graphing cumulative returns by date for exemplary emerging market debt instrument metrics according to an exemplary embodiment.

FIG. 9 depicts an exemplary embodiment of a chart 900 graphing cumulative returns by date for exemplary emerging market debt instrument metrics according to an exemplary embodiment.

Figure 10:
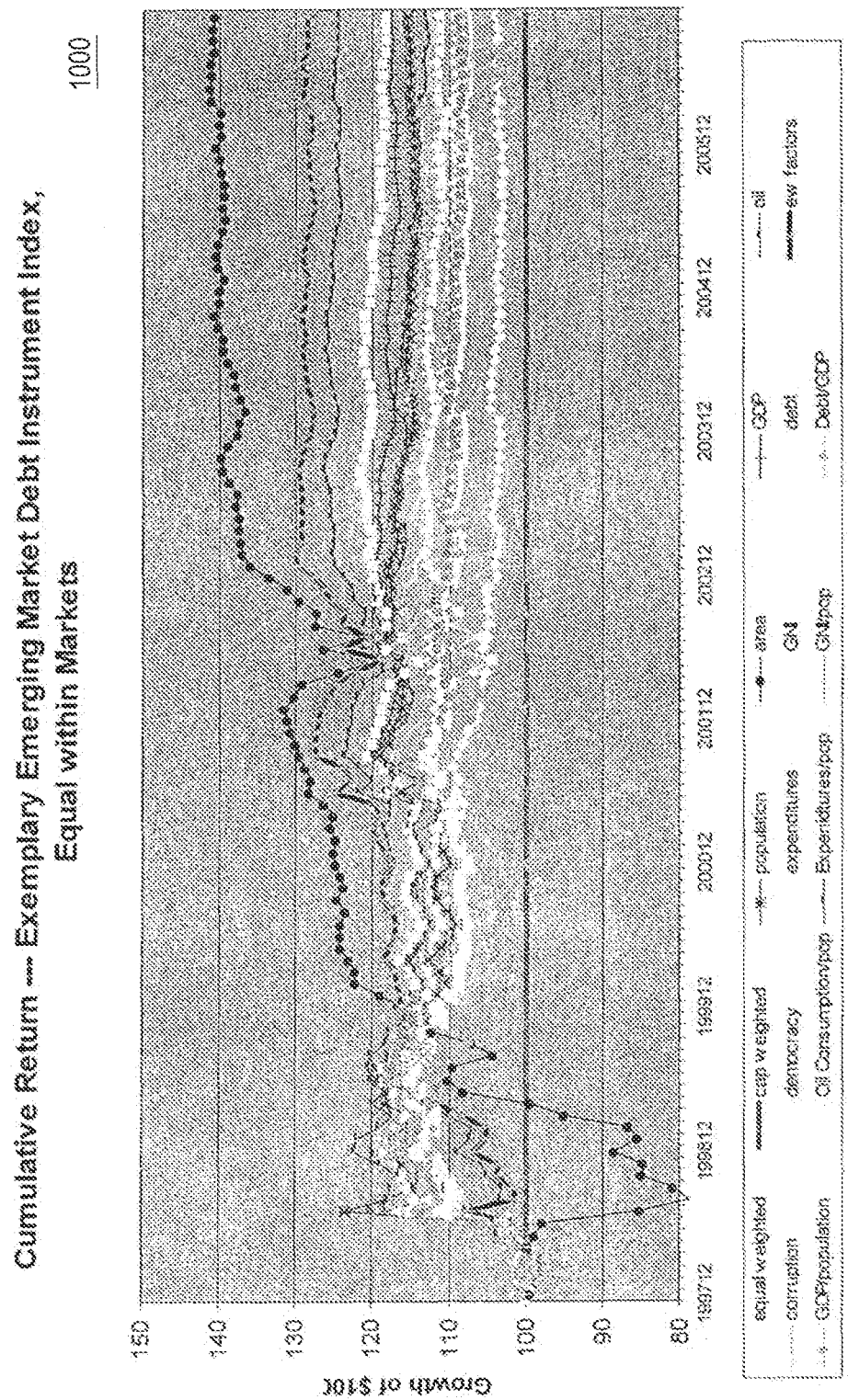
FIG. 10 depicts an exemplary embodiment of a chart graphing cumulative returns by date for exemplary emerging market debt instrument metrics illustrating growth of an exemplary investment, according to an exemplary embodiment.

FIG. 10 depicts an exemplary embodiment of a chart 1000 graphing cumulative returns by date for exemplary emerging market debt instrument metrics illustrating growth of an exemplary investment, according to an exemplary embodiment.

Figure 11:
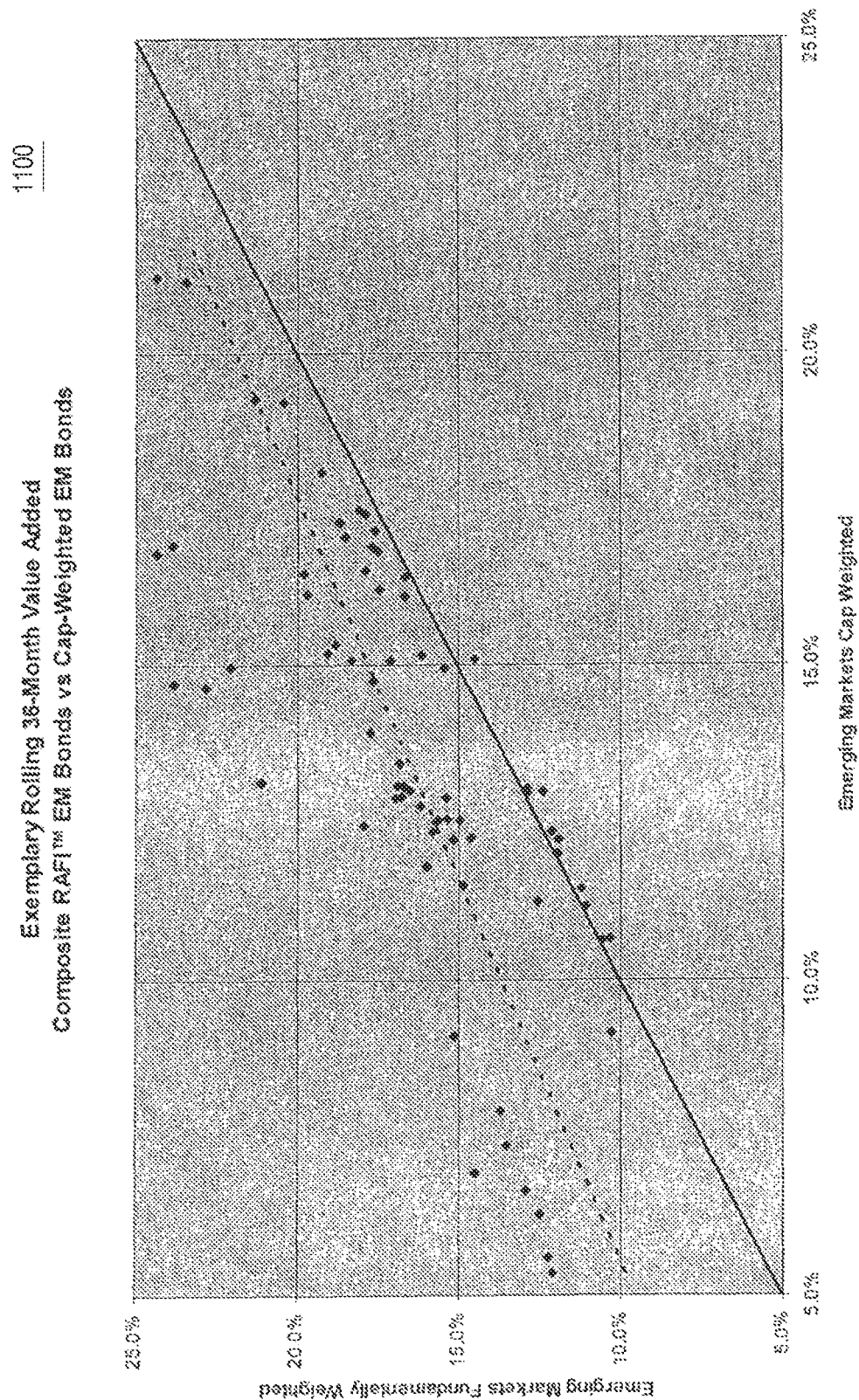
FIG. 11 depicts an exemplary embodiment of a chart graphing a rolling 36-month value added composite exemplary emerging market debt instrument metrics vs. cap-weighted emerging market bonds, according to an exemplary embodiment.

FIG. 11 depicts an exemplary embodiment of a chart 1100 graphing a rolling 36-month value added composite exemplary emerging market debt instrument metrics vs. cap-weighted emerging market bonds, according to an exemplary embodiment.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

TABLE 10_1

Exemplary Embodiment
Low Vol 300 Weighted by Various Weighting Schemes Performance Table
Low Vol 300 Weighted by Various Weighting Schemes

|  | 6 M | 12-M | 3-yr | 5-yr | 10-yr | since 62 |
|---|---|---|---|---|---|---|
| Low Vol 300 (RAFI/Beta_cutoff0.1) Ret | 18.9% | 12.4% | −1.4% | 3.2% | 4.4% | 11.3% |
| Low Vol 300 (RAFI/((Beta_cutoff0.1)^0.5)) Ret | 19.4% | 14.3% | −1.9% | 2.7% | 4.2% | 11.3% |
| Low Vol 300 ((RAFI/Beta_cutoff0.1)^0.5) Ret | 18.3% | 18.4% | −1.0% | 2.5% | 3.8% | 11.7% |
| Low Vol 300 (RAFI/Var) Ret | 18.1% | 18.0% | −2.2% | 2.0% | 3.3% | 10.6% |
| Low Vol 300 (RAFI/Sal) Ret | 18.6% | 18.5% | −2.3% | 2.2% | 3.2% | 10.5% |
| Low Vol 300 ((RAFI/Var)^0.5) Ret | 18.3% | 18.1% | −0.5% | 3.0% | 5.4% | 11.5% |
| Low Vol 300 (Mean/Var) Ret | 18.8% | 17.7% | 8.3% | 3.3% | 8.1% | 11.1% |
| Low Vol 300 ((Mean/Var)^0.5) Ret | 18.3% | 18.1% | 0.7% | 3.5% | 6.5% | 11.5% |
| Low Vol 300 ((1.2RAFI-0.2CAP)/Var)^0.5) Ret | 18.8% | 16.3% | −8.4% | 3.3% | 5.5% | 11.6% |
| Low Vol 300 ((1.5RAFI-0.5CAP)/Var 0.5) Ret | 18.1% | 16.6% | −8.3% | 2.2% | 5.2% | 11.8% |
| Low Vol 300 (RAFI) Ret | 19.9% | 18.9% | −2.3% | 2.4% | 6.2% | 11.3% |
| Min Var Ret | 17.9% | 18.5% | 8.8% | 3.5% | 6.1% | 11.5% |
| US CAP 1000 Index Ret | 24.3% | 16.7% | −1.7% | 3.1% | 2.2% | 9.7% |
| US 1-Month Ret | 0.0% | 0.1% | 8.6% | 2.2% | 2.2% | 5.3% |
| Low Vol 300 (RAFI/Beta_cutoff0.1) Volatility (ann.) | 11.8% | 13.3% | 16.7% | 13.9% | 12.1% | 12.7% |
| Low Vol 300 (RAFI/((Beta_cutoff0.1)^0.5)) Volatility (ann.) | 12.1% | 1.8% | 16.9% | 13.7% | 12.1% | 12.3% |
| Low Vol 300 ((RAFI/Beta_cutoff0.1)^0.5) Volatility (ann.) | 12.8% | 13.7% | 17.7% | 14.3% | 12.3% | 12.9% |
| Low Vol 300 (RAFI/Var) Volatility (ann.) | 12.2% | 12.7% | 18.3% | 13.2% | 11.8% | 12.3% |
| Low Vol 300 (RAFI/Sal) Volatility (ann.) | 12.3% | 13.2% | 18.6% | 13.5% | 11.9% | 12.9% |
| Low Vol 300 ((RAFI/Var)^0.5) Volatility (ann.) | 12.1% | 12.2% | 18.9% | 13.7% | 11.9% | 12.8% |
| Low Vol 300 (Mean/Var) Volatility (ann.) | 10.6% | 12.2% | 15.4% | 12.5% | 13.1% | 12.6% |
| Low Vol 300 ((Mean/Var)^0.5) Volatility (ann.) | 11.3% | 12.2% | 16.0% | 13.0% | 13.4% | 12.6% |
| Low Vol 300 ((1.2RAFI-0.2CAP)/Var) 0.5) Volatility (ann.) | 12.1% | 12.8% | 18.0% | 13.7% | 12.8% | 12.8% |
| Low Vol 300 ((1.5RAFI-0.5CAP)/Var 0.5) Volatility (ann.) | 12.1% | 13.3% | 17.2% | 13.5% | 12.1% | 12.7% |
| Low Vol 300 (RAFI) Volatility (ann.) | 12.8% | 13.2% | 17.1% | 13.9% | 13.2% | 12.8% |
| Min Var Volatility (ann.) | 12.6% | 12.3% | 16.5% | 23.8% | 12.7% | 11.6% |
| US CAP 1000 Index Volatility (ann.) | 17.7% | 19.4% | 21.5% | 17.6% | 18.3% | 18.3% |

TABLE 10_1-continued

Exemplary Embodiment
Low Vol 300 Weighted by Various Weighting Schemes Performance Table
Low Vol 300 Weighted by Various Weighting Schemes

|  | 6 M | 12-M | 3-yr | 5-yr | 10-yr | since 62 |
|---|---|---|---|---|---|---|
| Low Vol 300 (RAFI/Beta_cutoff0.1) Sharpe Ratio | 1.60 | 1.01 | −0.12 | 0.07 | 0.18 | 0.47 |
| Low Vol 300 (RAFI/((Beta_cutoff0.1)^0.5)) Sharpe Ratio | 1.60 | 1.05 | −0.14 | 0.03 | 0.17 | 0.87 |
| Low Vol 300 ((RAFI/Beta_cutoff0.1)^0.5) Sharpe Ratio | 1.40 | 1.18 | −0.04 | 0.05 | 0.17 | 0.56 |
| Low Vol 300 (RAFI/Var) Sharpe Ratio | 1.70 | 1.10 | −0.37 | 0.02 | 0.12 | 0.43 |
| Low Vol 300 (RAFI/Sal) Sharpe Ratio | 1.86 | 1.09 | −0.17 | 0.06 | 0.13 | 0.44 |
| Low Vol 300 ((RAFI/Var)^0.5) Sharpe Ratio | 1.82 | 1.22 | −0.06 | 0.06 | 0.27 | 0.49 |
| Low Vol 300 (Mean/Var) Sharpe Ratio | 1.79 | 1.41 | −0.02 | 0.10 | 0.38 | 0.50 |
| Low Vol 300 ((Mean/Var)^0.5) Sharpe Ratio | 1.78 | 1.41 | 0.01 | 0.11 | 0.38 | 0.49 |
| Low Vol 300 ((1.2RAFI-0.2CAP)/Var)^0.5) Sharpe Ratio | 1.82 | 1.28 | −0.06 | 0.06 | 0.38 | 0.50 |
| Low Vol 300 ((1.5RAFI-0.5CAP)/Var 0.5) Sharpe Ratio | 1.81 | 1.28 | −0.08 | 0.07 | 0.38 | 0.51 |
| Low Vol 300 (RAFI) Sharpe Ratio | 1.96 | 1.01 | −0.10 | 0.01 | 0.17 | 0.46 |
| Min Var Sharpe Ratio | 1.35 | 1.90 | −0.01 | 0.10 | 0.38 | 0.53 |
| US CAP 1000 Index Sharpe Ratio | 1.37 | 0.85 | −0.10 | 0.03 | 0.00 | 0.28 |

TABLE 10_2

Low Vol 300 Weighted by Various
Weighting Schemes Turnover Rates

| One-Way Turnover (1962-2010) | Turnover |
|---|---|
| Low Vol 300 (RAFI/Beta_cutoff0.1) | 22.6% |
| Low Vol 300 (RAFI/((Beta_cutoff0.1)^0.5)) | 21.0% |
| Low Vol 300 ((RAFI/Beta_cutoff0.1) 0.5) | 23.2% |
| Low Vol 300 (RAFI/Var) | 18.8% |
| Low Vol 300 (RAFI/Std) | 19.6% |
| Low Vol 300 ((RAFI/Var)^0.5) | 21.4% |
| Low Vol 300 (Mean/Var) | 28.3% |
| Low Vol 300 ((Mean/Var)^0.5) | 28.6% |
| Low Vol 300 (((1.2RAFI-0.2CAP)/Var)^0.5) | 21.7% |
| Low Vol 300 (((1.5RAFI-0.5CAP)/Var)^0.5) | 22.3% |
| Low Vol 300 (RAFI) | 21.6% |
| Min Var | 44.4% |
| US CAP 1000 Index | 4.4% |

TABLE 10_3

Low Vol 300 Weighted by Various Weighting Schemes Weighted Average
Capitalization (as of Dec. 2010), according to various exemplary
embodiments.

Exemplary Embodiments
Construction#10

Use 60 months full history to get rolling beta, variance, and mean. Didn't consider any securities with less than 60 month returns, according to an exemplary embodiment.

TABLE 10_3-continued

Low Vol 300 Weighted by Various Weighting Schemes Weighted Average
Capitalization (as of Dec. 2010), according to various exemplary
embodiments.

Research Design Exemplary Embodiments

Low Vol 300 (RAFI/Beta_cutoff0.1)
Low Vol 300 (RAFI/((Beta_cutoff0.1)^0.5)): take square root on beta only.
Low Vol 300 ((RAFI/Beta_cutoff0.1)^0.5): take square root on RAFI/Beta.
Low Vol 300 (RAFI/Var)
Low Vol 300 (RAFI/Std)
Low Vol 300 ((RAFI/Var)^0.5): take square root on RAFI/Variance.
Low Vol 300 (Mean/Var)
Low Vol 300 ((Mean/Var)^0.5): take square root on Mean/Variance.
Low Vol 300 (((1.2RAFI-0.2CAP)/Var)^0.5): take square root on (1.2RAFI-0.2CAP)/Var
Low Vol 300 (((1.5RAFI-0.5CAP)/Var)^0.5): take square root on (1.5RAFI-0.5CAP)/Var
Note1: we need set cutoff points on beta to avoid extreme inverse values.
Note2: variance is just historical variance of stock returns.
Note3: we don't need to set cutoff points for variance.
Note4: mean is the historical average of stock returns.
Note5: Improve the expected return to Mean/Var by combining RAFI and CAP.

TABLE 10_1.1

Exemplary Embodiment
Low Vol 300 Weighted by Various Weighting Schemes Performance Table
Low Vol 300 Weighted by RAFI/Beta and Transformation

|  | 6 M | 12-M | 3-yr | 5-yr | 10-yr | since 62 |
|---|---|---|---|---|---|---|
| Low Vol 300 (RAFI/Beta_cutoff0.1) Ret | 18.8% | 13.3% | −1.6% | 3.0% | 4.4% | 11.4% |
| Low Vol 300 (RAFI/((Beta_cutoff0.1)^0.5)) Ret | 19.4% | 14.3% | −1.8% | 2.6% | 4.2% | 11.3% |
| Low Vol 300 ((RAFI/Beta_cutoff0.1)^0.5) Ret | 18.3% | 18.4% | −1.3% | 2.7% | 3.8% | 11.7% |
| Low Vol 300 (RAFI/Var) Ret | 18.8% | 13.9% | −2.4% | 2.0% | 3.5% | 1.07% |
| Low Vol 300 (RAFI/Sal) Ret | 18.5% | 14.4% | −2.4% | 2.1% | 3.7% | 11.0% |
| Low Vol 300 ((RAFI/Var)^0.5) Ret | 18.8% | 16.6% | −3.7% | 2.8% | 5.8% | 11.6% |
| Low Vol 300 (Mean/Var) Ret | 19.2% | 17.7% | 0.3% | 3.5% | 6.3% | 11.4% |
| Low Vol 300 ((Mean/Var)^0.5) Ret | 19.4% | 18.2% | 0.6% | 3.8% | 6.6% | 11.7% |
| Low Vol 300 ((1.2RAFI-0.2CAP)/Var)^0.5) Ret | 18.8% | 18.2% | −0.7% | 3.0% | 5.6% | 11.7% |
| Low Vol 300 ((1.5RAFI-0.5CAP)/Var 0.5) Ret | 18.3% | 16.3% | −0.6% | 2.1% | 5.8% | 11.8% |
| Low Vol 300 (RAFI) Ret | 19.9% | 28.1% | −2.3% | 2.4% | 4.2% | 11.4% |
| Min Var Ret | 17.0% | 18.5% | 6.3% | 3.3% | 6.1% | 11.4% |

TABLE 10_1.1-continued

Exemplary Embodiment
Low Vol 300 Weighted by Various Weighting Schemes Performance Table
Low Vol 300 Weighted by RAFI/Beta and Transformation

| | | | | | | |
|---|---|---|---|---|---|---|
| US CAP 1000 Index Ret | 24.3% | 16.7% | −1.7% | 3.1% | 2.2% | 9.7% |
| US 1-Month Ret | 0.0% | 0.1% | 0.6% | 2.2% | 2.2% | 5.3% |
| Low Vol 300 (RAFI/Beta_cutoff0.1) Volatility (ann.) | 11.8% | 13.2% | 16.8% | 13.8% | 12.2% | 12.6% |
| Low Vol 300 (RAFI/((Beta_cutoff0.1)^0.5)) Volatility (ann.) | 12.3% | 13.5% | 17.0% | 13.8% | 12.2% | 12.9% |
| Low Vol 300 ((RAFI/Beta_cutoff0.1)^0.5) Volatility (ann.) | 12.8% | 13.7% | 17.9% | 14.4% | 12.5% | 12.8% |
| Low Vol 300 (RAFI/Var) Volatility (ann.) | 12.2% | 12.7% | 16.3% | 13.3% | 11.9% | 12.3% |
| Low Vol 300 (RAFI/Sal) Volatility (ann.) | 12.3% | 13.2% | 16.7% | 13.8% | 12.0% | 12.5% |
| Low Vol 300 ((RAFI/Var)^0.5) Volatility (ann.) | 12.1% | 13.1% | 17.6% | 13.7% | 12.0% | 12.6% |
| Low Vol 300 (Mean/Var) Volatility (ann.) | 18.6% | 12.3% | 13.3% | 12.7% | 12.2% | 12.5% |
| Low Vol 300 ((Mean/Var)^0.5) Volatility (ann.) | 11.3% | 12.8% | 16.3% | 13.3% | 11.8% | 12.6% |
| Low Vol 300 ((1.2RAFI-0.2CAP)/Var)^0.5) Volatility (ann.) | 12.1% | 13.3% | 17.3% | 13.8% | 12.3% | 12.5% |
| Low Vol 300 ((1.5RAFI-0.5CAP)/Var^0.5) Volatility (ann.) | 12.1% | 13.2% | 17.2% | 13.9% | 12.2% | 12.6% |
| Low Vol 300 (RAFI) Volatility (ann.) | 12.5% | 13.9% | 17.2% | 14.0% | 12.3% | 12.5% |
| Min Var Volatility (ann.) | 12.6% | 12.3% | 16.3% | 13.4% | 11.7% | 11.8% |
| US CAP 1000 Index Volatility (ann.) | 17.7% | 19.4% | 21.9% | 17.0% | 10.3% | 15.3% |
| Low Vol 300 (RAFI/Beta_cutoff0.1) Sharpe Ratio | 1.59 | 1.01 | −0.13 | 0.08 | 0.18 | 0.46 |
| Low Vol 300 (RAFI/((Beta_cutoff0.1)^0.5)) Sharpe Ratio | 1.58 | 1.06 | −0.15 | 0.03 | 0.17 | 0.48 |
| Low Vol 300 ((RAFI/Beta_cutoff0.1)^0.5) Sharpe Ratio | 1.43 | 1.20 | −0.10 | 0.01 | 0.27 | 0.53 |
| Low Vol 300 (RAFI/Var) Sharpe Ratio | 1.70 | 1.09 | −0.18 | 0.02 | 0.11 | 0.43 |
| Low Vol 300 (RAFI/Sal) Sharpe Ratio | 1.66 | 1.09 | −0.19 | 0.01 | 0.13 | 0.45 |
| Low Vol 300 ((RAFI/Var)^0.5) Sharpe Ratio | 1.52 | 1.22 | −0.85 | 0.05 | 0.27 | 0.50 |
| Low Vol 300 (Mean/Var) Sharpe Ratio | 1.51 | 1.46 | 0.02 | −0.92 | 0.37 | 0.48 |
| Low Vol 300 ((Mean/Var)^0.5) Sharpe Ratio | 1.71 | 1.43 | 0.95 | 0.11 | 0.38 | 0.51 |
| Low Vol 300 ((1.2RAFI-0.2CAP)/Var)^0.5) Sharpe Ratio | 1.82 | 1.23 | −0.08 | 0.05 | 0.28 | 0.51 |
| Low Vol 300 ((1.5RAFI-0.5CAP)/Var^0.5) Sharpe Ratio ** | 1.81 | 1.23 | −0.07 | 0.06 | 0.30 | 0.53 |
| Low Vol 300 (RAFI) Sharpe Ratio | 1.85 | 1.09 | −0.12 | 0.01 | 0.16 | 0.47 |
| Min Var Sharpe Ratio | 1.39 | 1.56 | −0.81 | 0.10 | 0.34 | 0.51 |
| US CAP 1000 Index Sharpe Ratio | 1.32 | 0.89 | −0.10 | 0.05 | 0.00 | 0.28 |

| One-Way Turnover ($Mil, As of December 2010) | WA CAP |
|---|---|
| Low Vol 300 (RAFI/Beta_cutoff0.1) | 99,150 |
| Low Vol 300 (RAFI/((Beta_cutoff0.1)^0.5)) | 95,359 |
| Low Vol 300 ((RAFI/Beta_cutoff0.1)^0.5) | 42,380 |
| Low Vol 300 (RAFI/Var) | 99,468 |
| Low Vol 300 (RAFI/Sal) | 96,436 |
| Low Vol 300 ((RAFI/Var)^0.5) | 45,986 |
| Low Vol 300 (Mean/Var) | 20,973 |
| Low Vol 300 ((Mean/Var)^0.5) | 19,042 |
| Low Vol 300 ((1.2RAFI-0.2CAP)/Var)^0.5) | 95,683 |
| Low Vol 300 ((1.5RAFI-0.5CAP)/Var^0.5) | 45,437 |
| Low Vol 300 (RAFI) | 80,886 |
| Min Var | 19,709 |
| US CAP 1000 Index | 73,377 |

** RAFI + 0.5(RAFI-CAP)

Various Exemplary Embodiments

According to an exemplary embodiment, an index construction system, method, and/or computer program product may include: determining, by at least one computer processor, a proportional fundamental index weight for each index constituent financial objects based on at least one objective measure of scale associated with said entities or said financial objects; wherein said at least one objective measure of scale comprises a financial metric associated with one of said entities or said financial objects other than the market capitalization of said entities or the price of said financial objects; wherein said financial metric comprises at least one of: book value; sales; cash flow; or any dividends; and managing, by the at least one computer processor, a portfolio of financial objects based on said index of financial objects, wherein said managing comprises at least one of: adjusting, by the at least one computer processor, the financial objects that comprise said portfolio based on changes to the at least one objective measure of scale used to weight the plurality of financial objects used to construct the index of financial objects; adjusting, by the at least one computer processor, the relative weightings of the financial objects that comprise said portfolio based on changes to the at least one objective measure of scale used to weight the plurality of financial objects used to construct the index of financial objects; rebalancing, by the at least one computer processor, the relative weightings of the financial objects that comprise said portfolio when the weighting of one or more of said financial objects at least one of: exceeds a threshold value, or deviates from a target weight; or rebalancing the relative weightings of the financial objects that comprise said portfolio to minimize turnover of said financial objects.

According to an exemplary embodiment, an index construction system, method, and/or computer program product may include: determining, by at least one computer processor, a proportional fundamental index weight for each index constituent financial objects based on at least one objective measure of scale associated with said entities or said financial objects; wherein said at least one objective measure of scale comprises a financial metric associated with one of said entities or said financial objects other than the market capitalization of said entities or the price of said financial objects; wherein said financial metric comprises at least one of: book value; sales; cash flow; or any dividends; and weighting, by the at least one computer processor, by a mathematical combination of a plurality of financial metric data for a given financial object of a given entity, said plurality of financial metric data of said given financial object of said given entity, comprising at least one: a plurality of time periods; a plurality of years; a plurality of quarters; a plurality of months; or a plurality of accounting periods; and wherein said mathematical combination of said plurality of financial metric data for said given financial object of said given entity, comprises at least one of: calculating, by the at least one computer processor, a mathematical average of said plurality of financial metric data of said given financial object of said given entity; calculating, by the at least one computer processor, a mathematical weighted average of said plurality of financial metric data of said given financial object of said given entity; calculating, by the at least one computer processor, a statistical mean of said plurality of financial metric data of said given financial object of said given entity; calculating, by the at least one computer processor, a statistical median of said plurality of financial metric data of said given financial object of said given entity; or calculating, by the at least one computer processor, a midpoint of said plurality of financial metric data of said given financial object of said given entity.

According to an exemplary embodiment, an index construction system, method, and/or computer program product may include: receiving a plurality of historical data of a plurality of financial metrics of a plurality of financial objects, said plurality of financial objects comprising publicly traded entities; and weighting, by at least one computer processor, a plurality of index constituent financial objects, each of said plurality of index constituent financial objects associated with at least one entity, and determining, by the at least one computer processor, a proportional fundamental index weight for each of said index constituent financial objects based on at least one objective measure of scale associated with said entities or said financial objects; wherein said at least one objective measure of scale comprises at least one of: at least one financial metric associated with one of said entities or said financial objects; at least one demographic measure of one of said entities or said financial objects; or at least one metric from information disclosures of a publicly traded entity; and wherein said at least one objective measure of scale comprises a metric other than the market capitalization of said entities or the price of said financial objects; and weighting, by the at least one computer processor, by a mathematical combination of a plurality of data for said at least one objective measure of scale of a given financial object of a given entity, said plurality of data for said at least one objective measure of scale of said given financial object of said given entity, comprising at least one: a plurality of time periods; a plurality of years; a plurality of quarters; a plurality of months; or a plurality of accounting periods; and wherein said mathematical combination of said plurality data for said given financial object of said given entity, comprises at least one of: calculating, by the at least one computer processor, a mathematical average of said plurality of data for said given financial object of said given entity; calculating, by the at least one computer processor, a mathematical weighted average of said plurality of financial metric data of said given financial object of said given entity; calculating, by the at least one computer processor, a statistical mean of said plurality of financial metric data of said given financial object of said given entity; calculating, by the at least one computer processor, a statistical median of said plurality of financial metric data of said given financial object of said given entity; or calculating, by the at least one computer processor, a midpoint of said plurality of financial metric data of said given financial object of said given entity.

According to an exemplary embodiment, the index construction system, method, and/or computer program product may further include normalizing, by the at least one computer processor, data over a plurality of time periods According to an exemplary embodiment, the index construction system, method, and/or computer program product may further include rebalancing, by the at least one computer processor, said index on a periodic basis.

According to an exemplary embodiment, the index construction system, method, and/or computer program product may include where said rebalancing said index on a periodic basis comprises at least one of: rebalancing, by the at least one computer processor, on a yearly basis; rebalancing, by the at least one computer processor, on a quarterly basis; rebalancing, by the at least one computer processor, on a half year basis; or rebalancing, by the at least one computer processor, on a multiple year basis.

According to an exemplary embodiment, the index construction system, method, and/or computer program product may further include recalculating, by the at least one computer processor, said index on a periodic basis.

According to an exemplary embodiment, the index construction system, method, and/or computer program product may include where said recalculating said index on said periodic basis comprises at least one of: recalculating, by the at least one computer processor, on a yearly basis; recalculating, by the at least one computer processor, on a quarterly basis; recalculating, by the at least one computer processor, on a half year basis; or recalculating, by the at least one computer processor, on a multiple year basis.

According to an exemplary embodiment, the index construction system, method, and/or computer program product may further include adjusting, by the at least one computer processor, said index based on changes over time;

According to an exemplary embodiment, the index construction system, method, and/or computer program product may include where said adjusting said index based on said changes comprises at least one of: adjusting, by the at least one computer processor, said index upon a change in financial market status of an index constituent; adjusting, by the at least one computer processor, said index upon an index constituent going bankrupt; adjusting, by the at least one computer processor, said index upon an index constituent stock split; adjusting, by the at least one computer processor, said index upon an index constituent modifying at least one class of stock; adjusting, by the at least one computer processor, said index upon a price shift of an index constituent; or adjusting, by the at least one computer processor, said index upon a delisting of an index constituent.

According to an exemplary embodiment, the index construction system, method, and/or computer program product may further include adjusting, by the at least one computer processor, said index based on missing data.

According to an exemplary embodiment, the index construction system, method, and/or computer program product may include where said adjusting said index based on missing data comprises: adjusting, by the at least one computer processor, said index if a plurality of metrics are being used, and for a given entity or financial object one of said plurality of metrics is missing.

According to an exemplary embodiment, the index construction system, method, and/or computer program product may include where said adjusting said index based on missing data comprises: averaging said remaining plurality of metrics, leaving out said missing metric.

According to an exemplary embodiment, an index construction system, method, and/or computer program product may include: receiving a plurality of historical data of a plurality of financial metrics of a plurality of financial objects, said plurality of financial objects each relating to an entity; and weighting, by at least one computer processor, a plurality of index constituent financial objects, each of said plurality of index constituent financial objects associated with an entity, and determining, by the at least one computer processor, a proportional fundamental index weight for each of said index constituent financial objects based on at least one objective measure of scale associated with said entities or said financial objects; wherein said at least one objective measure of scale comprises at least one of: at least one financial metric associated with at least one of said entities or said financial objects; at least one demographic measure of at least one of said entities or said financial objects; or at least one metric from information disclosures of a publicly traded entity; and wherein said at least one objective measure of scale comprises a metric other than the market capitalization of said entities or the price of said financial objects; and weighting, by the at least one computer processor, by a mathematical combination of a plurality of data for said at least one objective measure of scale of a given financial object of a given entity, said plurality of data for said at least one objective measure of scale of said given financial object of said given entity, comprising at least one of: a plurality of time periods; a plurality of years; a plurality of quarters; a plurality of months; or a plurality of accounting periods; and wherein said mathematical combination of said plurality data for said given financial object of said given entity, comprises at least one of: calculating, by the at least one computer processor, a mathematical average of said plurality of data for said given financial object of said given entity; calculating, by the at least one computer processor, a mathematical weighted average of said plurality of financial metric data of said given financial object of said given entity; calculating, by the at least one computer processor, a statistical mean of said plurality of financial metric data of said given financial object of said given entity; calculating, by the at least one computer processor, a statistical median of said plurality of financial metric data of said given financial object of said given entity; or calculating, by the at least one computer processor, a midpoint of said plurality of financial metric data of said given financial object of said given entity.

According to an exemplary embodiment, the index construction system, method, and/or computer program product may include where said calculating said mathematical combination comprises reducing risk.

According to an exemplary embodiment, the index construction system, method, and/or computer program product may include where said objective measure of scale comprises at least one of: book value; sales; revenue; profit; earnings; cash flow; cash earnings; or a fundamental accounting variable.

According to an exemplary embodiment, an index construction system, method, and/or computer program product may include: receiving fundamental accounting data about a plurality of entities, over a plurality of time periods, each of said entities associated with one of said financial objects; receiving a plurality of index constituents; weighting said plurality of said index constituents according to at least one financial metric of said fundamental accounting data, each of said at least one financial metrics having data for said plurality of time periods from said fundamental accounting data to obtain relative weightings, and wherein said weighting comprises: averaging said fundamental accounting data over said plurality of said time periods for said each of said at least one financial metrics; and weighting said index constituents using at least one economic-centric metric about said entities rather than a market-centric metric to obtain an economic-centric index, wherein said at least one economic-centric metric comprises a metric comprising at least one of: at least one economic size metric; at least one economic impact metric; or at least one economic footprint metric; providing said economic-centric index to a third party, wherein said third party manages, by at least one computer processor, a portfolio of financial objects based on said index of financial objects, wherein said third party manages, comprising at least one of: adjusts, by the at least one computer processor, the financial objects that comprise said portfolio based on changes to said one or more financial metrics used to weight the plurality of financial objects used to construct the economy-centric index of financial objects; adjusts, by the at least one computer processor, the relative weightings of the financial objects that comprise said portfolio based on changes to the at least one objective measure of scale used to weight the plurality of financial objects used to construct the economy-centric index of financial objects; rebalances, by the at least one computer processor, the relative weightings of the financial objects that comprise said portfolio when the weighting of one or more of said financial objects at least one of: exceeds a threshold value, or deviates from a target weight; or rebalances, by the at least one computer processor, the relative weightings of the financial objects that comprise said portfolio to minimize turnover of said financial objects.

According to an exemplary embodiment, the index construction system, method, and/or computer program product may include where said weighting comprises: weighting based on a plurality of said economic-centric metrics.

According to an exemplary embodiment, the index construction system, method, and/or computer program product may include where said weighting based on said plurality of economic-centric metrics comprises: weighting based on at least one of: book value; book value of operating assets; sales; revenue; profit; earnings; cash flow; cash earnings; cash flow from operations; or a fundamental accounting variable.

According to an exemplary embodiment, the index construction system, method, and/or computer program product may include where said weighting based on said plurality of economic-centric metrics comprises: weighting based on metrics comprising: book value; sales; and cash flow.

According to an exemplary embodiment, the index construction system, method, and/or computer program product may include where said third party further manages comprising: rebalances on a periodic time basis; or rebalances on a periodic accounting period basis.

According to an exemplary embodiment, an index construction system, method, and/or computer program product may include: receiving, by at least one processor, fundamental accounting data about a plurality of entities, over a plurality of accounting periods, each of said entities associated with one of said financial objects; receiving, by the at least one processor, a plurality of index constituents; weighting, by the at least one processor, said plurality of said index constituents according to one or more financial metrics of said fundamental accounting data, each of said one or more financial metrics having data for said plurality of accounting periods from said fundamental accounting data to obtain relative weightings, and wherein said weighting comprises: averaging said fundamental accounting data over said plurality of said accounting periods for said each of said one or more financial metrics; and weighting said index constituents using at least one economic-centric metric about said entities rather than market-centric metric to obtain an economic-centric index, wherein said at least one economic-centric metric comprises a metric comprising at least one of: at least one economic size metric; at least one economic impact metric; or at least one economic footprint metric; providing said economic-centric index to a third party, wherein said third party manages, by at least one computer processor, a portfolio of financial objects based on said index of financial objects, wherein said third party manages, comprising at least one of: adjusts, by the at least one computer processor, the financial objects that comprise said portfolio based on changes to said one or more financial metrics used to weight the plurality of financial objects used to construct the economy-centric index of financial objects; adjusts, by the at least one computer processor, the relative weightings of the financial objects that comprise said portfolio based on changes to the at least one objective measure of scale used to weight the plurality of financial objects used to construct the economy-centric index of financial objects; rebalances, by the at least one computer processor, the relative weightings of the financial objects that comprise said portfolio when the weighting of one or more of said financial objects at least one of: exceeds a threshold value, or deviates from a target weight; or rebalances, by the at least one computer processor, the relative weightings of the financial objects that comprise said portfolio to minimize turnover of said financial objects.

According to an exemplary embodiment, the index construction system, method, and/or computer program product may include where said weighting comprises: weighting based on a plurality of said economic-centric metrics.

According to an exemplary embodiment, the index construction system, method, and/or computer program product may include where said weighting based on said plurality of economic-centric metrics comprises: weighting based on at least one of: book value; book value of operating assets; sales; revenue; profit; earnings; cash flow; cash earnings; cash flow from operations; or a fundamental accounting variable.

According to an exemplary embodiment, the index construction system, method, and/or computer program product may include where said weighting based on said plurality of economic-centric metrics comprises: weighting based on metrics comprising: book value; sales; and cash flow.

According to an exemplary embodiment, the index construction system, method, and/or computer program product may include where said third party further manages comprising: rebalances on a periodic time basis; or rebalances on a periodic accounting period basis.

According to an exemplary embodiment, an index construction system, method, and/or computer program product may include: receiving, by at least one computer processor, data about a plurality of entities and a plurality of corresponding financial objects associated with the plurality of entities from at least one database storing and permitting retrieval of such data; receiving, by the at least one computer processor, data indicative of a set of financial objects comprising a plurality of constituent financial objects; weighting, by the at least one computer processor, said constituent financial objects, wherein said weighting comprises: determining, by the at least one computer processor, a proportional fundamental weight for each said constituent financial object based on at least one objective measure of scale associated with said entities or said financial objects; wherein said at least one objective measure of scale comprises at least one financial metric associated with one of said entities or said financial objects other than the market capitalization of said entities or the price of said financial objects; wherein said at least one financial metric comprises at least one of: book value; sales; cash flow; or any dividends; and managing, by the at least one computer processor, a portfolio of financial objects based on said set of financial objects, wherein said managing comprises at least one of: adjusting, by the at least one computer processor, the financial objects that comprise said portfolio based on changes to the at least one objective measure of scale used to weight the plurality of financial objects used to construct the set of financial objects; adjusting, by the at least one computer processor, the proportional fundamental weight of the financial objects that comprise said portfolio based on changes to the at least one objective measure of scale used to weight the plurality of financial objects used to construct the set of financial objects; rebalancing, by the at least one computer processor, the proportional fundamental weight of the financial objects that comprise said portfolio when the weighting of one or more of said financial objects at least one of: exceeds a threshold value, or deviates from a target weight; or rebalancing the proportional fundamental weight of the financial objects that comprise said portfolio to minimize turnover of said financial objects.

According to an exemplary embodiment, the index construction system, method, and/or computer program product may include where said selecting said subset of said financial objects of said universe comprises: selecting said subset based on a beta associated with each of said financial objects; and wherein said weighting comprises: weighting said weighted financial objects dependent on said beta associated with each of said financial objects.

According to an exemplary embodiment, the index construction system, method, and/or computer program product may include where said selecting said subset based on beta comprises: ranking based on beta of each of said financial objects; and selecting a subset having the least beta.

According to an exemplary embodiment, the index construction system, method, and/or computer program product may include where said selecting said subset having the least beta comprises selecting a number of said financial objects having the least beta.

According to an exemplary embodiment, the index construction system, method, and/or computer program product may include where said weighting comprises: reweighting each of said weightings of each of said selected and weighted financial objects of the ADBI over beta of said each of said selected and weighted financial object.

According to an exemplary embodiment, the index construction system, method, and/or computer program product may include where said weighting comprises: avoiding extreme values from inverted beta.

According to an exemplary embodiment, the index construction system, method, and/or computer program product may include where said avoiding comprises: determining whether a given beta is less than a pre-determined cutoff value, and when so determined, replacing said given beta with said pre-determined cutoff value wherein said weighting comprises: applying signal diversification enhancement on said reweightings.

According to an exemplary embodiment, the index construction system, method, and/or computer program product may include where said reweightings comprise: avoiding over-concentrated allocation.

According to an exemplary embodiment, an index construction system, method, and/or computer program product may include: an exemplary system, method, or computer program product, executed on a data processing system, which may include: creating, by at least one processor, an accounting data based index (ADBI) based on accounting data including: selecting, by the at least one processor, a universe of financial objects, selecting, by the at least one processor, a subset of said financial objects of said universe based on at least one of said accounting data, and weighting, by the at least one processor, said subset of said universe according to at least one of said accounting data to obtain the ADBI; and creating, by the at least one processor, a portfolio of financial objects using the ADBI, including said subset of selected and weighted financial objects.

According to an exemplary embodiment, an index construction system, method, and/or computer program product may include: an exemplary system, method, or computer program product, executed on a data processing system, which may include: creating, by at least one processor, an accounting data based index (ADBI) based on accounting data including: selecting, by the at least one processor, a universe of financial objects, selecting, by the at least one processor, a subset of said financial objects of said universe based on at least one of said accounting data, and weighting, by the at least one processor, said subset of said universe according to at least one of said accounting data to obtain the ADBI; wherein said selecting said subset of said financial objects of said universe comprises: selecting said subset based on a volatility associated with each of said financial objects; and wherein said weighting comprises: weighting said weighted financial objects dependent on said volatility associated with each of said financial objects.

According to an exemplary embodiment, the index construction system, method, and/or computer program product may include where said weighting comprises at least one of: weighting a factor of a given constituent by a product of an ADBI index weight factor and one over a variance; weighting a factor of a given constituent by a product of an ADBI index weight factor and one over a standard deviation; weighting a factor of a given constituent by a product of an ADBI index weight factor and one over square root of variance; weighting a factor of a given constituent by a product of an ADBI index weight factor and one over a variance, and computing a square root of the product; weighting a factor of a given constituent by a product of an ADBI index weight factor and one over a beta; weighting a factor of a given constituent by a product of an ADBI index weight factor and one over a beta cutoff; weighting a factor of a given constituent by a product of an ADBI index weight factor and one over a beta cutoff of 0.1; weighting a factor of a given constituent by a product of an ADBI index weight factor and one over a beta cutoff to a ½ power; weighting a factor of a given constituent by taking a difference between an ADBI index weight and a capitalization index weight; weighting a factor of a given constituent by taking a difference between an ADBI index weight and a capitalization index weight, and computing a product of said difference with one over a variance; weighting a factor of a given constituent by taking a difference between a weighted ADBI index weight and a weighted capitalization index weight, and computing a product of said difference with one over a variance; weighting a factor of a given constituent by taking a difference between a weighted ADBI index weight and a weighted capitalization index weight, and computing a product of said difference with one over a variance, and computer a square root of said product; weighting using variance, wherein variance comprises a historical variance of returns of financial objects; weighting using mean, wherein mean comprises a historical average of returns of financial objects; weighting using historical averages over a range of time; weighting using historical averages over a range of 36-60 months; weighting using a reciprocal of beta; weighting using a reciprocal of variance; weighting using a square root; or weighting using a square root of a reciprocal of variance.

What is claimed is:

1. An index construction method comprising:
   determining, by at least one computer processor, a proportional fundamental index weight for each index constituent financial objects based on at least one objective measure of scale associated with said entities or said financial objects;
   wherein said at least one objective measure of scale comprises a financial metric associated with one of said entities or said financial objects other than the market capitalization of said entities or the price of said financial objects;
   wherein said financial metric comprises any two or more of: book value; sales; cash flow; or any dividends; and
   managing, by the at least one computer processor, a portfolio of financial objects based on said index of financial objects, wherein said managing comprises at least one of:
      adjusting, by the at least one computer processor, the financial objects that comprise said portfolio based on changes to the at least one objective measure of scale used to weight a plurality of financial objects used to construct the index of financial objects;
      adjusting, by the at least one computer processor, relative weightings of the financial objects that comprise said portfolio based on changes to the at least one objective measure of scale used to weight the plurality of financial objects used to construct the index of financial objects;
      rebalancing, by the at least one computer processor, relative weightings of the financial objects that comprise said portfolio when the weighting of one or more of said financial objects at least one of: exceeds a threshold value, or deviates from a target weight; or
      rebalancing relative weightings of the financial objects that comprise said portfolio to minimize turnover of said financial objects.

2. An index construction method comprising:
   determining, by at least one computer processor, a proportional fundamental index weight for each index constituent financial objects based on at least one objective measure of scale associated with said entities or said financial objects;
   wherein said at least one objective measure of scale comprises a financial metric associated with one of said entities or said financial objects other than the market capitalization of said entities or the price of said financial objects;
   wherein said financial metric comprises at least one of: book value; sales; cash flow; or any dividends; and
   weighting, by the at least one computer processor, by a mathematical combination of a plurality of values of said financial metric data for a given financial object of a given entity, said plurality of financial metric data of said given financial object of said given entity, comprising at least one:
      a plurality of time periods;
      a plurality of years;
      a plurality of quarters;
      a plurality of months; or
      a plurality of accounting periods; and wherein said mathematical combination of said plurality of said values of said financial metric data for said given financial object of said given entity, comprises at least one of:

calculating, by the at least one computer processor, a mathematical average of said plurality of financial metric data of said given financial object of said given entity;

calculating, by the at least one computer processor, a mathematical weighted average of said plurality of financial metric data of said given financial object of said given entity;

calculating, by the at least one computer processor, a statistical mean of said plurality of financial metric data of said given financial object of said given entity;

calculating, by the at least one computer processor, a statistical median of said plurality of financial metric data of said given financial object of said given entity;

calculating, by the at least one computer processor, a midpoint of said plurality of financial metric data of said given financial object of said given entity;

transforming, by the at least one computer processor, at least one of said plurality of financial metric data of said given financial object of said given entity;

transforming, by the at least one computer processor, at least one of said plurality of financial metric data of said given financial object of said given entity, by taking a power of said financial metric data;

transforming, by the at least one computer processor, at least one of said plurality of financial metric data of said given financial object of said given entity, by taking a fractional power of said financial metric data;

normalizing, by the at least one computer processor, at least one of said plurality of financial metric data;

transforming, by the at least one computer processor, said mathematical combination of said plurality of values of said financial metric data of said given financial object of said given entity;

transforming, by the at least one computer processor, said mathematical combination of said plurality of values of said financial metric data of said given financial object of said given entity, by taking a power of said mathematical combination of said financial metric data;

transforming, by the at least one computer processor, said mathematical combination of said plurality of values of said financial metric data of said given financial object of said given entity, by taking a fractional power of said mathematical combination of said financial metric data; or normalizing, by the at least one computer processor, said mathematical combination of said plurality of values of said financial metric data, or a transformed mathematical combination.

3. An index construction method comprising:

receiving a plurality of historical data of a plurality of financial metrics of a plurality of financial objects, said plurality of financial objects comprising publicly traded entities; and weighting, by at least one computer processor, a plurality of index constituent financial objects, each of said plurality of index constituent financial objects associated with at least one entity, and determining, by the at least one computer processor, a proportional fundamental index weight for each of said index constituent financial objects based on at least one objective measure of scale associated with said entities or said financial objects;

wherein said at least one objective measure of scale comprises at least one of:
at least one financial metric associated with one of said entities or said financial objects;
at least one demographic measure of one of said entities or said financial objects; or
at least one metric from information disclosures of a publicly traded entity; and wherein said at least one objective measure of scale comprises a metric other than the market capitalization of said entities or the price of said financial objects; and weighting, by the at least one computer processor, by a mathematical combination of a plurality of data for said at least one objective measure of scale of a given financial object of a given entity, said plurality of data for said at least one objective measure of scale of said given financial object of said given entity, comprising at least one:
a plurality of time periods;
a plurality of years;
a plurality of quarters;
a plurality of months; or
a plurality of accounting periods; and wherein said mathematical combination of said plurality data for said given financial object of said given entity, comprises at least one of:

calculating, by the at least one computer processor, a mathematical average of said plurality of data for said given financial object of said given entity;

calculating, by the at least one computer processor, a mathematical weighted average of said plurality of financial metric data of said given financial object of said given entity;

calculating, by the at least one computer processor, a statistical mean of said plurality of financial metric data of said given financial object of said given entity;

calculating, by the at least one computer processor, a statistical median of said plurality of financial metric data of said given financial object of said given entity;

calculating, by the at least one computer processor, a midpoint of said plurality of financial metric data of said given financial object of said given entity;

transforming, by the at least one computer processor, at least one of said plurality of financial metric data of said given financial object of said given entity;

transforming, by the at least one computer processor, at least one of said plurality of financial metric data of said given financial object of said given entity, by taking a power of said financial metric data;

transforming, by the at least one computer processor, at least one of said plurality of financial metric data of said given financial object of said given entity, by taking a fractional power of said financial metric data;

normalizing, by the at least one computer processor, at least one of said plurality of financial metric data of said given financial object, or a transformed financial metric data;

transforming, by the at least one computer processor, said proportional index weight of each of said plurality of index constituent financial objects;

transforming, by the at least one computer processor, said proportional index weight of said given financial object of said given entity, by taking a power of, said proportional index weight of each of said plurality of index constituent financial objects;

transforming, by the at least one computer processor, said proportional index weight of said plurality of index constituent financial objects, by taking a fractional power of said proportional index weight of each of said plurality of index constituent financial objects; or normalizing, by the at least one computer processor, said proportional index weight of said plurality of index constituent financial objects, or a transformed proportional index weight of each of said plurality of index constituent financial objects.

4. The computer-implemented method of claim 3, further comprising:
normalizing, by the at least one computer processor, data over a plurality of time periods.

5. The computer-implemented method of claim 3, further comprising:
rebalancing, by the at least one computer processor, said index on a periodic basis.

6. The computer-implemented method of claim 5, wherein said rebalancing said index on a periodic basis comprises at least one of:
rebalancing, by the at least one computer processor, on a yearly basis;
rebalancing, by the at least one computer processor, on a quarterly basis;
rebalancing, by the at least one computer processor, on a half year basis; or
rebalancing, by the at least one computer processor, on a multiple year basis.

7. The computer-implemented method of claim 3, further comprising:
recalculating, by the at least one computer processor, said index on a periodic basis.

8. The computer-implemented method of claim 7, wherein said recalculating said index on said periodic basis comprises at least one of:
recalculating, by the at least one computer processor, on a yearly basis;
recalculating, by the at least one computer processor, on a quarterly basis;
recalculating, by the at least one computer processor, on a half year basis; or
recalculating, by the at least one computer processor, on a multiple year basis.

9. The computer-implemented method of claim 3, further comprising:
adjusting, by the at least one computer processor, said index based on changes over time.

10. The computer-implemented method of claim 9, wherein said adjusting said index based on said changes comprises at least one of:
adjusting, by the at least one computer processor, said index upon a change in financial market status of an index constituent;
adjusting, by the at least one computer processor, said index upon an index constituent going bankrupt;
adjusting, by the at least one computer processor, said index upon an index constituent stock split;
adjusting, by the at least one computer processor, said index upon an index constituent modifying at least one class of stock;
adjusting, by the at least one computer processor, said index upon a price shift of an index constituent; or adjusting, by the at least one computer processor, said index upon a delisting of an index constituent.

11. The computer-implemented method of claim 3, further comprising:
adjusting, by the at least one computer processor, said index based on missing data.

12. The computer-implemented method of claim 11, wherein said adjusting said index based on missing data comprises:
adjusting, by the at least one computer processor, said index if
a plurality of metrics are being used, and
for a given entity or financial object, at least one of said plurality of metrics is missing.

13. The computer-implemented method of claim 12, wherein said adjusting said index based on missing data comprises:
averaging said remaining plurality of metrics, leaving out said at least one missing metric.

14. An index construction method comprising:
receiving a plurality of historical data of a plurality of financial metrics of a plurality of financial objects, said plurality of financial objects each relating to an entity; and
weighting, by at least one computer processor, a plurality of index constituent financial objects, each of said plurality of index constituent financial objects associated with an entity, and
determining, by the at least one computer processor, a proportional fundamental index weight for each of said index constituent financial objects based on at least one objective measure of scale associated with said entities or said financial objects;
wherein said at least one objective measure of scale comprises at least one of:
at least one financial metric associated with at least one of said entities or said financial objects;
at least one demographic measure of at least one of said entities or said financial objects; or
at least one metric from information disclosures of a publicly traded entity; and
wherein said at least one objective measure of scale comprises a metric other than the market capitalization of said entities or the price of said financial objects; and
weighting, by the at least one computer processor, by a mathematical combination of a plurality of data for said at least one objective measure of scale of a given financial object of a given entity, said plurality of data for said at least one objective measure of scale of said given financial object of said given entity, comprising at least one of:
a plurality of time periods;
a plurality of years;
a plurality of quarters;
a plurality of months; or
a plurality of accounting periods; and
wherein said mathematical combination of said plurality data for said given financial object of said given entity, comprises at least one of:
calculating, by the at least one computer processor, a mathematical average of said plurality of data for said given financial object of said given entity;
calculating, by the at least one computer processor, a mathematical weighted average of said plurality of financial metric data of said given financial object of said given entity;

calculating, by the at least one computer processor, a statistical mean of said plurality of financial metric data of said given financial object of said given entity;
calculating, by the at least one computer processor, a statistical median of said plurality of financial metric data of said given financial object of said given entity;
calculating, by the at least one computer processor, a midpoint of said plurality of financial metric data of said given financial object of said given entity;
transforming, by the at least one computer processor, at least one of said plurality of financial metric data of said given financial object of said given entity;
transforming, by the at least one computer processor, at least one of said plurality of financial metric data of said given financial object of said given entity, by taking a power of said financial metric data;
transforming, by the at least one computer processor, at least one of said plurality of financial metric data of said given financial object of said given entity, by taking a fractional power of said financial metric data;
normalizing, by the at least one computer processor, at least one of said plurality of financial metric data, or a transformed financial metric data;
transforming, by the at least one computer processor, said proportional fundamental index weight for each of said index constituent financial objects of said given financial object of said given entity;
transforming, by the at least one computer processor, said proportional fundamental index weight for each of said index constituent financial objects of said given entity, by taking a power of said financial metric data;
transforming, by the at least one computer processor, said proportional fundamental index weight for each of said index constituent financial objects of said given financial object of said given entity, by taking a fractional power of said financial metric data; or
normalizing, by the at least one computer processor, said proportional fundamental index weight for each of said index constituent financial objects, or a transformed proportional fundamental index weight.

15. The computer-implemented method of claim 14, wherein said calculating said mathematical combination comprises reducing risk.

16. The computer-implemented method of claim 14, wherein said objective measure of scale comprises at least one of:
book value;
sales;
revenue;
profit;
earnings;
cash flow;
cash earnings; or
a fundamental accounting variable.

17. An index construction method comprising:
receiving, by at least one computer processor, fundamental accounting data about a plurality of entities, over a plurality of time periods, each of said entities associated with at least one financial objects;
receiving, by the at least one computer processor, a plurality of index constituents;
weighting, by the at least one computer processor, said plurality of said index constituents according to at least one financial metric of said fundamental accounting data, each of said at least one financial metrics having data for said plurality of time periods from said fundamental accounting data to obtain relative weightings, and wherein said weighting comprises:
averaging, by the at least one computer processor, said fundamental accounting data over said plurality of said time periods for said each of said at least one financial metrics; and
weighting, by the at least one computer processor, said index constituents using at least one economic-centric metric about said entities other than a market-centric metric to obtain an economic-centric index of financial objects,
wherein said at least one economic-centric metric comprises a metric comprising at least one of:
at least one economic size metric;
at least one economic impact metric; or
at least one economic footprint metric;
providing, by the at least one computer processor, said economic-centric index to a third party, wherein said third party manages, by at least one computer processor, a portfolio of financial objects based on said index of financial objects, wherein said third party manages, comprising at least one of:
adjusts, by at least one computer processor, financial objects that comprise said portfolio based on changes to said one or more financial metrics used to weight the plurality of financial objects used to construct the economy-centric index of financial objects;
adjusts, by the at least one computer processor, relative weightings of the financial objects that comprise said portfolio based on changes to the at least one objective measure of scale used to weight the plurality of financial objects used to construct the economy-centric index of financial objects;
adjusts, by the at least one computer processor, relative weightings of the financial objects that comprise said portfolio based on the at least one objective measure of scale used to weight the plurality of financial objects used to construct the economy-centric index of financial objects, wherein said adjusts, comprises at least one of:
transforms, by the at least one computer processor, at least one of said plurality of financial metric data of said given financial object of said given entity;
transforms, by the at least one computer processor, at least one of said plurality of financial metric data of said given financial object of said given entity, by taking a power of said financial metric data;
transforms, by the at least one computer processor, at least one of said plurality of financial metric data of said given financial object of said given entity, by taking a fractional power of said financial metric data;
normalizes, by the at least one computer processor, at least one of said plurality of financial metric data, or a transformed financial metric data;
transforms, by the at least one computer processor, relative weightings of the financial objects that comprise said portfolio of said given financial object of said given entity;
transforms, by the at least one computer processor, relative weightings of the financial objects that comprise said portfolio of said given financial object of said given entity, by taking a power of said relative weightings;

transforms, by the at least one computer processor, relative weightings of the financial objects that comprise said portfolio of said given financial object of said given entity, by taking a fractional power of said relative weightings; or normalizes, by the at least one computer processor, relative weightings of the financial objects that comprise said portfolio, or a transformed relative weighting:

rebalances, by the at least one computer processor, relative weightings of the financial objects that comprise said portfolio when the weighting of one or more of said financial objects at least one of: exceeds a threshold value, or deviates from a target weight; or rebalances, by the at least one computer processor, relative weightings of the financial objects that comprise said portfolio to minimize turnover of said financial objects.

18. The computer-implemented method according to claim 17, wherein said weighting comprises:
    weighting based on a plurality of said economic-centric metrics.

19. The computer-implemented method according to claim 18, wherein said weighting based on said plurality of economic-centric metrics comprises:
    weighting based on at least one of:
    book value;
    book value of operating assets;
    sales;
    revenue;
    profit;
    earnings;
    cash flow;
    cash earnings;
    cash flow from operations; or
    a fundamental accounting variable.

20. The computer-implemented method according to claim 18, wherein said weighting based on said plurality of economic-centric metrics comprises:
    weighting based on metrics comprising:
    book value;
    sales; and
    cash flow.

21. The computer-implemented method according to claim 17, wherein said third party further manages comprising:
    rebalances on a periodic time basis; or
    rebalances on a periodic accounting period basis.

22. An index construction method comprising:
    receiving, by at least one processor, fundamental accounting data about a plurality of entities, over a plurality of accounting periods, each of said entities associated with at least one financial object;
    receiving, by the at least one processor, a plurality of index constituents;
    weighting, by the at least one processor, said plurality of said index constituents according to one or more financial metrics of said fundamental accounting data, each of said one or more financial metrics having data for said plurality of accounting periods from said fundamental accounting data to obtain relative weightings, and wherein said weighting comprises:
        averaging said fundamental accounting data over said plurality of said accounting periods for said each of said one or more financial metrics; and weighting said index constituents using at least one economic-centric metric about said entities other than market-centric metric to obtain an economic-centric index of financial objects,
        wherein said at least one economic-centric metric comprises a metric comprising at least one of:
        at least one economic size metric;
        at least one economic impact metric; or
        at least one economic footprint metric;
    providing said economic-centric index to a third party, wherein said third party manages, by at least one computer processor, a portfolio of financial objects based on said index of financial objects, wherein said third party manages, comprising at least one of:
        adjusts, by at least one computer processor, financial objects that comprise said portfolio based on changes to said one or more financial metrics used to weight the plurality of financial objects used to construct the economy-centric index of financial objects;
        adjusts, by the at least one computer processor, relative weightings of the financial objects that comprise said portfolio based on changes to the at least one objective measure of scale used to weight the plurality of financial objects used to construct the economy-centric index of financial objects;
        adjusts, by the at least one computer processor, relative weightings of the financial objects that comprise said portfolio based on the at least one objective measure of scale used to weight the plurality of financial objects used to construct the economy-centric index of financial objects, wherein said adjusts, comprises at least one of:
            transforms, by the at least one computer processor, at least one of said plurality of financial metric data of said given financial object of said given entity;
            transforms, by the at least one computer processor, at least one of said plurality of financial metric data of said given financial object of said given entity, by taking a power of said financial metric data;
            transforms, by the at least one computer processor, at least one of said plurality of financial metric data of said given financial object of said given entity, by taking a fractional power of said financial metric data;
            normalizes, by the at least one computer processor, at least one of said plurality of financial metric data, or a transformed financial metric data;
            transforms, by the at least one computer processor, said relative weightings of the financial objects that comprise said portfolio of said given financial object of said given entity;
            transforms, by the at least one computer processor, said relative weightings of the financial objects that comprise said portfolio of said given entity, by taking a power of said relative weightings;
            transforms, by the at least one computer processor, said relative weightings of the financial objects that comprise said portfolio of said given financial object of said given entity, by taking a fractional power of said relative weightings; or
            normalizes, by the at least one computer processor, said relative weightings of the financial objects that comprise said portfolio, or a transformed relative weightings;
        rebalances, by the at least one computer processor, relative weightings of the financial objects that comprise said portfolio when the weighting of one or more of said financial objects at least one of: exceeds a threshold value, or deviates from a target weight; or rebalances, by the at least one computer processor, relative weightings of the financial objects that comprise said portfolio to minimize turnover of said financial objects.

23. The computer-implemented method according to claim 22, wherein said weighting comprises:
  weighting based on a plurality of said economic-centric metrics.

24. The computer-implemented method according to claim 23, wherein said weighting based on said plurality of economic-centric metrics comprises:
  weighting based on at least one of:
  book value;
  book value of operating assets;
  sales;
  revenue;
  profit;
  earnings;
  cash flow;
  cash earnings;
  cash flow from operations; or
  a fundamental accounting variable.

25. The computer-implemented method according to claim 23, wherein said weighting based on said plurality of economic-centric metrics comprises:
  weighting based on metrics comprising:
  book value;
  sales; and
  cash flow.

26. The computer-implemented method according to claim 22, wherein said third party further manages comprising:
  rebalances on a periodic time basis; or
  rebalances on a periodic accounting period basis.

27. An index construction method comprising:
  receiving, by at least one computer processor, data about a plurality of entities and a plurality of corresponding financial objects associated with the plurality of entities from at least one database storing and permitting retrieval of such data;
  receiving, by the at least one computer processor, data indicative of a set of financial objects comprising a plurality of constituent financial objects;
  weighting, by the at least one computer processor, said constituent financial objects, wherein said weighting comprises:
    determining, by the at least one computer processor, a proportional fundamental weight for each said constituent financial object based on at least one objective measure of scale associated with said entities or said financial objects;
      wherein said at least one objective measure of scale comprises at least one financial metric associated with one of said entities or said financial objects other than the market capitalization of said entities or the price of said financial objects;
      wherein said at least one financial metric comprises at least one of: book value; sales; cash flow; or any dividends; and
  managing, by the at least one computer processor, a portfolio of financial objects based on said set of financial objects, wherein said managing comprises at least one of:
  adjusting, by the at least one computer processor, the financial objects that comprise said portfolio based on changes to the at least one objective measure of scale used to weight the plurality of financial objects used to construct the set of financial objects;
  adjusting, by the at least one computer processor, the proportional fundamental weight of the financial objects that comprise said portfolio based on changes to the at least one objective measure of scale used to weight the plurality of financial objects used to construct the set of financial objects;
  adjusting, by the at least one computer processor, the proportional fundamental weight of the financial objects that comprise said portfolio based on the at least one objective measure of scale used to weight the plurality of financial objects used to construct the set of financial objects, wherein said adjusting, comprises at least one of:
    transforming, by the at least one computer processor, at least one of said plurality of financial metric data of said given financial object of said given entity;
    transforming, by the at least one computer processor, at least one of said plurality of financial metric data of said given financial object of said given entity, by taking a power of said financial metric data;
    transforming, by the at least one computer processor, at least one of said plurality of financial metric data of said given financial object of said given entity, by taking a fractional power of said financial metric data;
    normalizing, by the at least one computer processor, at least one of said plurality of financial metric data, or a transformed financial metric data;
    transforming, by the at least one computer processor, said proportional fundamental weight data of said given financial object of said given entity;
    transforming, by the at least one computer processor, said proportional fundamental weight data of said given entity, by taking a power of said proportional fundamental weight data;
    transforming, by the at least one computer processor, said proportional fundamental weight data of said given entity, by taking a fractional power of said proportional fundamental weight data; or
    normalizing, by the at least one computer processor, said proportional fundamental weight data, or a transformed proportional fundamental weight data;
  rebalancing, by the at least one computer processor, the proportional fundamental weight of the financial objects that comprise said portfolio when the weighting of one or more of said financial objects at least one of: exceeds a threshold value, or deviates from a target weight; or
  rebalancing the proportional fundamental weight of the financial objects that comprise said portfolio to minimize turnover of said financial objects.

* * * * *